United States Patent
Nohno et al.

(10) Patent No.: US 6,239,788 B1
(45) Date of Patent: *May 29, 2001

(54) COORDINATE INPUT DEVICE AND DISPLAY-INTEGRATED TYPE COORDINATE INPUT DEVICE CAPABLE OF DIRECTLY DETECTING ELECTROSTATIC COUPLING CAPACITANCE WITH HIGH ACCURACY

(75) Inventors: Hitoshi Nohno, Nabari; Masayuki Katagiri, Ikoma; Kiyohiro Nozaki; Kengo Takahama, both of Nara; Hiroyuki Iwahashi, Kyoto-fu, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,394

(22) Filed: Aug. 7, 1998

(30) Foreign Application Priority Data

Aug. 8, 1997 (JP) .................................................. 9-215035
Feb. 19, 1998 (JP) ................................................ 10-037420
Jun. 3, 1998 (JP) ................................................ 10-154426

(51) Int. Cl.$^7$ ............................. G09G 5/00; G06K 11/06; G08C 21/00
(52) U.S. Cl. ............................................ 345/173; 178/18.03
(58) Field of Search .................................... 345/156, 157, 345/173, 174, 177, 179, 182, 183; 178/18.01–18.03, 18.06, 18.07, 19.03, 19.06; 382/315

(56) References Cited

U.S. PATENT DOCUMENTS

| 4,205,199 | * | 5/1980 | Mochizuki | 178/19 |
| 4,617,515 | * | 10/1986 | Taguchi et al. | 178/19 |
| 4,678,870 | * | 7/1987 | Taguchi et al. | 178/19 |
| 5,552,568 | * | 9/1996 | Onodaka et al. | 178/19 |
| 5,565,658 | * | 10/1996 | Gerpheide et al. | 178/19 |
| 5,790,106 | * | 8/1998 | Hirano et al. | 345/173 |
| 5,798,756 | * | 8/1998 | Yoshida et al. | 345/179 |
| 5,801,340 | * | 9/1998 | Peter | 178/20.04 |
| 5,825,345 | | 10/1998 | Takahama et al. | 345/104 |
| 5,869,790 | * | 2/1999 | Shigetaka et al. | 178/18.03 |
| 5,905,489 | * | 5/1999 | Takahama et al. | 345/174 |

FOREIGN PATENT DOCUMENTS

| 60-123927 | 7/1985 | (JP) . |
| 5053726 | 3/1993 | (JP) . |
| 8179871 | 7/1996 | (JP) . |

* cited by examiner

*Primary Examiner*—Bipin Shalwala
*Assistant Examiner*—Jeff Piziali

(57) ABSTRACT

In a coordinate detection period, a first electrode drive circuit sequentially selects source electrodes Sn of the TFT LCD panel to connect the same to an x-signal current amplifying circuit, and to apply an AC voltage to the non-selected electrodes. The x-signal current amplifying circuit detects a detection current flowing through the selected electrode, the magnitude of which corresponds to a distance to a finger (or a conductor pen), to obtain an x-coordinate detection voltage. A second electrode drive circuit and a y-signal current amplifying circuit operate in similar fashion to obtain a y-coordinate detection voltage. A coordinate detection circuit then obtains the x- and y-coordinate values of the designated position based on the x-coordinate detection voltage and the y-coordinate detection voltage, thus enabling pointing by a codeless pen and a finger.

21 Claims, 24 Drawing Sheets

Position (1) is Designated by Conductor

Position (2) is Designated by Conductor

Position (3) is Designated by Conductor

Position (4) is Designated by Conductor

Output Envelope Waveform

Envelope Differential Waveform

Output Envelope Waveform

Envelope Differential Waveform

COORDINATE INPUT DEVICE AND DISPLAY-INTEGRATED TYPE COORDINATE INPUT DEVICE CAPABLE OF DIRECTLY DETECTING ELECTROSTATIC COUPLING CAPACITANCE WITH HIGH ACCURACY

BACKGROUND OF THE INVENTION

1. Field of the Invention

The present invention relates to a coordinate input device and display-integrated type coordinate input device for use in computers, word processors, for example.

2. Related Art

As an input device for effecting an input into a computer, a word processor or the like, there is a well known tablet capable of inputting figures and letters, giving instructions for command execution and effecting other functions under instructions from a pen, a finger or the like. As an input device developed from the above tablet, a display-integrated type tablet device that commonly uses the electrodes and drive circuits of an LCD (Liquid Crystal Display) panel for the achievement of an inexpensive structure is disclosed in the prior art reference of Japanese Patent Laid-Open Publication No. HEI 5-53726.

This display-integrated type tablet device has a construction as shown in FIG. 35, where a switchover circuit 2 selects a detection control circuit 3 in a coordinate detection period under the control of a control circuit 1. Then, on the basis of signals from the detection control circuit 3, a segment electrode drive circuit 4 generates a segment electrode scanning signal to sequentially scan the segment electrodes X of an LCD panel 5. Subsequently, a common electrode drive circuit 6 generates a common electrode scanning signal to sequentially scan the common electrodes Y. An x-coordinate detection circuit 7 and a y-coordinate detection circuit 8 detect the coordinates of the tip of an electronic pen 9 on the basis of an induction voltage induced at the tip electrode of the electronic pen 9. On the other hand, the switchover circuit 2 selects a display control circuit 10 during a display period and controls the segment electrode drive circuit 4 and the common electrode drive circuit 6, thereby displaying an image on the LCD panel 5.

There is further disclosed a transparent digitizer that is concurrently used as a touch panel for detecting the position of an operator's finger or a codeless pen in the prior art reference of Japanese Patent Laid-Open Publication No. HEI 8-179871. This touch panel and transparent digitizer has a construction as shown in FIG. 36. When it operates as a digitizer, an AC signal oscillated from an oscillation pen 11 is received as a voltage of the electrode X of a first tablet 12 and a voltage of the electrode Y of a second tablet 13, the voltages being induced by electrostatic capacitive coupling. Then, a signal level obtained every adjacent electrodes $X_n$ and $X_{n+1}$ or adjacent electrodes $y_m$ and $Y_{m+1}$ is subjected to a balance processing in a balance input circuit 14, and only necessary frequency signal is taken out through a band-pass filter 15. A control circuit 16 detects the position of the oscillation pen 11 based on the above signal.

When operating as a touch panel, the control circuit 16 controls analog switches 17 and 18 to sequentially apply a signal from a signal oscillator 19 to the electrodes X and the electrodes Y. Then, by detecting a change in electrostatic capacitance of the electrodes that are facing each other, the position that the finger touches is detected.

A touch panel for detecting the position of the operator's finger is disclosed in the prior art reference of Japanese Patent Laid-Open Publication No. SHO 60-123927. In this touch panel, one electrode that is sequentially selected out of a plurality of electrodes arranged parallel to one another is connected to a signal detection circuit, while the other electrodes are connected to a signal source for generating an AC signal. Then, a signal induced at the electrode by the electrostatic capacitance between the operator's finger and the electrode is detected by the above signal detection circuit, and the position that the finger touches is detected based on this detection signal. In this case, if the width of the electrode located on the upper side is wide in detecting the signal induced at the electrode positioned on the lower side, the upper electrode disadvantageously functions as an electrostatic shield, so that sufficient signal detection cannot be performed. Therefore, the width of the electrode located on the upper side is narrower than the width of the electrode located on the lower side.

However, the aforementioned prior art display-integrated type tablet device, touch panel and transparent digitizer and touch panel have.

In the above display-integrated type tablet device, an infinitesimal induction voltage induced at the tip electrode of the electronic pen 9 is amplified and transmitted to the x-coordinate detection circuit 7 and the y-coordinate detection circuit 8, and both the detection circuits 7 and 8 detect the x-coordinate value and the y-coordinate value. Therefore, a cable arranged between the electronic pen 9 and both the detection circuits 7 and 8 is required. The cable causes a sense of incongruity in the operator, and its pull force significantly reduces the operability of the electronic pen 9. Furthermore, when the above cable is located in a position on the LCD panel 5 at which the operator is about to look, the screen is not easy to view, resulting in a bad operability. Furthermore, due to the above construction, pointing cannot be executed by finger touch.

In contrast to the above, the touch panel and transparent digitizer requires no cable between the oscillation pen 11 and the control circuit 16, achieving a codeless pen. However, the oscillation pen 11 must be mounted with an oscillation circuit and a battery for driving this oscillation circuit, which increase the weight and significantly reduce the operability. Additionally, the above battery must be periodically replaced, which is troublesome.

Furthermore, when mounting this touch panel and transparent digitizer on the display device for the provision of a display-integrated type tablet, there is an increase in number of components for the reason that the control circuit of the digitizer and the control circuit of the display device are independent of each other. Moreover, an adjusting process is necessary for the coincidence of a detection point with a display point in an assembling process, as a consequence of which the number of processes increases to cause a cost increase. Additionally, the touch panel and transparent digitizer is provided with the electrodes X and Y formed of an ITO (Indium Tin Oxide) film for example, part of light from the above display device is reflected and absorbed by the electrodes X and Y, causing a deterioration in visibility. Furthermore, for the mounting of the touch panel and transparent digitizer on the display device, the thickness of the device increases to significantly hinder the achievement of a thin lightweight structure.

The common use of the electrodes X and Y of the above touch panel and transparent digitizer as the electrodes of the display device for the formation of a display-integrated type tablet is very difficult for the following reasons.

That is, generally in a display device employing a liquid crystal display, an EL (electroluminescence) display, a plasma display or the like, electrodes that are perpendicular to each other are arranged on two substrates separated at a specified interval. As an example, a cross-section of a duty ratio type LCD device of STN (Super Twisted Nematic) type or the like is shown in FIG. 37.

Although schematically shown in FIG. 37, practically an upper glass substrate 21 and a lower glass substrate 22 have a thickness of about 0.7 mm, and an upper polarizing plate 23 and a lower polarizing plate 24 have a thickness of about 0.1 mm. In contrast to this, a liquid crystal spacer 25 has a thickness of 7 μm, so that a distance from the electrodes 26 and 27 to a finger 28 is about 100 times a distance from a segment electrode 26 to a common electrode 27.

Furthermore, a transparent protection panel for protecting an LCD device is sometimes mounted on this LCD device with interposition of a specified gap. This protection panel is provided for preventing the possible occurrence of scratches on the surface of the LCD device, deterioration of the LCD device due to direct application of a pressure to it and break of the glass substrates 21 and 22, and it is mounted with an air gap provided taking the warp of the protection panel occurring when it is pressed into consideration. In general, the above protection panel is provided by transparent acrylic or the like having a thickness of 1 mm, and the air gap is set to about 2 mm. When this protection panel is mounted, the distance from the electrodes 26 and 27 to the finger 28 is about 540 times the distance from the segment electrode 26 to the common electrode 27.

There is an active addressing type LCD device such as the TFT (Thin Film Transistor) type having a high display quality. In the case of this LCD device, source electrodes and gate electrodes are deposited on an identical glass substrate. Therefore, the distance from the electrodes to the finger 28 is about 1000 times the distance from the source electrode to the gate electrode.

As described above, in each of the aforementioned LCD devices, the distance from the electrodes to the finger is about 100 to 1000 times the distance between the electrodes that are perpendicular to each other. Therefore, the coupling capacitance between the electrodes that are perpendicular to each other is much greater than the coupling capacitance between the finger and the electrodes, and an electric line of force to be shielded by a shielding object such as the finger among the electric lines of force coming from one electrode is very small, so that it is in practice very difficult to detect a change in signal between adjacent electrodes.

In the touch panel disclosed in the prior art reference of Japanese Patent Laid-Open Publication No. SHO 60-123927, one electrode to be sequentially selected out of the plurality of electrodes arranged parallel to each other is connected to the signal detection circuit, and the other electrodes are connected to the signal source for generating an AC signal, by which the signal induced at the electrode due to the electrostatic coupling capacitance between the operator's finger and the electrodes is detected by the signal detection circuit. This arrangement obviates the need for using a pen mounted with a cable, an oscillation circuit and a battery.

However, the drive circuit of the touch panel is normally formed of a multi-layer substrate, and an electrostatic capacitance exists between wiring lines. An electrostatic coupling capacitance also exists between the electrodes. If the wiring lines and electrodes to which a DC voltage of a control signal or the like is applied exist in such a state, then the phase of the AC signal is rotated by the electrostatic coupling capacitance and the resistance of the devices. This consequently causes a problem that the detection of the induction signal at the electrode by the signal detection circuit cannot be executed correctly, failing to execute correct position detection.

In the touch panel disclosed in the prior art reference of Japanese Patent Laid-Open Publication No. SHO 60-123927, the width of the upper electrode is made narrower than the width of the lower electrode so as to prevent the upper electrode from functioning as an electrostatic shield. Then, the problems resulting from such an electrostatic shield occurs even in a duty ratio type display-integrated type tablet device as shown in FIG. 35. However, the duty ratio type display-integrated type tablet device has the problem that the width of the upper electrode cannot be made narrower than the width of the lower electrode, since a pixel is formed in each area where the upper electrode and the lower electrode intersect with each other.

SUMMARY OF THE INVENTION

Accordingly, it is an object of the present invention to provide a lightweight thin type coordinate input device and a display-integrated type coordinate input device that have a good operability obviating the need for mounting the pen with a cable, an oscillation circuit or a battery and is capable of executing pointing by a finger and achieving correct position detection.

In order to achieve the above object, the present invention provides a coordinate input device comprising:

a tablet including first electrodes arranged parallel to one another at specified intervals, and second electrodes arranged parallel to one another at specified intervals, but in a direction crossing the direction of the first electrodes, the first electrodes being insulated from the second electrodes;

a DC voltage generating means for generating a DC power voltage;

a control means for outputting a detection control signal for detecting designated coordinates on the tablet;

an AC applying means for generating superimposition voltage and a superimposition detection control signal by superimposing an AC voltage of identical phase and amplitude on the DC power voltage and the detection control signal;

an electrode drive means for selection of ones among the first electrodes and the second electrodes based on the superimposition detection control signal and applying the superimposition voltage to non-selected electrodes; and a coordinate detecting means for detecting a current flowing through the electrode selected by the electrode drive means and detecting the designated coordinates on the tablet based on this current.

According to the above construction, the selected electrode of the tablet is grounded via a finger or pen serving as a coordinate designating conductor and a human body, while the DC voltage generating means for generating the DC power voltage is grounded via an electrical outlet or the like. With this arrangement, a current of an intensity corresponding to the electrostatic coupling capacitance between the selected electrodes and the coordinate designating conductor (i.e., corresponding to a distance to the coordinate designating conductor) flows through the selected electrodes. Therefore, by obtaining the position of the selected electrodes (first electrodes and second electrodes) through which the maximum current flows on the basis of the above current, the coordinates designated by the coordinate designating conductor on the display portion is obtained.

In this case, an AC voltage having the same phase and amplitude as those of the AC voltage (superimposition voltage) is applied to the non-selected electrodes of the tablet is also superimposed on the detection control signal from the control means. Accordingly, there is no occurrence of phase rotation of the AC voltage applied to the non-selected electrodes due to the existence of the electrostatic coupling capacitance and the resistance of each device even when the electrostatic coupling capacitance exists between the electrodes and the wiring lines, so that the detection of the current by the coordinate detecting means is executed with high accuracy.

By thus directly detecting the value relevant to the electrostatic coupling capacitance of the coordinate designating conductor with the first and second electrodes with high accuracy, the coordinates designated by the coordinate designating conductor can be obtained with -high accuracy. That is, highly accurate coordinate input is achieved. Furthermore, the pen serving as the coordinate designating conductor is provided with neither the combination of an electrode and a cable nor the combination of an oscillation circuit and a battery, so that the coordinates are inputted with high operability.

In one embodiment, the coordinate detecting means has an AC component removing means for removing the AC component superimposed by the AC applying means from the detected current.

According to the above construction, the AC component superimposed on the current detected by the coordinate detecting means is removed. Therefore, even when the detection current is very small as compared with the AC component, the detection current can be handled in a DC manner, so that the processing is simplified.

In one embodiment, the AC voltage superimposed by the AC applying means has a frequency at which an impedance of the DC voltage generating means is minimized or a frequency near to the frequency.

According to the above construction, the impedance of the current path is reduced to increase the current flowing through the path, and the current detected by the coordinate detecting means is also correspondingly increased. Therefore, the signal-to-noise ratio is improved to achieve highly accurate coordinate detection.

In one embodiment, the coordinate detecting means has a sample hold circuit, and
the detection control signal includes a clock signal that is synchronized with the AC voltage superimposed by the AC applying means and supplied to the sample hold circuit so as to instruct a sample hold timing.

According to the above construction, a sample hold operation is consistently executed at the peak of the detection current, so that highly accurate coordinate detection is achieved at a high signal-to-noise ratio.

In one embodiment, at least two superimposition voltages are generated by superimposing the AC voltage on the DC power voltage by the AC applying means, and supply lines of the superimposition voltages are connected to each other via a capacitor having a capacitance not smaller than a specified capacitance, the superimposition voltages having identical phase and amplitude in terms of alternating current.

According to the above construction, assuming that the voltage applied to the non-selected electrodes of the first electrodes and the voltage applied to the non-selected electrodes of the second electrodes by the electrode drive means are the aforementioned two superimposition voltages, these two superimposition voltages have identical phase and amplitude, coinciding in an AC manner. Thus the noise components are reduced to improve the signal-to-noise ratio, so that highly accurate coordinate detection is achieved.

In one embodiment, the DC voltage generating means includes a DC-to-DC converter.

According to the above construction, not only the DC voltage generating means but also the coordinate input device can be compacted.

In one embodiment, the coordinate input device
a loop-shaped electric path that is formed at least around an outer periphery of the tablet.

According to the above construction, when an electromagnetic noise externally enters the tablet, a counter electromotive force is generated so as to cancel this electromagnetic noise. Thus, the signal-to-noise ratio is improved to achieve highly accurate coordinate detection.

In one embodiment, a plurality of electrodes are simultaneously selected by the electrode drive means.

According to the above construction, currents flowing through the plurality of selected electrodes are detected by the coordinate detecting means. Thus, highly accurate coordinate detection is executed on the basis of a large detection current.

In one embodiment, the product of the number and arrangement pitch of the electrodes that are simultaneously selected by the electrode drive means is set to a range of about 10 mm to 30 mm.

According to the above construction, when the coordinate designating conductor for designating the coordinates on the tablet is a finger, an increase in the detection current due to the increased in the number of the selected electrodes and an increase in resolution due to the reduction in the number of the selected electrodes are optimally balanced with each other. Thus, coordinate detection having a relatively high resolution is achieved by a relatively large detection current.

In one embodiment, the control means outputs a detection control signal for making a, selection period for the first electrodes overlap a selection period for the second electrodes; and
the coordinate detecting means is constructed of an x-coordinate detecting means for detecting an x-coordinate value on the tablet on the basis of a current flowing through the first electrodes selected by the electrode drive means and a y-coordinate detecting means for detecting a y-coordinate value on the basis of a current flowing through the second electrodes.

According to the above construction, by virtue of the provision of the overlap period between the period for the selection among the first electrodes and the period for the selection among the second electrodes, the total time of coordinate detection is reduced. Otherwise, if the duration of the coordinate detection period is made equal to the duration of the period in the case where no overlap period is provided, then the detectable coordinate points are increased in number.

In one embodiment, the detection control signal initiates selection of either one of the first electrode and the second electrode, and thereafter initiates selection of the other.

According to the above construction, a time difference is generated between the start of x-coordinate detection by the x-coordinate detecting means and the start of y-coordinate detection by the y-coordinate detecting means. Therefore, a rush current occurring at the time of starting the x-coordinate detection and a rush current occurring at the time of starting the y-coordinate detection are prevented from being mixed with each other, so that the noise appearing in the detection signal of the coordinate detecting means is not amplified.

In one embodiment, there is provided an electrode that is provided at a position in which it can be electrostatically coupled with a human body and is connected to a DC reference potential point.

According to the above construction, the electrode connected to the DC reference potential point is provided in a position that can be electrostatically coupled with the human body. Therefore, the electrode and the human body are electrostatically coupled with each other, thereby forming a current path that passes through neither the impedance of the electrostatic coupling of the human body with the ground nor the impedance of the power circuit. As a result, the impedance of the current path is reduced to increase the current detected by the coordinate detecting means. Furthermore, the loop area of the current path becomes smaller than the current path via the ground, so that surrounding magnetic field noises are made less influential, therefore improving the signal-to-noise ratio as well as the coordinate detection accuracy.

The present invention provides a display-integrated type coordinate input device comprising:

an image display panel including first electrodes arranged parallel to one another at specified intervals and second electrodes arranged parallel to one another at specified intervals in a direction crossing the direction of the first electrodes, the first electrodes being insulated from the second electrodes;

a DC voltage generating means for generating a DC power voltage;

a control means for outputting a display control signal for displaying an image on the image display panel during a display period of one frame and outputting a detection control signal for detecting designated coordinates on the image display panel during a coordinate detection period of the one frame;

an AC applying means for generating a superimposition voltage and a superimposition detection control signal by superimposing an AC voltage of identical phase and amplitude on the DC power voltage and the detection control signal;

an electrode drive means for displaying an image on the image display panel by driving the first electrodes and the second electrodes on the basis of the display control signal during the display period, executing selection of the first electrode and the second electrode on the basis of the superimposition detection control signal and applying the superimposition voltage to non-selected electrodes during the coordinate detection period; and a coordinate detecting means for detecting a current flowing through the electrodes selected by the electrode drive means and detecting the designated coordinates on the image display panel on the basis of this current.

According to the above construction, selection among the first electrodes and the second electrodes of the image display panel is executed by the electrode drive means and the current is detected by the coordinate detecting means during the coordinate detection period, while the superimposition voltage obtained by superimposing the AC voltage on the DC power voltage by the AC applying means is applied to the non-selected electrodes. Then, in terms of alternating current, the selected electrodes of the image display panel is grounded via the finger or pen serving as a coordinate designating conductor and the human body, while the DC voltage generating means for generating the DC power voltage is grounded via an electrical outlet or the like. Consequently, a current of an intensity corresponding to the electrostatic coupling capacitance with the coordinate designating conductor (i.e., corresponding to a distance to the coordinate designating conductor) flows. Therefore, by detecting the position of the selected electrode (first electrode and second electrode) through which the maximum current flows on the basis of the above current, the coordinates on the image display panel designated by the coordinate designating conductor is obtained.

In the above case, an AC voltage having the same phase and amplitude as those of the superimposition voltage applied to the non-selected electrodes of the image display panel is also applied to the detection control signal from the control means by the AC applying means. Accordingly, there is no occurrence of the phase rotation of the superimposition voltage applied to the non-selected electrodes due to the existence of the electrostatic coupling capacitance and the resistance of each device even when an electrostatic coupling capacitance exists between the electrodes and the wiring lines, so that the detection of the above current by the coordinate detecting means is executed with high accuracy.

By thus directly detecting the value relevant to the electrostatic coupling capacitance of the coordinate designating conductor with the first and second electrodes with high accuracy, the coordinates designated by the coordinate designating conductor is obtained with high accuracy. Furthermore, the pen serving as the coordinate designating conductor is provided with neither the combination of an electrode and a cable nor the combination of an oscillation circuit and a battery, so that the coordinates are inputted with high operability. Furthermore, by concurrently using the electrodes for image display use and the electrodes for coordinate detection use, a thin display-integrated type coordinate input device having a reduced amount of components and high visibility is achieved.

In one embodiment, the first electrodes and the second electrodes are formed on an identical substrate, and a plurality of switching elements connected to the first and second electrodes and transparent pixel electrodes connected to the switching elements are arranged in a matrix form, the coordinate input device comprising:

an opposite substrate on which an opposite electrode opposite to the transparent pixel electrodes is formed and which is arranged opposite to the substrate; and liquid crystals filled in a space between the pixel electrodes and the opposite electrode.

According to the above construction, the image display panel is constructed of a TFT liquid crystal display means, and therefore, a high-luminance high-quality image is displayed during the display period.

In one embodiment, the superimposition voltage applied to the non-selected electrodes of the first electrodes and the second electrodes during the coordinate detection period is a voltage that makes the switching elements non-conductive.

According to the above construction, a voltage that makes the switching elements non-conductive is applied to the first electrodes and the second electrodes during the coordinate detection period, and therefore, the electric charges charged in the liquid crystals of the image display panel during the display period are not lost by the turning-on operation of the switching elements.

In one embodiment, the control means outputs a detection control signal for making a selection period for the first electrodes overlap a selection period for the second electrodes; and the coordinate detecting means is constructed of an x-coordinate detecting means for detecting an x-coordinate value on the image display panel on the basis of a current flowing through the first electrode selected by the electrode drive means and a y-coordinate detecting means for detecting a y-coordinate value on the basis of a current flowing through the second electrode selected by the electrode drive means.

According to the above construction, by virtue of the provision of the overlap period between the period for the selection among the first electrodes and the period for the selection among the second electrodes, the total time of coordinate detection is reduced. Otherwise, if the duration of the coordinate detection period is made equal to the duration of the period in the case where no overlap period is provided, the detectable coordinate points are increased in number.

In one embodiment, the image display panel is a duty ratio type image display panel in which the first electrodes and the second electrodes are respectively formed of transparent electrodes on different transparent substrates and liquid crystals are filled in a space between the different transparent electrodes; and the coordinate detecting means is constructed of an x-coordinate detecting means for detecting an x-coordinate value on the image display panel on the basis of a current flowing through the first electrode and a y-coordinate detecting means for detecting a y-coordinate value on the basis of a current flowing through the second electrode, the first and second electrodes selected by the electrode drive means.

According to the above construction, the x-coordinate value and the y-coordinate value on the duty ratio type image display panel are detected by different coordinate detecting means. Therefore, if a difference is generated between the waveform of the current flowing through the selected first electrode and the waveform of the current flowing through the selected second electrode by an electrostatic shield effect of the electrode located on the upper side on the electrode located on the lower side among the first and second electrodes, then the designated coordinates are accurately detected by the methods appropriate for the respective waveforms.

In one embodiment, at least one of the x-coordinate detecting means and the y-coordinate detecting means is provided with an envelope detecting means and a waveform differentiating means, and the designated coordinates are detected on the basis of an envelope differential waveform of the detection current.

In the duty ratio type image display panel, the waveform of the current flowing through the electrode located on the lower side among the first and second electrodes during the coordinate detection period exhibits a form that monotonously increases up to the designated coordinates and becomes stable at a specified value when it goes beyond the designated coordinates due to the electrostatic shield effect of the electrode located on the upper side. Therefore, according to the above construction, by providing the coordinate detecting means for executing coordinate detection on the basis of the current flowing through the electrode located on the lower side with the envelope detecting means and the waveform differentiating means, the designated coordinates are accurately detected on the basis of the point of inflection of the waveform of the current flowing through the electrode located on the lower side.

In one embodiment, the control means outputs a detection control signal for making a period for selection among the first electrodes overlap a period for selection among the second electrodes.

According to the above construction, by virtue of the provision of the overlap period between the period for the selection among the first electrodes and the period for the selection among the second electrodes, the total time of coordinate detection is reduced. Otherwise, if the duration of the coordinate detection period is made equal to the duration of the period in the case where no overlap period is provided, the detectable coordinate points are increased in number.

In one embodiment, the detection control signal is a detection control signal that starts the selection of either one of the first electrode and the second electrode and thereafter starts the selection of the other.

According to the above construction, a time difference is generated between the start of x-coordinate detection by the x-coordinate detecting means and the start of y-coordinate detection by the y-coordinate detecting means. Therefore, a rush current occurring at the time of starting the x-coordinate detection and the rush current occurring at the time of starting the y-coordinate detection are prevented from being mixed with each other, so that the noise appearing in the detection signal of the coordinate detecting means is not amplified.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will be described in detail below based on the embodiments thereof with reference to the accompanying drawings.

Figure 1:
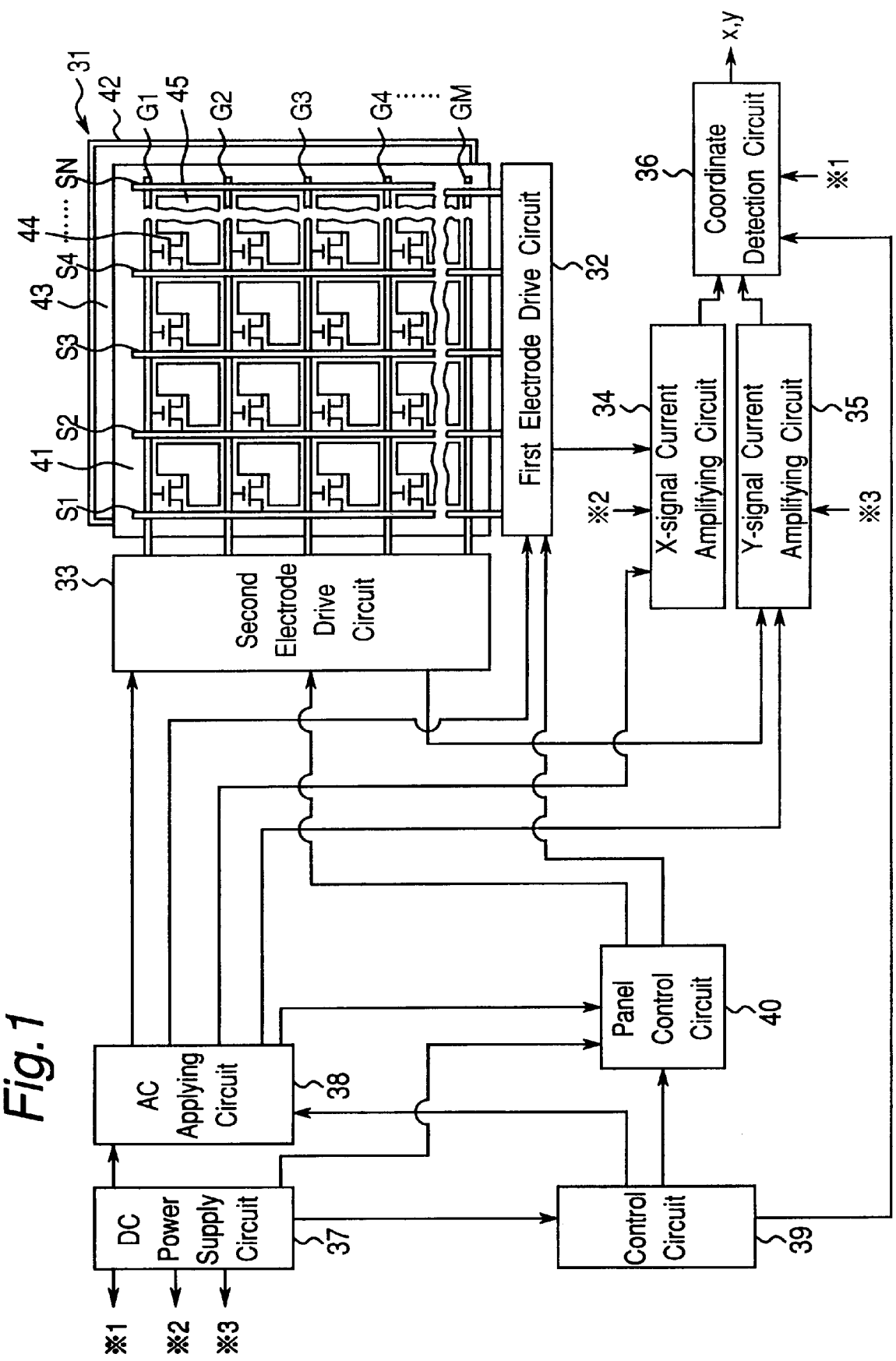
FIG. 1 is a block diagram of a display-integrated type coordinate input device of the present invention.

FIG. 1 is a block diagram of a display-integrated type coordinate input device according to a first embodiment. This display-integrated type coordinate input device is constructed roughly of a display panel 31, a first electrode drive circuit 32, a second electrode drive circuit 33, an x-signal current amplifying circuit 34, a y-signal current amplifying circuit 35, a coordinate detection circuit 36, a DC power supply circuit 37, an AC applying circuit 38, a control circuit 39 and a panel control circuit 40. In this case, the display panel 31 concurrently has an image display function and a tablet function. It is to be noted that the following description is based on the case where the display panel 31 is a TFT LCD panel. Therefore, the first electrode to be scanned in a coordinate detection stage is the source electrode, and the second electrode is the gate electrode.

The above DC power supply circuit 37 generates a specified current and voltage from a power source of 100 VAC and supplies the same to the control circuit 39, panel control circuit 40, x-signal current amplifying circuit 34, y-signal current amplifying circuit 35, coordinate detection circuit 36 and AC applying circuit 38. The AC applying circuit 38 includes an oscillation circuit, generates a sine waveform alternating voltage (excitation signal) having a specified DC component and supplies the same to the first electrode drive circuit 32, second electrode drive circuit 33, x-signal current amplifying circuit 34 and y-signal current amplifying circuit 35. The above excitation signal is superimposed on various control signals inputted from the control circuit 39 and the resulting signals are supplied to the panel control circuit 40.

The control circuit 39 includes a clock generator and controls the panel control circuit 40 by transmitting a timing signal to the panel control circuit 40 to thereby execute a display operation during a display period and execute a coordinate detection operation during a coordinate detection period as described in detail later. The coordinate detection circuit 36 is controlled in the coordinate detection period to obtain an x-coordinate value and a y-coordinate value. Further, as described above, the various control signals are transmitted to the AC applying circuit 38, thereby superimposing the excitation signal thereto.

The panel control circuit 40 drives and controls the first electrode drive circuit 32 and the second electrode drive circuit 33 during the display period, thereby displaying an image on the display panel 31 on the basis of an image signal from the control circuit 39. During the coordinate detection period, the first electrode drive circuit 32 and the second electrode drive circuit 33 are driven and controlled, thereby executing a coordinate detection operation.

The TFT LCD panel 31 is constructed roughly of a first transparent glass substrate (referred to as a TFT substrate hereinafter) 41, a second transparent glass substrate (referred to as an opposite substrate hereinafter) 42, a transparent opposite electrode 43 formed on the opposite substrate 42, a source electrode Sn (n=1 to N) arranged on the opposite electrode 43 side on the TFT substrate 41, a gate electrode Gm (m=1 to M) arranged perpendicular to the source electrode Sn on the opposite electrode 43 side on the TFT substrate 41, a TFT 44 arranged at the intersection of each source electrode Sn and each gate electrode Gm on the TFT substrate 41 and a pixel electrode 45 that is formed on the TFT substrate 41 and connected to the drain of the TFT 44.

Although not specifically shown in the figure, liquid crystals are filled in a sealed manner in a space between the pixel electrode 45 and the opposite electrode 43, an upper polarizing plate is bonded to the surface opposite to the opposite substrate 42 of the TFT substrate 41, and a lower polarizing plate is bonded to the surface opposite to the opposite electrode 43 of the opposite substrate 42. In the present embodiment, the TFT LCD panel 31 has its surface located on the TFT substrate 41 side used as an input surface so that an electrostatic coupling of a finger with the electrodes Sn and Gm is not shielded by the opposite electrode 43 when the panel is used as a touch panel.

Operations of the first electrode drive circuit 32, second electrode drive circuit 33, x-signal current amplifying circuit 34, y-signal current amplifying circuit 35, and coordinate detection circuit 36 will be roughly described below.

The first electrode drive circuit 32 is connected to all the source electrodes Sn and supplies a display signal based on the image signal from the panel control circuit 40 to each source electrode Sn during the display period. During an x-coordinate detection period of the above coordinate detection period, the above circuit connects a selected source electrode (referred to as a selected electrode Ss hereinafter) among all the source electrodes Sn to the x-signal current amplifying circuit 34 and applies an AC voltage $V_S$ serving as the superimposition voltage from the AC applying circuit 38 to the non-selected source electrodes (referred to as a non-selected electrode Sns hereinafter). Then, by sequentially changing from 1 to N the number "n" of the source electrode Sn to make the selected electrode Ss, the source electrodes Sn are sequentially scanned from one end to the other end.

The second electrode drive circuit 33 is connected to all the gate electrodes Gm and supplies a scanning signal based on the image signal from the panel control circuit 40 to each gate electrode Gm during the display period. During a y-coordinate detection period of the above coordinate detection period, the above circuit connects a selected gate electrode (referred to as a selected electrode Gs hereinafter) among all the gate electrodes Gm to the y-signal current amplifying circuit 35 and applies an AC voltage $V_G$ serving as the superimposition voltage from the AC applying circuit 38 to the non-selected gate electrodes (referred to as a non-selected electrode Gns hereinafter). Then, by sequentially changing from 1 to M the number "m" of the gate electrode Gm to make the selected electrode Gs, the gate electrodes Gm are sequentially scanned from one end to the other end.

The x-signal current amplifying circuit 34 detects and amplifies a current flowing through the selected electrode Ss connected by the first electrode drive circuit 32 and thereafter amplifies the same to a voltage that can be easily handled. Then, a difference between the resulting signal and the excitation signal voltage from the AC applying circuit 38 is taken, thereby obtaining an x-coordinate detection voltage. The thus-obtained x-coordinate detection voltage is outputted to the coordinate detection circuit 36.

The y-signal current amplifying circuit 35 detects and amplifies a current flowing through the selected electrode Gs connected by the second electrode drive circuit 33 and thereafter amplifies the same to a voltage that can be easily handled. Then, a difference between the resulting signal and the excitation signal voltage from the AC applying circuit 38 is taken, thereby obtaining a y-coordinate detection voltage. The thus-obtained y-coordinate detection voltage is outputted to the coordinate detection circuit 36.

Then, the coordinate detection circuit 36 samples and holds the x-coordinate detection voltage and the y-coordinate detection voltage, subjects them to analog-to-digital conversion processes and thereafter detects the peak values of the voltages by approximating them to curves. Then, the number of clocks during the time from the start of the scanning of the source electrode Sn to the peak detection of the x-coordinate detection voltage is counted and this count value is converted into an x-coordinate value. Likewise, the count value of the number of clocks during the time from the start of the scanning of the gate electrode Gm to the peak detection of the y-coordinate detection voltage is converted into a y-coordinate value.

Figure 2:
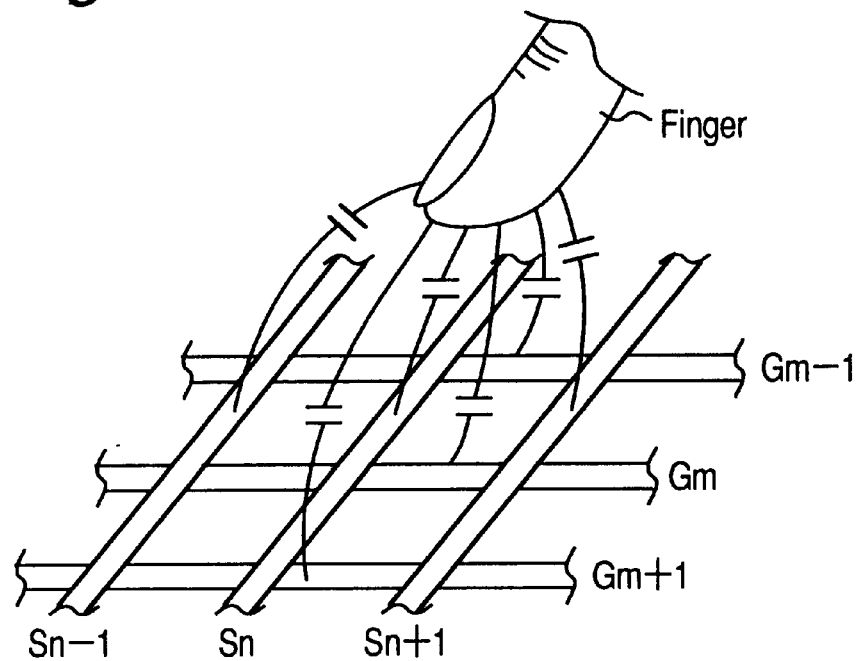
FIG. 2 is an explanatory view of electrostatic coupling of all the source electrodes and all the gate electrodes with a finger in FIG. 1.

The principle of operation of the coordinate detection of the present invention will be described next. When a finger is placed on the TFT LCD panel 31, all the source electrodes Sn and all the gate electrodes Gm are electrostatically coupled with the finger as shown in FIG. 2. Note that the electrodes Sn and Gm located closer to the finger have increased electrostatic coupling capacitance. Therefore, if the position of the electrodes Sn and Gm that are most intensely coupled with the finger is found, then the position can be specified as the position on which the finger is placed.

When a finger is placed on the TFT LCD panel 31, infinitesimal currents flow through a path extending from the source electrode Sn, the finger and the human body and a path extending from the gate electrode Gm, the finger and the human body. In the above case, a larger current flows through the electrodes Sn and Gm of which the electrostatic coupling with the finger is more intense. Therefore, by sequentially scanning the source electrodes Sn and the gate electrodes Gm from an end, it is determined that the finger is placed on the electrodes Sn and Gm through which the largest currents are flowing.

Figure 3:
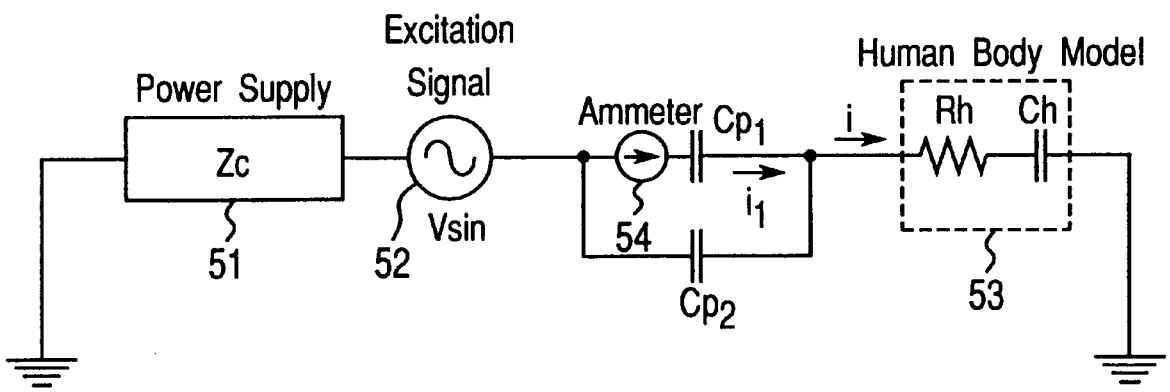
FIG. 3 is an equivalent circuit diagram of a coordinate detection system in the display-integrated type coordinate input device shown in FIG. 1.

FIG. 3 is an equivalent circuit diagram of the above coordinate detection system. A power supply circuit 51 has impedance Zc and is grounded. An excitation signal voltage generating source 52 is connected in series with the power supply circuit 51 and generates an excitation signal voltage Vsin. The reference numeral Cp1 denotes an electrostatic coupling capacitance of the finger with the selected electrodes Ss and Gs. The reference numeral Cp2 denotes an electrostatic coupling capacitance of the finger with the electrodes other than the above selected electrodes (non-selected electrodes Sns and Gns, pixel electrode 45 and non-selected side electrodes (the gate electrodes Gm in the source electrode selection stage or the source electrode Sn in the gate electrode selection stage)).

It is also acceptable to provide a plurality of selected electrodes Ss and Gs in order to increase the detection current to a certain degree.

The reference numeral 53 denotes a human body model that is coupled with the ground and expressed by a concentrated constant, the model being expressed by a series connection of a resistance Rh and a capacitance Ch.

In the above equivalent circuit, a current $i_1$ flowing between the finger and the selected electrodes Ss and Gs (i.e., a current flowing through the electrostatic coupling capacitance Cp1) is measured by an ammeter 54.

As described in detail later, the excitation signal voltage Vsin is applied to the source electrode Sn, gate electrode Gm and the opposite electrode 43 of the TFT LCD panel 31. A cutoff voltage is applied across all the source and gate electrodes of the TFT, and therefore, the pixel electrode 45 is in an electrically floated state. However, the pixel electrode 45 is electrostatically coupled by its entire surface with the opposite electrode 43, and the excitation signal voltage Vsin is induced from the opposite electrode 43. Further, the excitation signal is superimposed on the various control signals supplied from the panel control circuit 40 to the first electrode drive circuit 32 and the second electrode drive circuit 33 by the AC applying circuit 38 as described above.

As described above, the arrangement that the excitation signal voltage Vsin is superimposed on the wiring lines of not only the source electrode Sn and the gate electrode Gm but also all the electrodes and the drive circuits is adopted for the following two reasons. The first reason is for preventing the phase rotation of the AC voltages $V_S$ and $V_G$. Normally, both the electrode drive circuits 32 and 33 are formed of a multi-layer substrate, and therefore, an electrostatic coupling capacitance exists between wiring lines. An electrostatic coupling capacitance also exists between the source electrode Sn, the gate electrode Gm and the opposite electrode 43. When the wiring lines and electrodes to which a DC voltage is applied exist in such a state, the phase of the AC voltages $V_S$ and $V_G$ applied to the non-selected electrodes Sns and Gns rotate due to the existence of the electrostatic coupling capacitance, the electrostatic capacitance of the liquid crystals and the resistances of analog switches (not shown) and electrodes.

Then, in current amplification of the first stages of the x-signal current amplifying circuit 34 and the y-signal current amplifying circuit 35 having the constructions as described in detail later, AC voltages inputted to the inverted input terminal and the non-inverted input terminal of an operational amplifier become out of phase and the difference is amplified, consequently disabling correct detection.

In contrast to this, in the present embodiment, a voltage that is consistent in terms of alternating current is applied to all the electrodes and wiring lines of the drive circuits, and accordingly, there is no need for taking the electrostatic coupling capacitance between the electrodes and the wiring lines on the TFT LCD panel 31 and both the electrode drive circuits 32 and 33 into consideration. Therefore, in current amplification of the first stages of the x-signal current amplifying circuit 34 and the y-signal current amplifying circuit 35, there is no phase difference between the inputs of the inverted input terminal and the non-inverted input terminal of the above amplifier, consequently achieving correct detection.

The second reason is that, if an electrode to which a DC voltage is applied, or an electrode in a grounded state in terms of alternating current exists, then there are two paths connecting the finger to the ground, comprised of a path via the electrode in the grounded state and a path via the human body. Therefore, the detection current is consequently divided into two parts although the current is very small. Furthermore, the electrostatic coupling capacitance on the human body side is much smaller than the electrostatic coupling capacitance between the electrodes. Therefore, a greater part of the detection current eventually flows through the path via the electrode in the grounded state, and this makes it very difficult to detect the current flowing through the path via the human body (the intended proper detection current).

Figure 4:
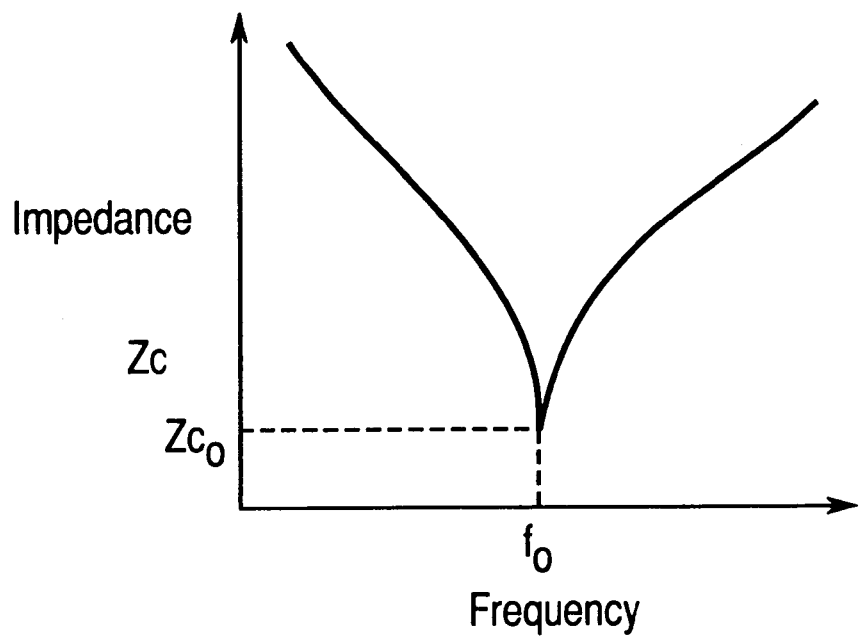
FIG. 4 is a graph showing a frequency characteristic of impedance of a power supply circuit in the equivalent circuit shown in FIG. 3.

The frequency characteristic of the impedance Zc of the power supply circuit 51 in the aforementioned equivalent circuit is shown in FIG. 4. FIG. 4 shows a logarithmic graph, where the power supply circuit 51 exhibits the characteristic as illustrated since the circuit is coupled with the ground via a transformer. It is now assumed that the minimum impedance is $Zc_0$ and the frequency at the time is $f_0$. According to the actual measurements, the above impedance $Zc_0$ is several hundreds to several kilo-ohms, while the frequency $f_0$ is several tens to several hundreds kilohertz. Then, it is preferable to set the frequency of the excitation signal voltage Vsin from the excitation signal voltage generating source 52 to a frequency near the frequency $f_0$. The reason will be described below.

It is assumed now that the excitation signal voltage Vsin has an amplitude v. A coupling capacitance obtained by adding a coupling capacitance Cp2 of the finger and the electrodes other than the selected electrode to the coupling capacitance Cp1 of the finger and the selected electrodes Ss and Gs, i.e., the coupling capacitance of the finger and all the electrodes of the TFT LCD panel 31 is several picofarads. In the capacitance, the rate of the coupling capacitance Cp1 of the finger and the selected electrodes Ss and Gs is not more than several percents. The resistance Rh of the human body model 53 is 200 Ω, while the capacitance Ch is 200 pF.

The above will be described based on concrete numbers for the sake of easy understanding. It is assumed that the frequency $f_1$ of the excitation signal is 100 kHz and the impedance $Zc_1$ of the power supply circuit 51 at the frequency $f_1$ is 1 kΩ, the excitation signal amplitude v is 1 Vrms, the electrostatic coupling capacitance Cp1 of the finger and the selected electrodes Ss and Gs is 0.5 pF and the electrostatic coupling capacitance Cp2 of the finger and the electrodes other than the selected electrode is 9.5 pF. Then, the total impedance Zall of the above equivalent circuit at a frequency of 100 kHz is:

$$Zall = Zc_1 + 1/\omega((Cp1+Cp2)+Rh+1/\omega Ch \quad (1)$$

where $\omega = 2\pi f_1$.

Consequently, Zall becomes approximately equal to 168 kΩ. Therefore, a current i flowing through the human body according to the equation (2):

$$i = v/Zall \quad (2)$$

becomes $i \approx 5.9$ μArms.

The detection current $i_1$ is a current that belongs to the current i flowing through the human body and flows through the coupling capacitance Cp1 of the finger and the selected electrodes Ss and Gs, and therefore, according to the equation (3):

$$i_1 = i\{Cp1/(Cp1+Cp2)\} \quad (3)$$

$i_1$ becomes 0.30 μArms.

This detection current $i_1$=0.30 μArms is in the case where the selected electrodes Ss and Gs are located just below the finger. However, in the other case, the electrostatic coupling capacitance Cp1 of the finger and the selected electrodes Ss and Gs decreases as the distance between the finger and the selected electrodes Ss and Gs increases. Generically viewing the entire coordinate detection period, a detection current that has the maximum amplitude in the position of the finger can be obtained as shown in FIG. 5.

Figure 5:
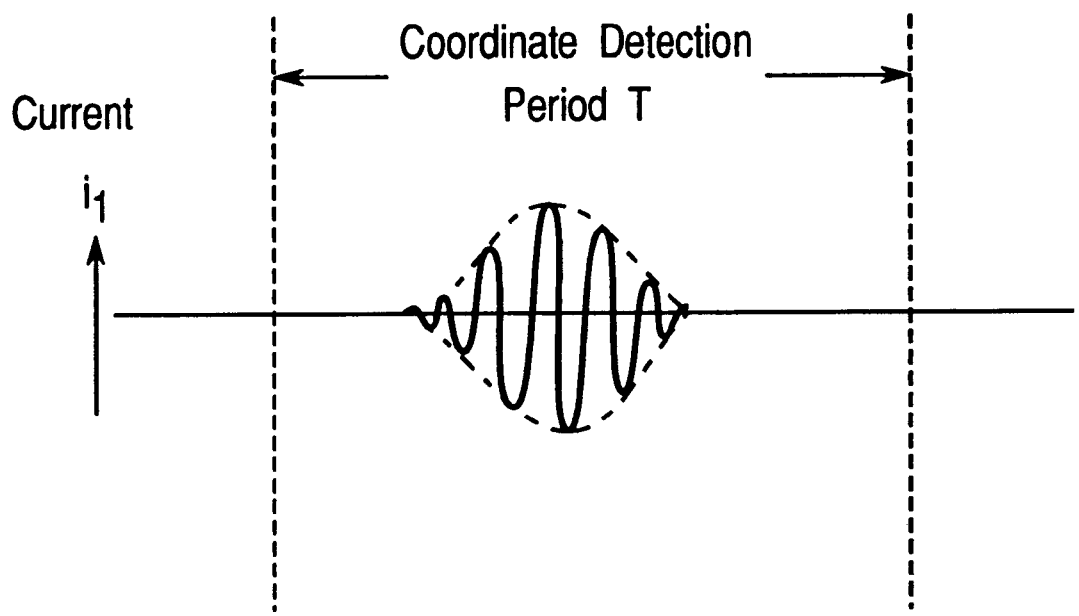
FIG. 5 is a chart showing an example of a detection current waveform.

The absolute value of the extreme value of the detection current $i_1$ shown in FIG. 5 increases or decreases according to the intensity of the coupling of the finger with the selected electrode Ss or Gs that is scanned. On the other hand, the excitation signal frequency $f_1$ is already known, and therefore, the position of the extreme value of the detection current $i_1$ in the time base direction can be preparatorily known by synchronizing the excitation signal at the time of starting scanning. Therefore, by reading the value of the detection current $i_1$ in the position of the extreme value and taking the absolute value, the absolute value of the extreme value of the detection current $i_1$ can be obtained. The position in which the absolute value of the extreme value of the detection current $i_1$ obtained as described above assumes the maximum value is determined as the finger position.

As described above, in the present embodiment, the value relevant to the electrostatic coupling capacitance of the finger and the electrode Sn or Gm is directly detected. Therefore, the coordinates designated by the finger can be detected with high accuracy as compared with the case where the change in the electrostatic coupling capacitance between the two types of electrodes that are perpendicular to each other is detected, the change depending on the existence of the finger, as disclosed in the prior art reference of Japanese Patent Laid-Open Publication No. HEI 8-179871.

As is apparent from the equations (2) and (3), the detection current $i_1$ increases as the total impedance Zall of the equivalent circuit decreases. Then, the impedance $Zc_1$ at the excitation signal frequency $f_1$ is included only in the first term of the terms of the equation (1), and it can be understood from FIG. 4 that this impedance $Zc_1$ assumes the minimum value when the excitation signal frequency $f_1$ is $f_0$. Therefore, it is preferable to set the excitation signal frequency $f_1$ near the frequency $f_0$.

The second term and the fourth term of the equation (1) decreases as the value of $\omega$ increases. Therefore, the detection current $i_1$ increases as the excitation signal frequency $f_1$ becomes great. In this case, also taking the regulations of radio disturbance and so on into consideration in addition to the aforementioned two points, the value of the excitation signal frequency $f_1$ is to be set so that the total impedance Zall becomes small. It can be understood that the detection current $i_1$ increases as the amplitude v of the excitation signal voltage Vsin is greater according to the equation (2).

Figure 6:
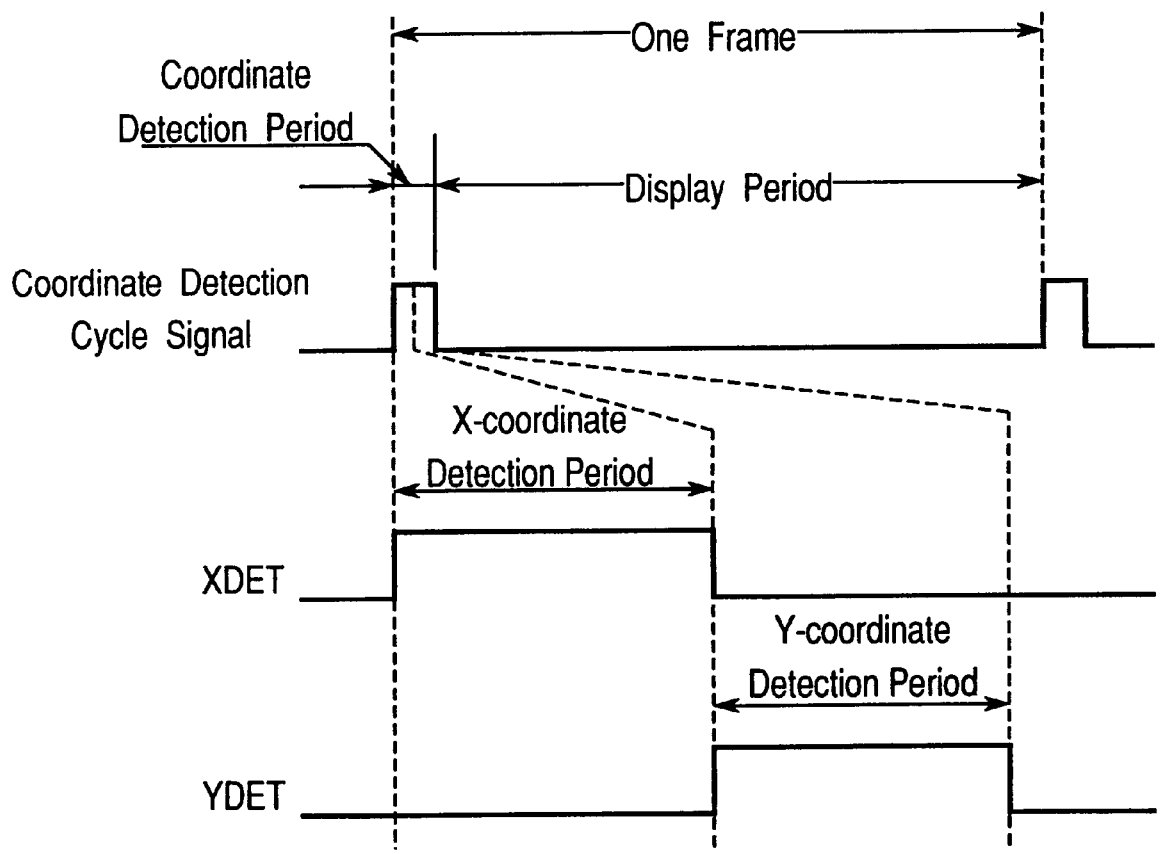
FIG. 6 is a timing chart showing operation timing of the display-integrated type coordinate input device shown in FIG. 1.

The operation timing of the display-integrated type coordinate input device having the above construction will be described below. FIG. 6 is a timing chart of the above operation timing. One frame is time-sharingly divided into a coordinate detection period during which the coordinates designated by the finger on the TFT LCD panel 31 is detected and a display period during which an image is displayed on the TFT LCD panel 31 based on the image signal.

The display period is set in accordance with the change in level of a coordinate detection cycle signal supplied from the control circuit 39 to the panel control circuit 40 to "L" (low level). Then, the panel control circuit 40 outputs an image signal and a control signal to the first electrode drive circuit 32 and the second electrode drive circuit 33. Subsequently, the TFT LCD panel 31 is driven by the first electrode drive circuit 32 and the second electrode drive circuit 33, thereby displaying an image. The operations of both the electrode drive circuits 32 and 33 and the TFT LCD panel 31 concerning the image display are the same as those of the conventionally well known TFT LCD device, and therefore, no description is provided for them. It is preferred that the number of frames per unit time should be not less than 60 frames per second in order to suppress flickering.

With the change in level of the coordinate detection cycle signal to "H", the coordinate detection period is set. Then, the panel control circuit 40 outputs an x-detection period signal XDET and a control signal to the first electrode drive circuit 32. A y-detection period signal YDET and a control signal are outputted to the second electrode drive circuit 33. The coordinate detection period is divided into two parts of an x-coordinate detection period and a y-coordinate detection period, and the x-coordinate detection period is set by the change in level of the x-detection period signal XDET to "H". The y-coordinate detection period is set by the change in level of the y-detection period signal YDET to "H".

The constructions and operations of the first electrode drive circuit 32, second electrode drive circuit 33, DC power supply circuit 37, AC applying circuit 38, x-signal current amplifying circuit 34, y-signal current amplifying circuit 35 and coordinate detection circuit 36 will be described in detail next.

Figure 7:
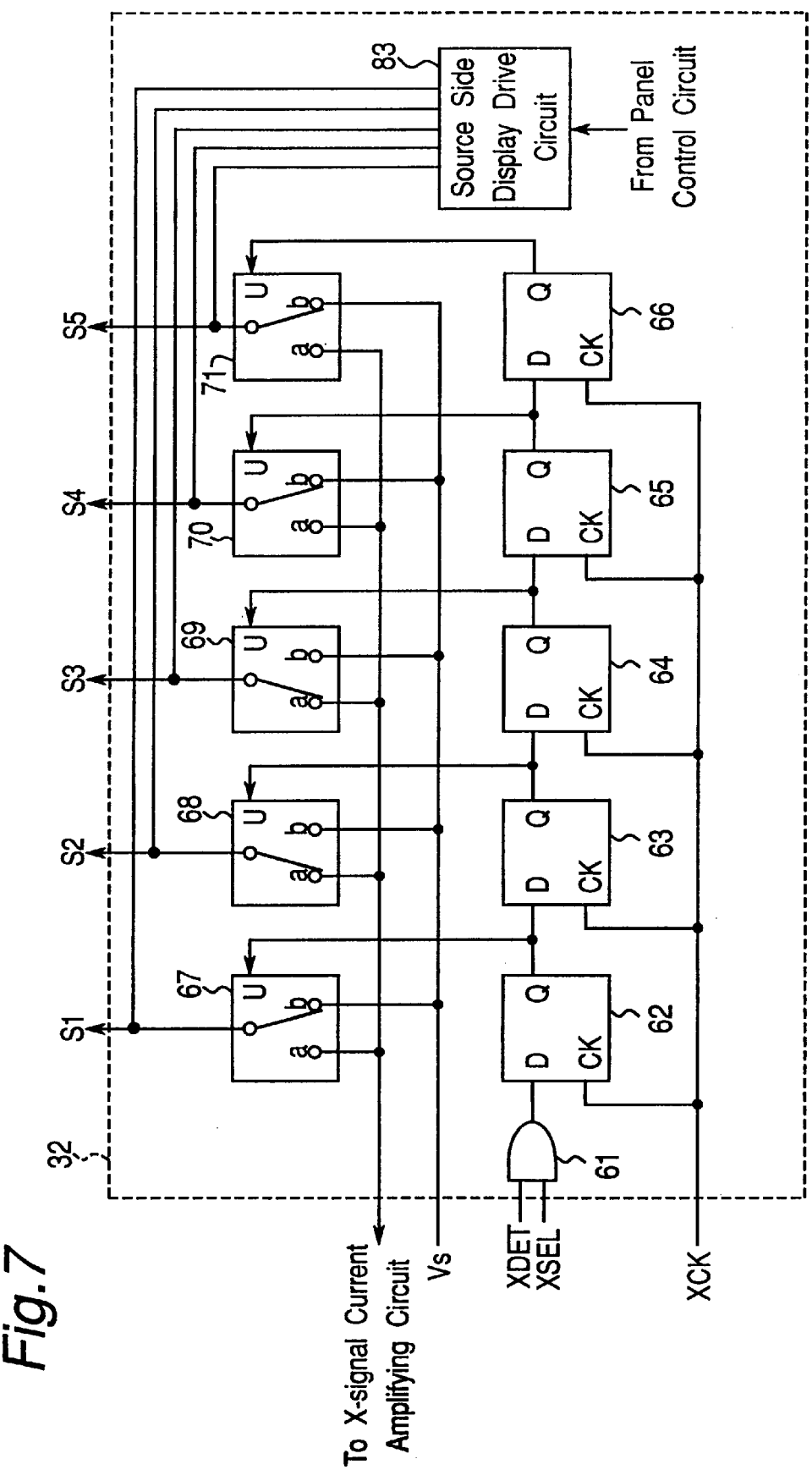
FIG. 7 is a diagram showing an example of a concrete circuit of a first electrode drive circuit in FIG. 1.

FIG. 7 is a circuit diagram showing an example of a concrete circuit of the first electrode drive circuit 32. In FIG. 7, for simplicity of explanation, it is assumed that five source electrodes Sn (n=1 to 5) are provided. The first electrode drive circuit 32 is constructed roughly of an AND gate 61, D-flip-flops 62 through 66, analog switches 67 through 71 and a source side display drive circuit 83. Then, the x-detection period signal XDET from the panel control circuit 40 and a first electrode selecting signal XSEL that serves as the control signal are inputted to the AND gate 61. To the clock terminals CK of the D-flip-flops 62 through 66 is inputted a first clock XCK that serves as the control signal from the panel control circuit 40. To the source side display drive circuit 83 are inputted the image signal and a control signal for display use.

Figure 8:
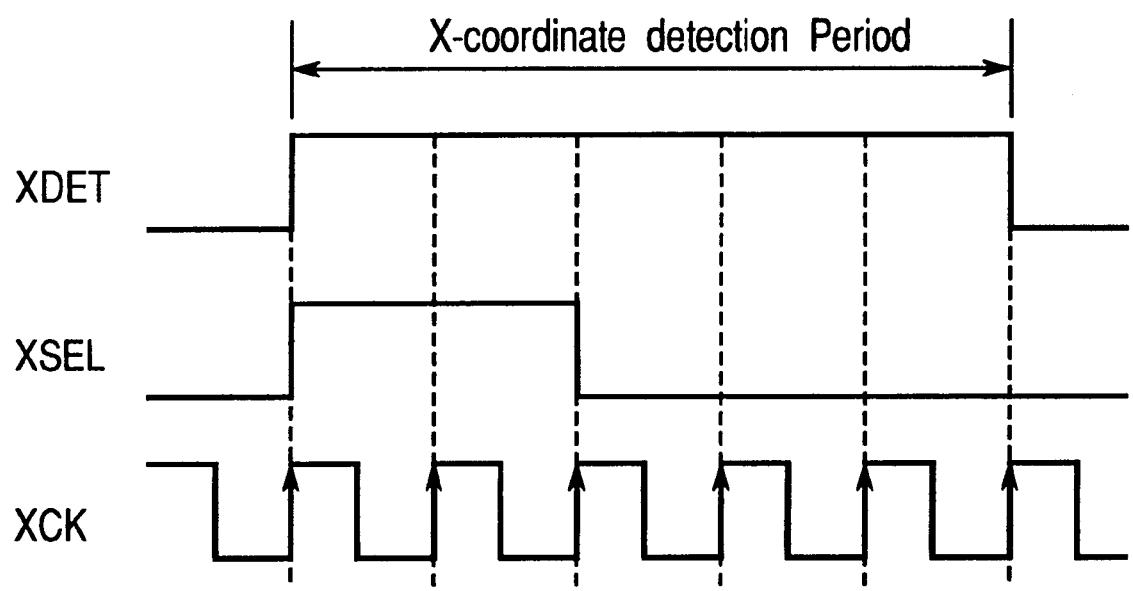
FIG. 8 is a timing chart showing an x-detection period signal, a first electrode selection signal and a first clock in FIG. 7.

FIG. 8 is a timing chart of the x-detection period signal XDET, the first electrode selecting signal XSEL and the first clock XCK. The operation of the first electrode drive circuit 32 will be described with reference to FIG. 7 and FIG. 8. During the coordinate detection period, the x-coordinate detection period appears when the level of the x-detection period signal XDET becomes "H", and the AND gate 61 allows the first electrode selecting signal XSEL to pass, thereby supplying the signal to an input terminal D of the D-flip-flop 62. The output terminals Q of the D-flip-flops 62 through 65 are connected to the D-flip-flops 63 through 66 of the respective subsequent stages, where the D-flip-flops 62 through 66 constitute a shift register. Therefore, data inputted to the D-flip-flop 62 is shifted rightward in synchronization with the rise of the first clock XCK. The output terminals Q of the D-flip-flops 62 through 66 are also connected to control terminals U of the corresponding analog switches 67 through 71.

The analog switches 67 through 71 switch to the terminal "a" side when the level of a control signal inputted to the control terminal U becomes "H", thereby connecting the terminal "a" to the corresponding source electrode Sn. When the signal level becomes "H", the switches switch to the terminal "b" side, thereby connecting the terminal "b" to the corresponding source electrode Sn. To the terminals "b" of the analog switches 67 through 71 are supplied the AC voltage $V_S$ from the AC applying circuit 38. On the other hand, their terminals "a" are connected to the operational amplifier of the first stage of the x-signal current amplifying circuit 34 as described before. Therefore, when the output signals of the D-flip-flops 62 through 66 are at "H", the corresponding source electrodes Sn are selected to be connected to the x-signal current amplifying circuit 34. When the signals are at "L", the AC voltage $V_S$ from the AC applying circuit 38 is applied to the corresponding source electrode Sn.

That is, in the example shown in FIG. 7, the source electrodes S2 and S3 are selected to be connected to the x-signal current amplifying circuit 34, while the AC voltage $V_S$ is applied to the source electrodes S1, S4 and S5. Then, the source electrodes S3 and S4 are selected at the rise time of the next clock edge and connected to the x-signal current amplifying circuit 34, while the AC voltage $V_S$ is applied to the source electrodes S1, S2 and S5. Likewise, adjacent two source electrodes Sn and Sn+1 are sequentially selected to scan the source electrodes Sn.

During the display period, the source side display drive circuit 83 supplies a display signal to the source electrode Sn on the basis of the image signal and the control signal for display use from the panel control circuit 40.

Figure 9:
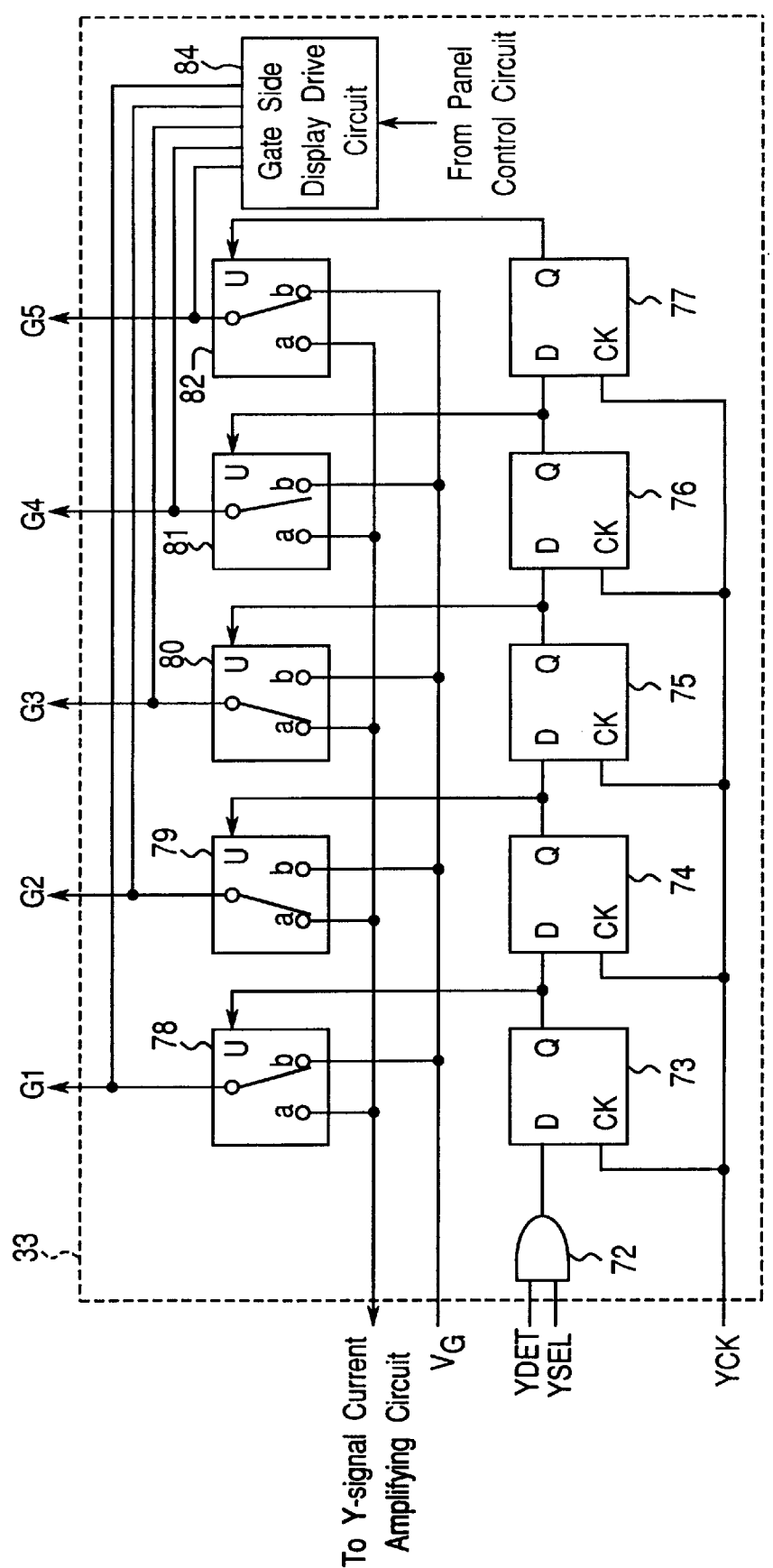
FIG. 9 is a diagram showing an example of a concrete circuit of a second electrode drive circuit in FIG. 1.

FIG. 9 is a circuit diagram showing an example of a concrete circuit of the second electrode drive circuit 33. The second electrode drive circuit 33 is constructed roughly of an AND gate 72, D-flip-flops 73 through 77, analog switches 78 through 82 and a gate side display drive circuit 84 similarly to the first electrode drive circuit 32. To the AND gate 72 are inputted the y-detection period signal YDET and a second electrode selection signal YSEL from the panel control circuit 40. To the clock terminals CK of the D-flip-flops 73 through 77 is inputted a second clock YCK from the panel control circuit 40. To the gate side display drive circuit 84 are inputted an image signal and a control signal for display use from the panel control circuit 40. The D-flip-flops 73 through 77 constitute a shift register. The output terminals Q of the D-flip-flops 73 through 77 are connected to the control terminals U of the corresponding analog switches 78 through 82.

To the terminals "b" of the analog switches 78 through 82 is supplied the AC voltage $V_G$ from the AC applying circuit 38, while their terminals "a" are connected to the operational amplifier of the first stage of the y-signal current amplifying circuit 35. The analog switches 78 through 82 are each connected to any gate electrode Gm.

Figure 10:
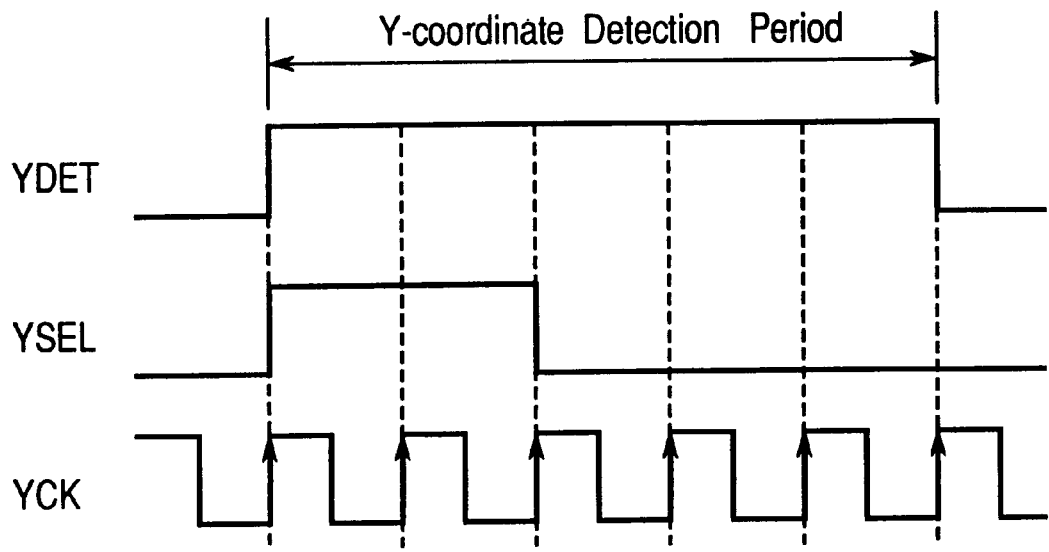
FIG. 10 is a timing chart showing a y-detection period signal, a second electrode selection signal and a second clock in FIG. 9.

FIG. 10 is a timing chart of the y-detection period signal YDET, the second electrode selection signal YSEL and the second clock YCK. The second electrode drive circuit 33 drives the TFT LCD panel 31 as follows by operating similarly to that of the first electrode drive circuit 32. That is, during the coordinate detection period, when each of output signals of the D-flip-flops 73 through 77 is at "H", the corresponding gate electrode Gm is selected and connected to the y-signal current amplifying circuit 35. When the signal is at "L", the AC voltage $V_G$ from the AC applying circuit 38 is applied to the gate electrode Gm. Then, adjacent two gate electrodes Gm and Gm+1 are sequentially selected to scan the gate electrode Gm on the basis of the second electrode selection signal YSEL of which the duration of H-level inputted to the AND gate 72 corresponds to two clocks.

During the display period, the gate side display drive circuit 84 supplies a scanning signal to the gate electrode Gm on the basis of the image signal and the control signal for display use from the panel control circuit 40.

Figure 11:
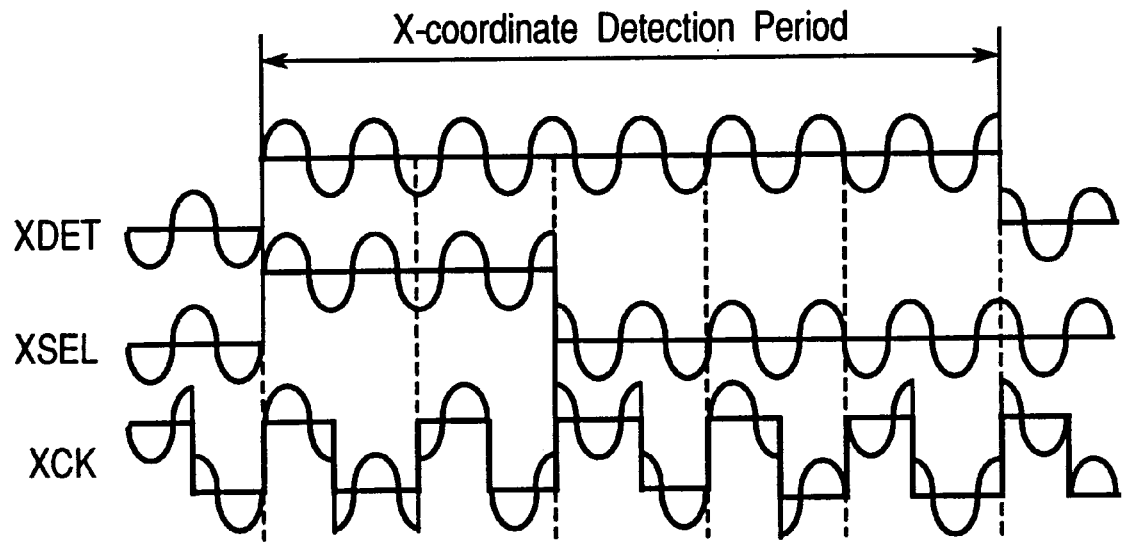
FIG. 11 is a chart showing actual waveforms of the x-detection period signal, the first electrode selection signal and the first clock shown in FIG. 8, with respect to a DC reference potential.
Figure 12:
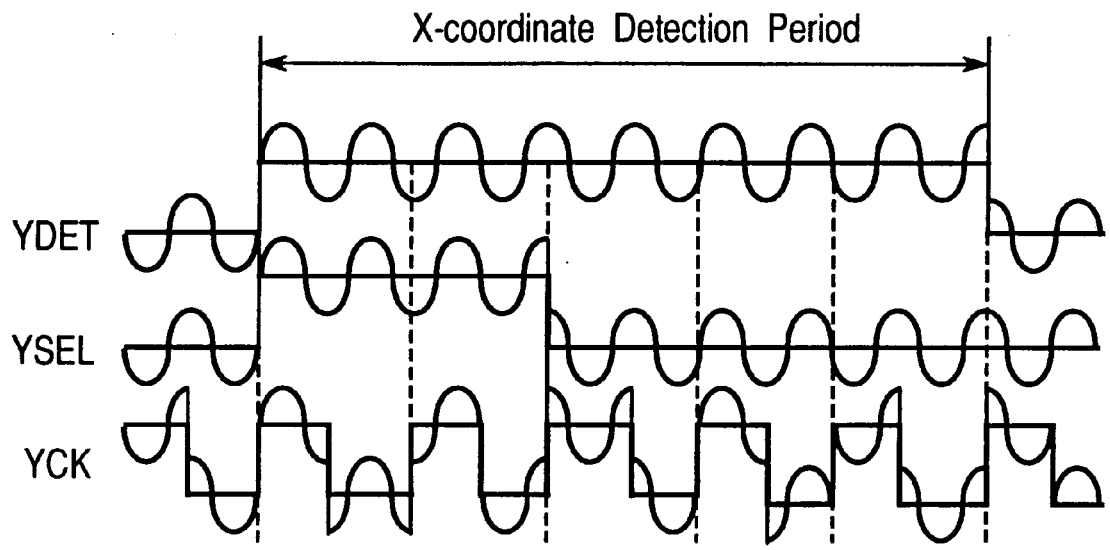
FIG. 12 is a chart showing the actual waveforms of the y-detection period signal, the second electrode selection signal and the second clock shown in FIG. 10, with respect to a DC reference potential.

It is to be noted herein that the operations of the first electrode drive circuit 32 and the second electrode drive circuit 33 have been described with the excitation signal ignored for simplicity of explanation. In practice, the voltage on which the excitation signal voltage Vsin is superimposed is supplied by the AC applying circuit 38 to the first electrode drive circuit 32, second electrode drive circuit 33, x-signal current amplifying circuit 34, y-signal current amplifying circuit 35 and panel control circuit 40 as described above. Therefore, the excitation signal voltage Vsin is superimposed on all the signal voltages inputted to the TFT LCD panel 31 including the x-detection period signal XDET, y-detection period signal YDET, first electrode selecting signal XSEL, second electrode selection signal YSEL, first clock XCK, second clock YCK, AC voltage $V_S$ and AC voltage $V_G$. Therefore, the actual waveforms viewed from the DC reference voltage of the x-detection period signal XDET, first electrode selecting signal XSEL, first clock XCK, y-detection period signal YDET, second electrode selection signal YSEL and second clock YCK are as shown in FIG. 11 and FIG. 12.

Note that, if the actual TFT LCD panel 31 copes with the SVGA (Super Video Graphics Array) color screen, there are 2400 source electrodes Sn and 600 gate electrodes Gm for the three colors of R, G and B. In order to scan these electrodes Sn and Gm without exerting any influence on the display, each of the first clock XCK and the second clock YCK must have a frequency of several megahertz. In contrast to this, the frequency of the excitation signal voltage Vsin is several tens to several hundreds kilohertz as stated before. Therefore, the actual waveforms of the first clock XCK and the second clock YCK differ from those of FIG. 11 and FIG. 12.

As described above, the AC excitation signal voltage Vsin having identical phase and amplitude is superimposed on all the signal voltages inputted to the TFT LCD panel 31. Therefore, in observing potential differences between the potentials on the TFT LCD panel 31, the first electrode drive circuit 32 and the second electrode drive circuit 33, the excitation signal voltage Vsin is virtually not superimposed on them. Therefore, the superimposition of the excitation signal voltage Vsin requires no change in the operations of the first electrode drive circuit 32 and the second electrode drive circuit 33 as described before.

The AC voltages $V_S$ and $V_G$ applied to the non-selected electrodes Sns and Gns during the coordinate detection period must be the voltages that cause no image display on the TFT LCD panel 31. Therefore, the AC voltages $V_S$ and $V_G$ are set with regard to the value ($V_S-V_G$) so that a cutoff voltage is provided across the source and gate on the TFT LCD panel 31. With this arrangement, electric charges (image data) charged in the liquid crystal display during the display period are not lost by electric discharge.

Figure 13:
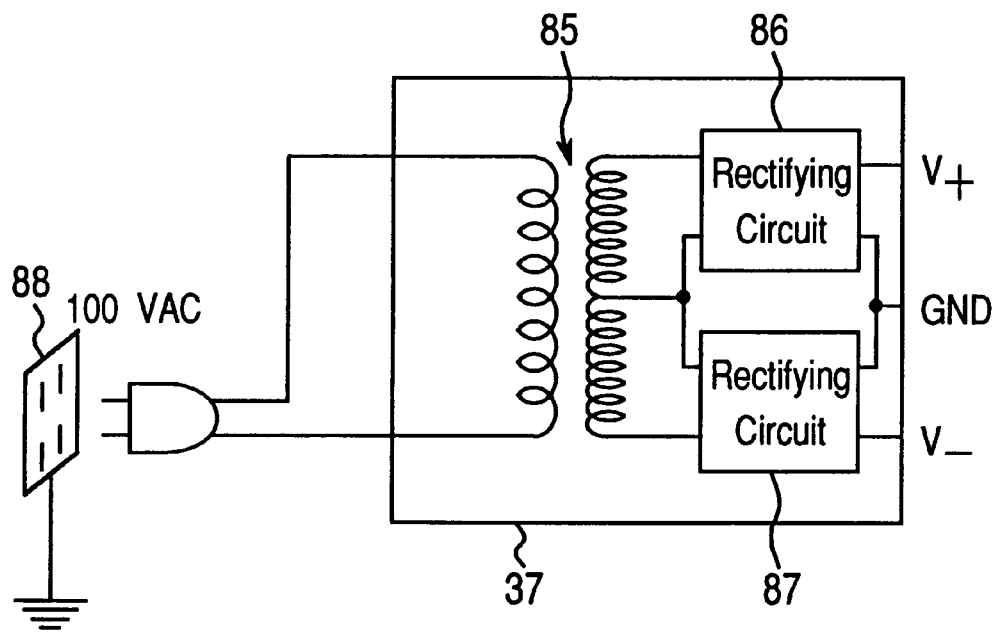
FIG. 13 is a circuit diagram of a part of a DC power supply circuit in FIG. 1.

The power supply circuit will be described next. FIG. 13 is a circuit diagram of the essential part of the DC power supply circuit 37. This DC power supply circuit 37 is a generally well-known transformer type DC power supply circuit, constructed roughly of a transformer 85 and rectifying circuits 86 and 87. The voltage of 100 VAC from a domestic electrical outlet 88 is divided by a transformer 85, and DC voltages $V_+$ and $V_-$ and GND are formed by the rectifying circuits 86 and 87.

Figure 14:
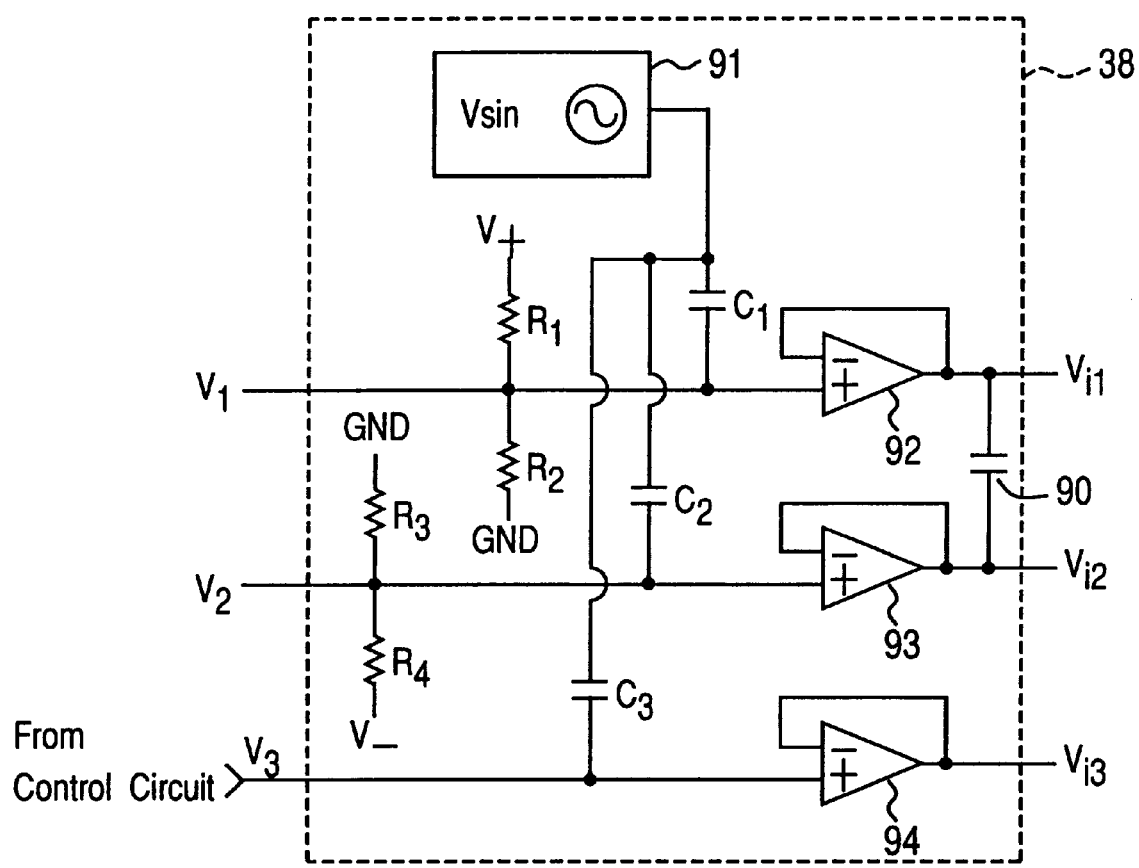
FIG. 14 is a circuit diagram showing an example of an AC applying circuit in FIG. 1.

FIG. 14 is a circuit diagram showing an example of the AC applying circuit 38.

An oscillation circuit 91 generates an excitation signal voltage Vsin of a sine wave. This excitation signal voltage Vsin is inputted to the non-inverted input terminal (+) of an operational amplifier 92 via a capacitor $C_1$. Likewise, the voltage is inputted to the non-inverted input terminal (+) of operational amplifiers 93 and 94 via capacitors $C_2$ and $C_3$. Further, a DC voltage $V_1$ of a desired potential obtained by dividing the potential across the DC voltage $V_+$ from the DC power supply circuit 37 and GND by resistors $R_1$ and $R_2$ is inputted to the non-inverted input terminal (+) of the operational amplifier 92. Likewise, a DC voltage $V_2$ of a desired potential obtained by dividing the potential across the DC voltage $V_-$ and GND from the DC power supply circuit 37 by resistors $R_3$ and $R_4$ is inputted to the non-inverted input terminal (+) of the operational amplifier 93. A control voltage $V_3$ from the control circuit 39 is inputted to the non-inverted input terminal (+) of the operational amplifier 94.

The inverted input terminals (−) of the operational amplifiers 92 through 94 are connected to output terminals. As a result, output voltages $V_{i1}$ and $V_{i2}$ obtained by superimposing the excitation signal voltage Vsin on the DC voltages $V_1$ and $V_2$ are outputted from the output terminals of the operational amplifiers 92 and 93. An output voltage $V_{i3}$ obtained by superimposing the excitation signal voltage Vsin on the control signal $V_3$ is outputted from the output terminal of the operational amplifier 94.

Figure 15A:
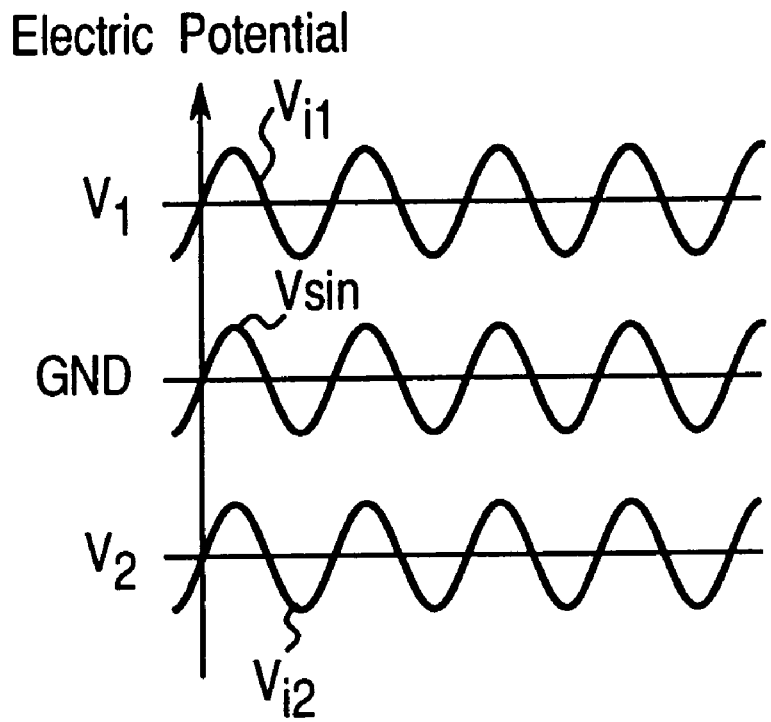
FIGS. 15A and 15B are charts showing output signal waveforms of the AC applying circuit shown in FIG. 14.
Figure 15B:
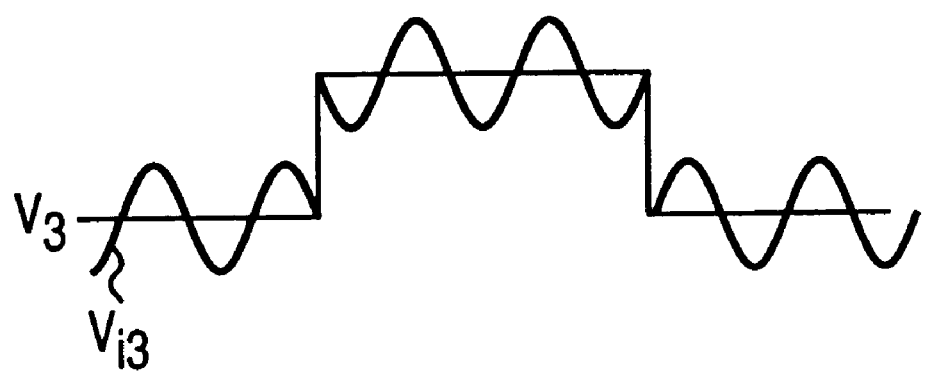

FIGS. 15A and 15B show the waveforms of the output signals $V_{i1}$, $V_{i2}$ and $V_{i3}$. FIG. 15A shows the output voltages $V_{i1}$ and $V_{i2}$ and Vsin, while FIG. 15B shows the output signal $V_{i3}$. As the output voltage $V_{i3}$ obtained by superimposing the excitation signal voltage Vsin on the control voltage $V_3$ from the control circuit 39, there are enumerated the x-detection period signal XDET, y-detection period signal YDET, first electrode selecting signal XSEL, second electrode selection signal YSEL, first clock XCK and second clock YCK to be supplied to the first electrode drive circuit 32 and the second electrode drive circuit 33. As the output voltages $V_{i1}$ and $V_{i2}$, there are AC voltages $V_S$ and $V_G$ applied to the non-selected electrodes Sns and Gns.

In this case, as the oscillation circuit 91, there is employed a circuit constructed of a Wien bridge oscillation circuit, a bridge-T-type oscillation circuit, a phase shift type CR oscillation circuit or a PLL (Phase-locked Loop) frequency demodulator. It is further acceptable to provide a filter for removing the higher harmonic components for a reduction in distortion ratio. The amplitude v of the excitation signal voltage Vsin can increase the detection current flowing through the selected electrodes Ss and Gs as the voltage is greater as described above. However, it is appropriate to set the voltage to several Vrms due to the limitation on the performance of the IC (integrated Circuit) such as the operational amplifier for amplifying the detection current and for the suppression of power consumption.

Figure 16:
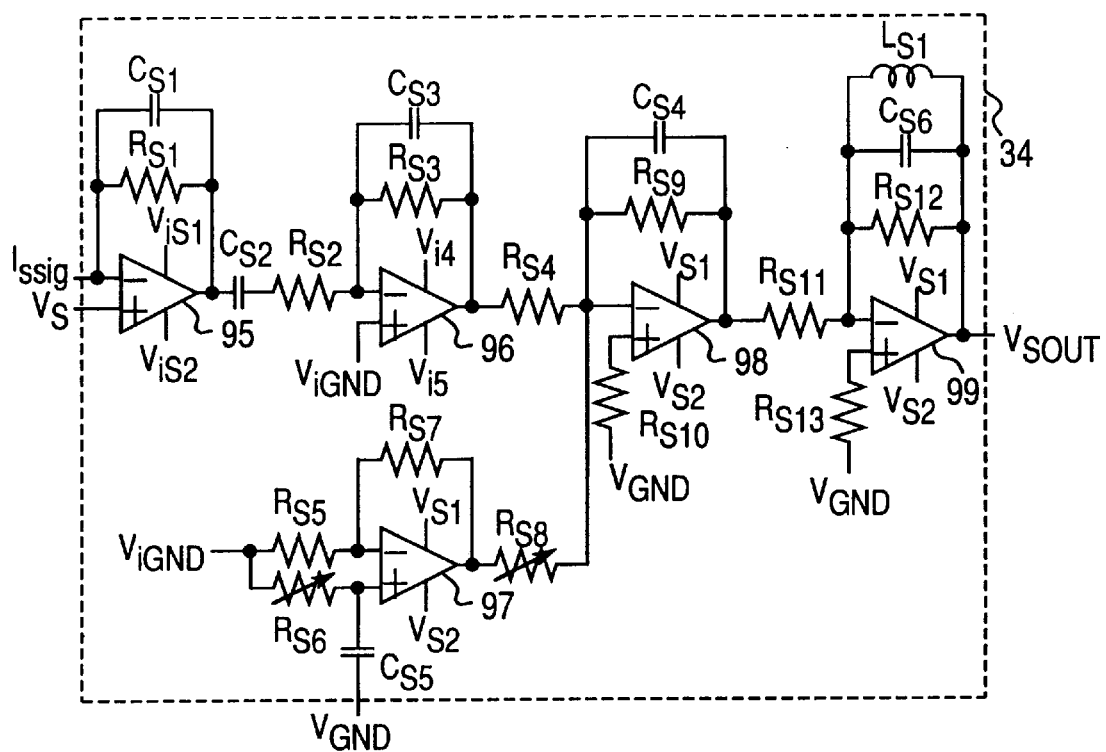
FIG. 16 is a circuit diagram showing an example of an x-signal current amplifying circuit in FIG. 1.

The current amplifying circuit will be described next. FIG. 16 is a circuit diagram showing an example of the x-signal current amplifying circuit 34. This x-signal current amplifying circuit 34 is constructed roughly of operational amplifiers 9S through 99, capacitors $C_{S1}$ through $C_{S6}$, resistors $R_{S1}$ through $R_{S13}$ and an inductance $L_{S1}$. A detection current $I_{Ssig}$ from the selected electrode Ss selected by the analog switches 67 through 71 of the first electrode drive circuit 32 is inputted to the inverted input terminal (−) of the operational amplifier 95.

To the non-inverted input terminal (+) of the operational amplifier 95 is inputted the same AC voltage $V_S$ as that applied to the non-selected electrode Sns. This arrangement is adopted so as to also set the potential at the inverted input terminal (−) to $V_S$ taking advantage of the fact that the input impedance of the operational amplifier 95 is high, thereby setting the potentials at all the source electrodes Sn to $V_S$ regardless of whether the electrodes are selected or non-selected. With this arrangement, the voltage across the gate and source of the TFT 44 whose source is connected to the selected electrode Ss is also kept at the cutoff voltage.

The operational amplifier 95 constitutes a current amplifying circuit for amplifying the detection current $I_{Ssig}$ inputted to the inverted input terminal (−). In this case, power voltages $V_{iS1}$ and $V_{iS2}$ of the operational amplifier 95 are the output voltages $V_{i1}$ and $V_{i2}$ obtained by superimposing the excitation signal voltage Vsin on the DC voltages $V_1$ and $V_2$ based on the outputs of the DC power supply circuit 37. Needless to say, the power voltages $V_{iS1}$ and $V_{iS2}$ are the positive potential and the negative potential with respect to the AC voltage $V_S$ inputted to the non-inverted input terminal (+), and the voltages coincide with the excitation signal voltage Vsin in terms of both amplitude and phase. As a result, the output voltage of the operational amplifier 95 is obtained by superimposing an infinitesimal detection voltage on the AC voltage $V_S$.

Next, for the sake of easy handling of the output voltage of the operational amplifier 95, the DC component is cut off by a capacitor $C_{S2}$ of the next stage. Then, the operational amplifier 96 executes voltage amplification using an excitation signal voltage $V_{iGND}$ (=Vsin) whose DC component is at the GND potential as a reference. Therefore, power voltages $V_{i4}$ and $V_{i5}$ of the operational amplifier 96 are the positive potential and the negative potential with respect to the excitation signal voltage $V_{iGND}$ inputted to the non-inverted input terminal (+), and the voltages coincide with the excitation signal voltage $V_{iGND}$ (=Vsin) in terms of both amplitude and phase.

Next, the excitation signal component is canceled for extracting a detection signal component included in the output voltage of the operational amplifier 96. For this purpose, the amplitude of the excitation signal voltage $V_{iGND}$ is adjusted to the amplitude of the excitation signal component of the output voltage of the operational amplifier 96, and thereafter a signal voltage obtained by inverting its phase is applied as described below.

That is, the excitation signal voltage $V_{iGND}$ is inputted to the inverted input terminal (−) of the operational amplifier 97 via a resistor $R_{S5}$. On the other hand, the excitation signal voltage $V_{iGND}$ is inputted to the non-inverted input terminal (+) via a variable resistor $R_{S6}$, and the terminal is connected to $V_{GND}$ (i.e., DC GND) via a capacitor $C_{S5}$. Then, the phase of the excitation signal voltage $V_{iGND}$ inputted to the non-inverted input terminal (+) is shifted by adjusting the variable resistor $R_{S6}$, while the amplitude is adjusted by a variable resistor $R_{S8}$ connected to the output terminal. A thus-generated signal voltage that has an inverted phase and the same amplitude as that of the excitation signal component of the output voltage of the operational amplifier 96 is inputted to the inverted input terminal (−) of the operational amplifier 98 while being added to the output voltage of the operational amplifier 96.

As a result, a voltage signal having no excitation signal component is obtained from the output terminal of the operational amplifier 98. The voltage signal is amplified again by the operational amplifier 99 and put through a band-pass filter constructed of the inductance $L_{S1}$ and the capacitor $C_{S6}$ in order to improve the signal-to-noise ratio, thereby obtaining an output voltage $V_{SOUT}$. This voltage signal $V_{SOUT}$ is transmitted as the x-coordinate detection voltage to the coordinate detection circuit 36.

In this case, the non-inverted input terminals (+) of the operational amplifiers 98 and 99 are connected to the DC GND via input resistors $R_{S10}$ and $R_{S13}$, respectively. The power voltage of the operational amplifiers 97, 98 and 99 are DC voltages $V_{S1}$ and $V_{S2}$, which have positive and negative potentials with respect to the DC GND. The capacitors $C_{S1}$, $C_{S3}$ and $C_{S4}$ suppress the oscillation of the operational amplifiers 95, 96 and 98, respectively.

Figure 17:
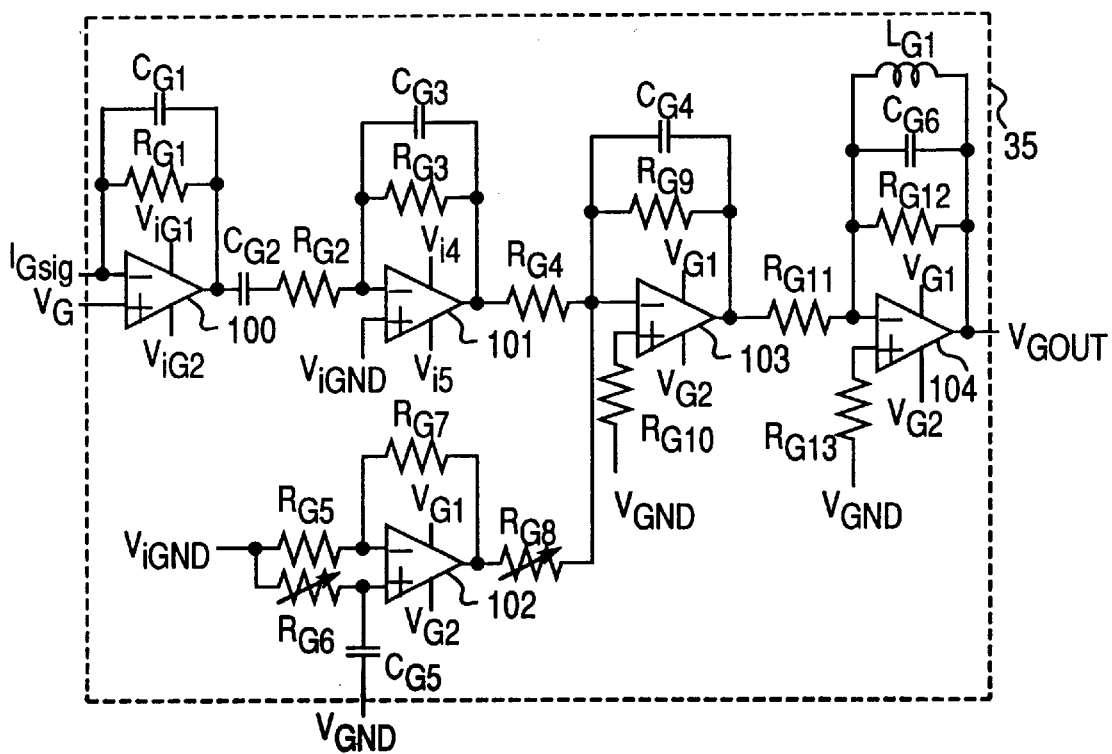
FIG. 17 is a circuit diagram showing an example of a y-signal current amplifying circuit in FIG. 1.

FIG. 17 is a circuit diagram showing an example of the y-signal current amplifying circuit 35. This y-signal current amplifying circuit 35 has quite the same construction as that of the x-signal current amplifying circuit 34 shown in FIG. 16, and it is constructed roughly of operational amplifiers 100 through 104, capacitors $C_{G1}$ through $C_{G6}$, resistors $R_{G1}$ through $R_{G13}$ and an inductance $L_{G1}$. A detection current $I_{Gsig}$ from the selected electrode Gs selected by the analog switches 78 through 82 of the second electrode drive circuit 33 is inputted to the inverted input terminal (−) of the operational amplifier 100. To the non-inverted input terminal (+) is inputted the AC voltage $V_G$ identical to that applied to the non-selected electrode Gns.

The y-signal current amplifying circuit 35 constructed as above operates utterly similarly to the x-signal current amplifying circuit 34, consequently outputting a voltage signal $V_{GOUT}$ from the output terminal of the operational amplifier 104. Then, this voltage signal $V_{GOUT}$ is transmitted as the y-coordinate detection voltage to the coordinate detection circuit 36.

Figure 18:
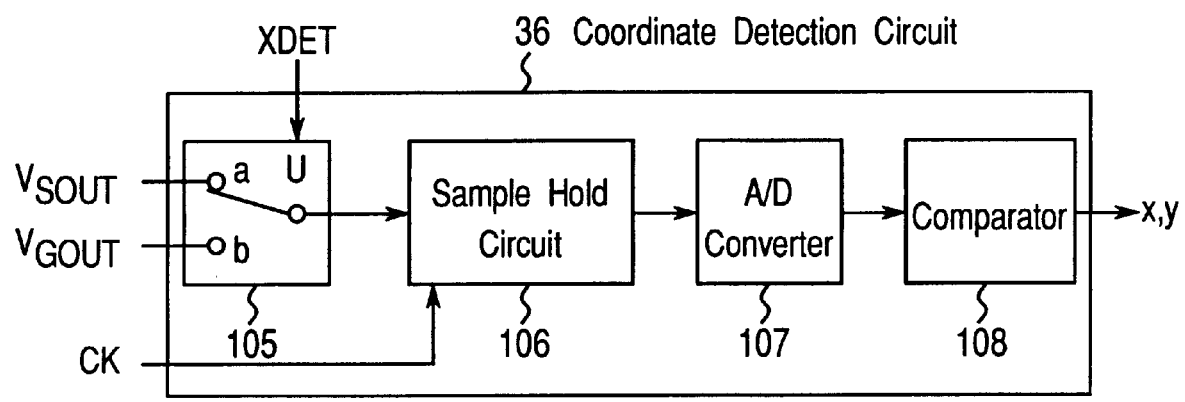
FIG. 18 is a circuit diagram showing an example of a coordinate detection circuit in FIG. 1.

The coordinate detection circuit 36 will be described next. FIG. 18 is a circuit diagram showing an example of the coordinate detection circuit 36. This coordinate detection circuit 36 is constructed roughly of an analog switch 105, a sample hold circuit 106, an A/D converter 107 and a comparator 108.

To the control terminal U of the analog switch 105 is inputted the x-detection period signal XDET which dose not include the excitation signal voltage Vsin outputted from the control circuit 39. In the case where the level of the x-detection period signal XDET is at "H" (i.e., in the case of x-coordinate detection period), the analog switch 105 is switched and connected to the terminal "a" side, thereby transmitting the x-coordinate detection voltage $V_{SOUT}$ from the x-signal current amplifying circuit 34 to the sample hold circuit 106. In the case where the signal level is at "L" (i.e., in the case of y-coordinate detection period), the analog switch 105 is switched and connected to the terminal "b" side, thereby transmitting the y-coordinate detection voltage $V_{GOUT}$ from the y-signal current amplifying circuit 35 to the sample hold circuit 106.

To the sample hold circuit 106 is inputted a clock CK outputted from the control circuit 39. Then, the x-coordinate detection voltage $V_{SOUT}$ or the y-coordinate detection voltage $V_{GOUT}$ inputted from the analog switch 105 is sampled and held every specified number of clocks. In this case, the timing of the specified number of clocks is set to a time at which the x-coordinate detection voltage $V_{SOUT}$ or the y-coordinate detection voltage $V_{GOUT}$ takes the extreme value as described before. Therefore, the sample hold circuit 106 outputs the absolute value Pn of the x-coordinate detection voltage $V_{SOUT}$ or the y-coordinate detection voltage $V_{GOUT}$ in the n-th (n:natural number) sample hold stage to the A/D converter 107.

Figure 19:
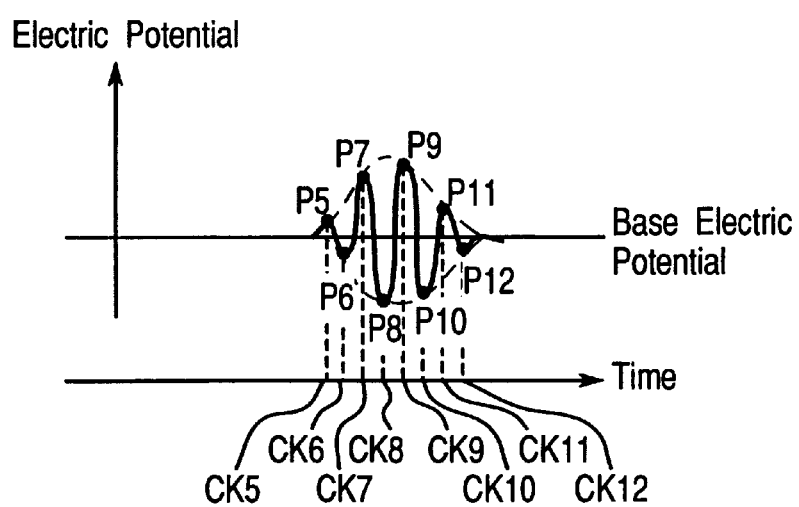
FIG. 19 is a chart showing the waveform of an x-coordinate detection voltage or a y-coordinate detection voltage to be inputted to a sample hold circuit in FIG. 18.

The absolute value Pn is a difference between the base potential and the x-coordinate detection voltage $V_{SOUT}$ or the y-coordinate detection voltage $V_{GOUT}$. In this case, each of the x-coordinate detection voltage $V_{SOUT}$ or the y-coordinate detection voltage $V_{GOUT}$ has a waveform as shown in FIG. 19. The A/D converter 107 subjects the signal voltage from the sample hold circuit 106 to analog-to-digital conversion and outputs the digital value PDn and the number of clocks CKn until the sample hold stage of the signal voltage Pn to the comparator 108.

The comparator 108 sequentially compares the inputted digital value PDn to obtain the maximum value every coordinate detection period and calculates the one-dimensional coordinate value in the position designated by the finger from the number of clocks CKn at the maximum value. By sequentially executing the calculation of the one-dimensional coordinate value for the x-coordinate detection voltage $V_{SOUT}$ and the y-coordinate detection voltage $V_{GOUT}$, the coordinates (x, y) designated by the finger is obtained and outputted.

To obtain the above one-dimensional coordinate value more accurately, it is proper to approximate the waveform obtained by the digital value PDn from the A/D converter 107 to a curve. For example, a waveform obtained by the digital value PDn is approximated to a quadratic curve utilizing the method of least squares, and the peak position of this obtained quadratic curve is made to be the one-dimensional coordinate value. With this arrangement, the resolution can be made finer than the half cycle of the excitation signal. Such a curve approximation calculation or a peak position detection calculation should be executed by a CPU (Central Processing Unit) or the like for controlling the entire display-integrated type coordinate input device on the basis of the digital value PDn outputted from the A/D converter 107.

Figure 20:
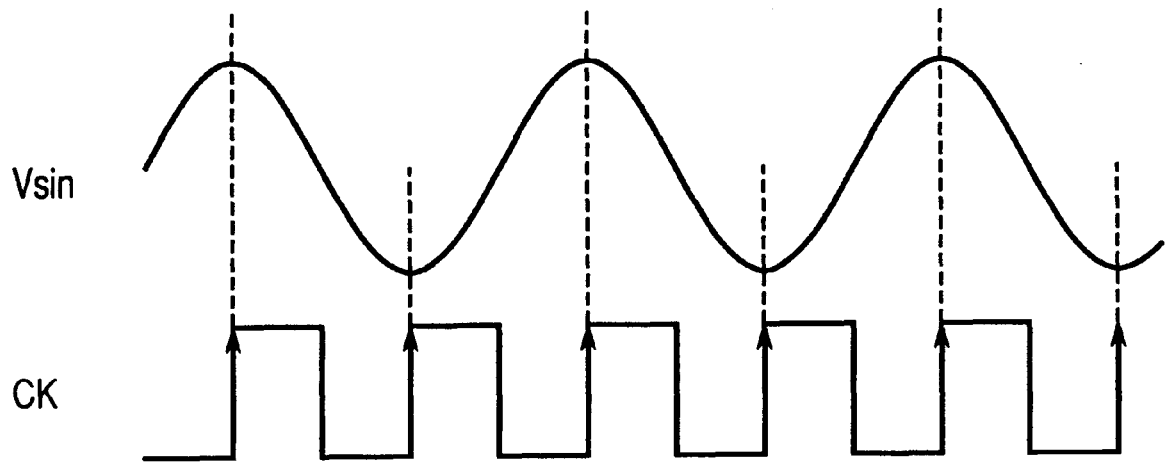
FIG. 20 is a timing chart of a clock inputted to the sample hold circuit and an excitation signal voltage in FIG. 18.

In this case, the frequency of the clock CK is set double the frequency of the excitation signal voltage Vsin. The excitation signal voltage Vsin and the clock CK are made to synchronize with each other. With this arrangement, the peak of the excitation signal voltage Vsin appears every specified number of clocks. For example, assuming that the frequency of the excitation signal voltage Vsin is 100 kHz, then the peak of the excitation signal voltage Vsin appears every 5 $\mu$sec. Then, by adjusting the phase of the excitation signal voltage Vsin to 90 degrees at the time of starting the x-coordinate detection period and the y-coordinate detection period, the peak will appear after n×5 $\mu$sec (n:natural number) from the start of coordinate detection. Assuming that the frequency of the clock CK is 200 kHz, then one cycle of the clock CK is 5 $\mu$sec. If the clock CK is synchronized at the time of starting coordinate detection, it can be found that the peak of the excitation signal voltage Vsin exists at the n-th clock. A timing chart of the excitation signal voltage Vsin and the clock CK in this case is shown in FIG. 20.

Although the above has described coordinate input by a finger, it is of course possible to execute coordinate input in a similar manner also by designating a point on the surface of the TFT LCD panel 31 by a conductor pen held by the operator's hand.

As described above, in the first embodiment, one frame is time-sharingly divided into the coordinate detection period and the display period according to the coordinate detection cycle signal from the control circuit 39. Then, in the display period, the image signal and the control signal are transmitted from the panel control circuit 40 to the first electrode drive circuit 32 and the second electrode drive circuit 33. Then, similarly to the conventionally well-known TFT LCD device, the source electrode Sn of the TFT LCD panel 31 is driven by the first electrode drive circuit 32, while the gate electrode Gm is driven by the second electrode drive circuit 33, consequently displaying an image on the TFT LCD panel 31.

During the coordinate detection period, the x-detection period signal XDET and the control signal are transmitted from the panel control circuit 40 to the first electrode drive circuit 32, while the y-detection period signal YDET and the control signal are transmitted to the second electrode drive circuit 33. Then, the first electrode drive circuit 32 sequentially scans the source electrodes Sn of the TFT LCD panel 31 from n=1 to n=N during the x-coordinate detection period to connect the selected electrode Ss to the x-signal current amplifying circuit 34, while applying the AC voltage $V_S$ obtained by superimposing the excitation signal voltage Vsin on the DC voltage from the DC power supply circuit 37 by the AC applying circuit 38 to the non-selected electrodes Sns.

Then, the selected electrode Ss is grounded via the human body in terms of alternating current, while a current corresponding in magnitude to the distance between the selected electrode Ss and the finger flows through the selected electrode Ss since the DC power supply circuit 37 is grounded via the electrical outlet. This current is subjected to current amplification and voltage amplification in the x-signal current amplifying circuit 34 and thereafter a difference between the resulting signal and the excitation signal voltage Vsin is taken to obtain the x-coordinate detection voltage $V_{SOUT}$.

During the y-coordinate detection period, the second electrode drive circuit 33 sequentially scans the gate electrodes Gm to connect the selected electrode Gs to the y-signal current amplifying circuit 35 similarly to the first electrode drive circuit 32 that operates during the x-coordinate detection period, while applying the AC voltage $V_G$ obtained by superimposing the excitation signal voltage Vsin on the DC voltage to the non-selected electrodes Gns. Then, a current that has a magnitude corresponding to a distance to the finger and flows through the selected electrode Gs is subjected to current amplification and voltage amplification in the y-signal current amplifying circuit 35 and thereafter a difference between the resulting signal and the excitation signal voltage Vsin is taken to obtain the y-coordinate detection voltage $V_{GOUT}$. Then, the peak of the x-coordinate detection voltage $V_{SOUT}$ is obtained by the coordinate detection circuit 36, and the x-coordinate value in the designated position is obtained on the basis of the scanning time from the start of x-coordinate detection to the above peak. On the other hand, the peak of the y-coordinate detection voltage $V_{GOUT}$ is obtained to obtain the y-coordinate value of the designated position on the basis of the scanning time from the start of the y-coordinate detection to the above peak.

That is, according to the present embodiment, the TFT LCD panel 31, the first electrode drive circuit 32 and the second electrode drive circuit 33 are concurrently used by the image display device and the coordinate detection device, thereby allowing the coordinates designated by the finger or the conductor pen to be detected and displayed. This arrangement can avoid the occurrence of the problems of an increase in the number of components, a cost increase, a deterioration in visibility, an increase in thickness of the device and so on as observed in the case where a display-integrated type tablet is constructed by laminating the image display device with the coordinate detection device.

The above arrangement necessitates no cable for transmitting the detection signal from the pen tip electrode to the main body side as in the display-integrated type tablet device disclosed in the prior art reference of Japanese Patent Laid-Open Publication No. HEI 5-53726, therefore allowing the operability of the pen to be improved. The above arrangement also obviates the need for the mounting of the pen with an oscillation circuit and a battery as in the touch panel and transparent digitizer disclosed in the prior art reference of Japanese Patent Laid-Open Publication No. HEI 8-179871. This arrangement is consequently free from battery replacement.

In the present embodiment, the values relevant to the electrostatic coupling capacitance of the finger and the electrodes Sn and Gm are directly detected. Therefore, the coordinates designated by the finger can be detected with high accuracy as compared with the case where the change in electrostatic coupling capacitance between the electrodes of the two types that are perpendicular to each other due to the existence of the finger is detected as in the prior art reference of Japanese Patent Laid-Open Publication No. HEI 8-179871.

In the present embodiment, the excitation signal voltage Vsin is superimposed on all the signal voltages inputted to the TFT LCD panel 31 during the coordinate detection period including not only the AC voltages $V_S$ and $V_G$ applied to the non-selected electrodes Sns and Gns but also the x-detection period signal XDET and the y-detection period signal YDET, first electrode selecting signal XSEL, second electrode selection signal YSEL, first clock XCK and second clock YCK serving as the detection control signal. Therefore, even though the electrostatic coupling capacitance exists between the electrodes and wiring lines on the TFT LCD panel 31 and both the electrode drive circuits 32 and 33, there is no possibility of the occurrence of phase rotation of the AC voltages $V_S$ and $V_G$ applied to the non-selected electrodes Sns and Gns. Furthermore, the path connecting the finger and the ground is one path via the human body. Accordingly, there is no phase difference between the inputs to the inverted input terminal and the non-inverted input terminal of the amplifier in the current amplification of the first stages of the x-signal current amplifying circuit 34 and the y-signal current amplifying circuit 35, so that a high detection value can be obtained, thereby allowing the designated coordinates to be correctly detected.

In the above embodiment, with regard to the AC voltages $V_S$ and $V_G$ applied to the non-selected electrodes Sns and Gns during the coordinate detection period, the value ($V_S$–$V_G$) is set so that a cutoff voltage appears between the source and gate of the TFT 44 on the TFT LCD panel 31, and therefore, the electric charges (i.e., image data) charged in the liquid crystals during the display period are not lost by electric discharge.

Furthermore, the frequency $f_1$ of the excitation signal voltage Vsin superimposed on the DC voltage from the DC power supply circuit 37 by the AC applying circuit 38 is made to be a frequency $f_0$ at which the impedance Zc of the DC power supply circuit 37 is minimized or a frequency near to the frequency $f_0$. With this arrangement, the total impedance of the current path can be decreased to allow the current value of the detection signal to be increased. This improves the signal-to-noise ratio to allow highly accurate coordinate detection to be achieved.

The x-signal current amplifying circuit 34 and the y-signal current amplifying circuit 35 generate the AC signal that has the same amplitude as that of the excitation signal voltage Vsin superimposed on the detection signal and is inverted phase by means of the operational amplifiers 97 and 102 and add this generated AC signal to the above detection signal. This arrangement can remove the AC voltage component superimposed on the detection signal to thereby allow the detection signal to be handled in a DC manner in the subsequent stages, consequently simplifying the detection signal processing. That is, in the above embodiment, the operational amplifiers 97 and 102 constitute an AC component removing means.

The coordinate detection circuit 36 has the sample hold circuit 106 and samples and holds the x-coordinate detection voltage $V_{SOUT}$ and the y-coordinate detection voltage $V_{GOUT}$ in synchronization with the clock CK synchronized with the excitation signal voltage Vsin. This arrangement can consistently sample and hold the peaks of the x-coordinate detection voltage $V_{SOUT}$ and the y-coordinate detection voltage $V_{GOUT}$ and improve the signal-to-noise ratio, thereby allowing highly accurate coordinate detection to be achieved.

Although the above embodiment has been described taking the example in which the TFT LCD panel 31 is used as a display panel, the present invention is not limited to this. The present invention can also be applied to, for example, an STN (Supertwisted Nematic) liquid crystal display, a plasma display or an EL (Electro Lunimescence) display in which electrodes for display use are arranged in a matrix form.

When scanning the source electrodes Sn or the gate electrodes Gm, it is rather easy to handle the detection current by simultaneously scanning a plurality of selected electrode Ss or Gs because the current increases to a certain extent as described before. In particular, the product of the pitch and the number of the electrodes Sn and Gm preferably becomes approximately equal to the width of the fingertip. Assuming that the electrodes Sn and Gm are arranged at intervals of, for example, 0.2 mm, then the signal-to-noise ratio can be improved by collectively scanning 50 to 150 electrodes since the human fingertip has a width range of about 10 mm to 30 mm although it varies depending on the size of the body.

Since the thick of the finger is pressed against the display surface when placed on the TFT LCD panel 31, the distance between the electrodes Sn and Gm and the finger becomes same throughout the entire width of the finger, and the electrostatic coupling capacitance becomes approximately equal. Therefore, if the number of selected electrodes Ss and Gs is gradually increased until the width of all the selected electrodes reaches the width of the finger, then the detection current value increases in proportion to the number of source electrodes. However, when the width of all the selected electrodes exceeds the width of the finger, the detection current value will not increase even though the number of selected electrodes is increased. On the other hand, the resolution deteriorates when the number of selected electrodes is increased. For the above reasons, the detection accuracy becomes the best when the total width of all the selected electrodes is about the width (10 mm to 30 mm) of the finger.

In regard to the output voltages of the AC applying circuit 38, particularly if the voltage signals based on the output voltages $V_{i1}$ and $V_{i2}$ obtained by superimposing the excitation signal voltage Vsin on the DC voltages $V_1$ and $V_2$ do not coincide with each other in terms of phase and amplitude, the difference is disadvantageously amplified to deteriorate the signal-to-noise ratio. Particularly, the AC voltages $V_S$ and $V_G$ are inputted to the operational amplifiers 95 and 100 of the first stage of the x-signal current amplifying circuit 34 and the y-signal current amplifying circuit 35, and therefore, a minute variance of the AC voltages $V_S$ and $V_G$ is significantly amplified disadvantageously. Therefore, as shown in FIG. 14, it is preferable to directly connect the output voltages $V_{i1}$ and $V_{i2}$ of the AC applying circuit 38 to each other via a capacitor 90 of a large capacity. With this arrangement, the AC voltages $V_S$ and $V_G$ come to have the identical phase and amplitude in terms of alternating current, consequently improving the signal-to-noise ratio. Although the above embodiment employs the transformer type DC power supply circuit as the DC power supply circuit 37, it is preferable to promote the compactness by utilizing a DC-to-DC converter.

Figure 21:
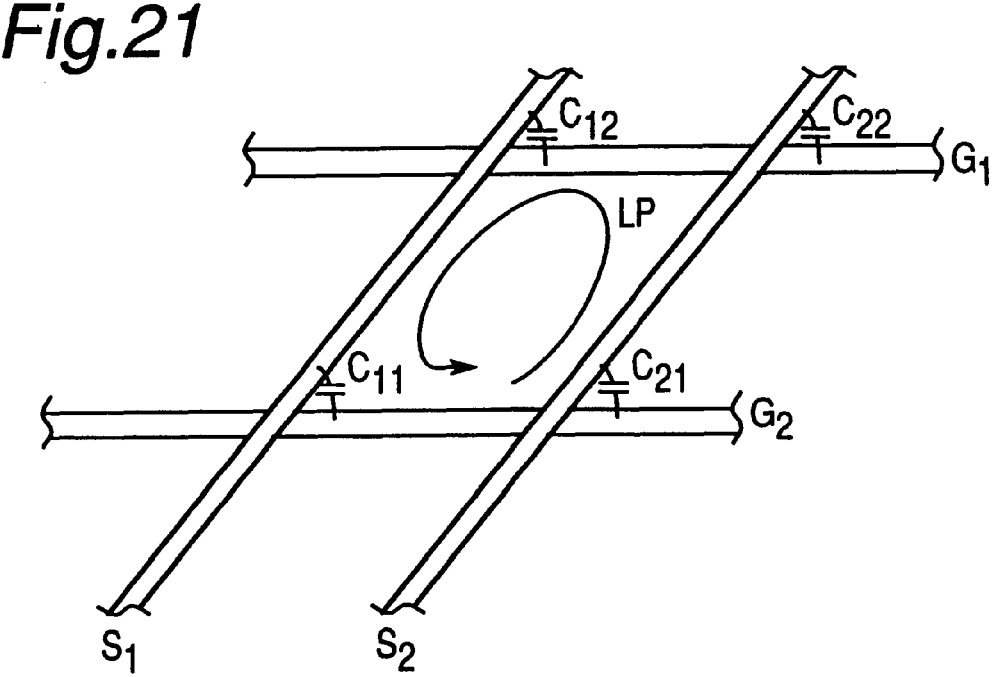
FIG. 21 is an explanatory view of a loop formed by electrostatic coupling between the source electrodes and the gate electrodes of a TFT LCD panel in FIG. 1.

In the above embodiment, as shown in FIG. 21, the source electrodes S1 and S2 and the gate electrodes G1 and G2 are coupled with each other at the intersection positions via electrostatic capacitances $C_{11}$, $C_{12}$, $C_{21}$ and $C_{22}$, forming a loop LP. Then, the electrostatic capacitances $C_{11}$, $C_{12}$, $C_{21}$ and $C_{22}$ are relatively great since the source electrodes Sn and the gate electrodes Gm are located at a very short distance of, for example, several micrometers. Therefore, when a magnetic flux penetrates so as to intersect the loop LP, an electromotive force is generated in the loop LP. This electromotive force is detected as a noise, deteriorating the signal-to-noise ratio. Therefore, it is preferable to arrange a loop in an electrically floated state so that the loop surrounds at least the TFT LCD panel 31 and cancel the influence of the external magnetic flux by the electromotive force of the loop for the improvement of the signal-to-noise ratio.

The above embodiment has been described taking the display-integrated type coordinate input device that concurrently has an image display function and a coordinate input function as an example. However, the present invention can also be applied to a coordinate input device having no image display function. In such a case, the same coordinate input effect as that of the aforementioned display-integrated type coordinate input device can be produced.

In the above first embodiment, as shown in FIG. 6, the coordinate detection period is divided into two periods of the x-coordinate detection period and the y-coordinate detection period by outputting the x-detection period signal XDET for the first electrode drive circuit 32 and subsequently outputting the y-detection period signal YDET for the second electrode drive circuit 33 from the panel control circuit 40 during the coordinate detection period. In this case, in order to execute display without flicker, there is naturally a limitation on the coordinate detection period. On the other hand, there must be a drive time not shorter than a certain time for driving one electrode. Accordingly, there is a limitation on the total number of electrodes that can be driven during the coordinate detection period. Under such limitations, dividing the coordinate detection period into the two periods of the x-coordinate detection period and the y-coordinate detection period means a decrease in the number of coordinates that can be detected during the coordinate detection period.

When there is a small number of coordinates that can be detected during the coordinate detection period, the trace of the coordinate point when moving the finger is not smooth, causing a degradation in the user's sense of use. When using the coordinate input device as an input device for a character recognizing apparatus, there is degradation in character recognition rate. If the coordinate detection period is prolonged attaching greater importance to the user's sense of use and the improvement of the character recognition rate, the frame length is also prolonged, causing a flicker in display and a consequent reduction in visibility. Furthermore, a response time from the touching of the finger to the display of the coordinate point is disadvantageously reduced.

Figure 22:
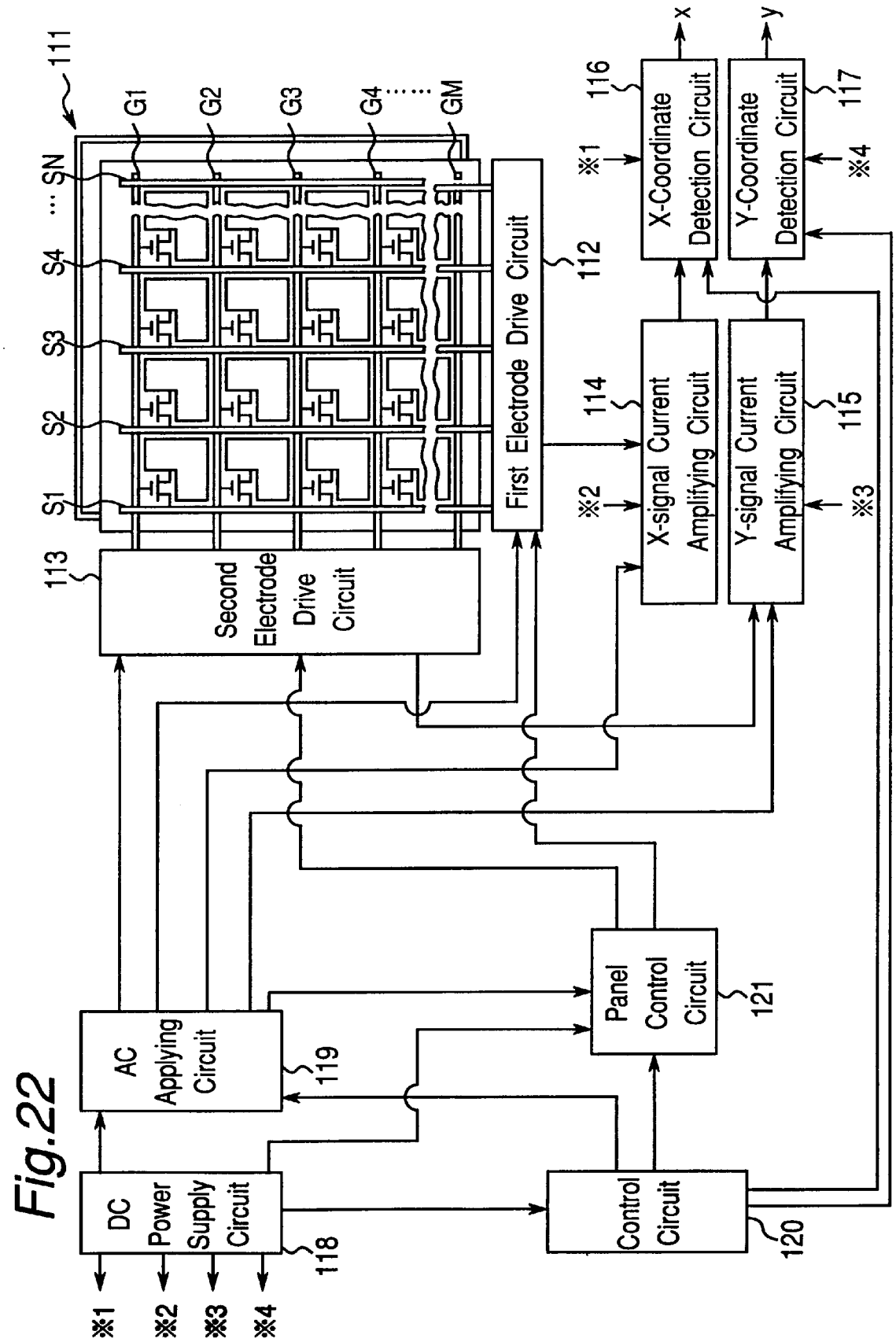
FIG. 22 is a block diagram of a display-integrated type coordinate input device different from that of FIG. 1.

FIG. 22 is a block diagram of a display-integrated type coordinate input device according to a second embodiment. This display-integrated type coordinate input device is a display-integrated type coordinate input device that copes with the problem of the coordinate detection period as described above. In FIG. 22, a display panel 111, a first electrode drive circuit 112, a second electrode drive circuit 113, an x-signal current amplifying circuit 114, a y-signal current amplifying circuit 115, a DC power supply circuit 118, an AC applying circuit 119, a control circuit 120 and a panel control circuit 121 have the same basic constructions and basic operations as those of the display panel 31, first electrode drive circuit 32, second electrode drive circuit 33, x-signal current amplifying circuit 34, y-signal current amplifying circuit 35, DC power supply circuit 37, AC applying circuit 38, control circuit 39 and panel control circuit 40 shown in FIG. 1.

In the present embodiment, the coordinate detection circuit is provided while being separated into an x-coordinate detection circuit 116 for x-coordinate detection use and a y-coordinate detection circuit 117 for y-coordinate detection use. Then, specified currents and voltages are supplied from the DC power supply circuit 118 to both the detection circuits 116 and 117, and the x-coordinate value and the y-coordinate value are obtained independently from each other on the basis of an x-coordinate detection voltage from the x-signal current amplifying circuit 114 and a y-coordinate detection voltage from the y-signal current amplifying circuit 115, respectively.

Figure 23:
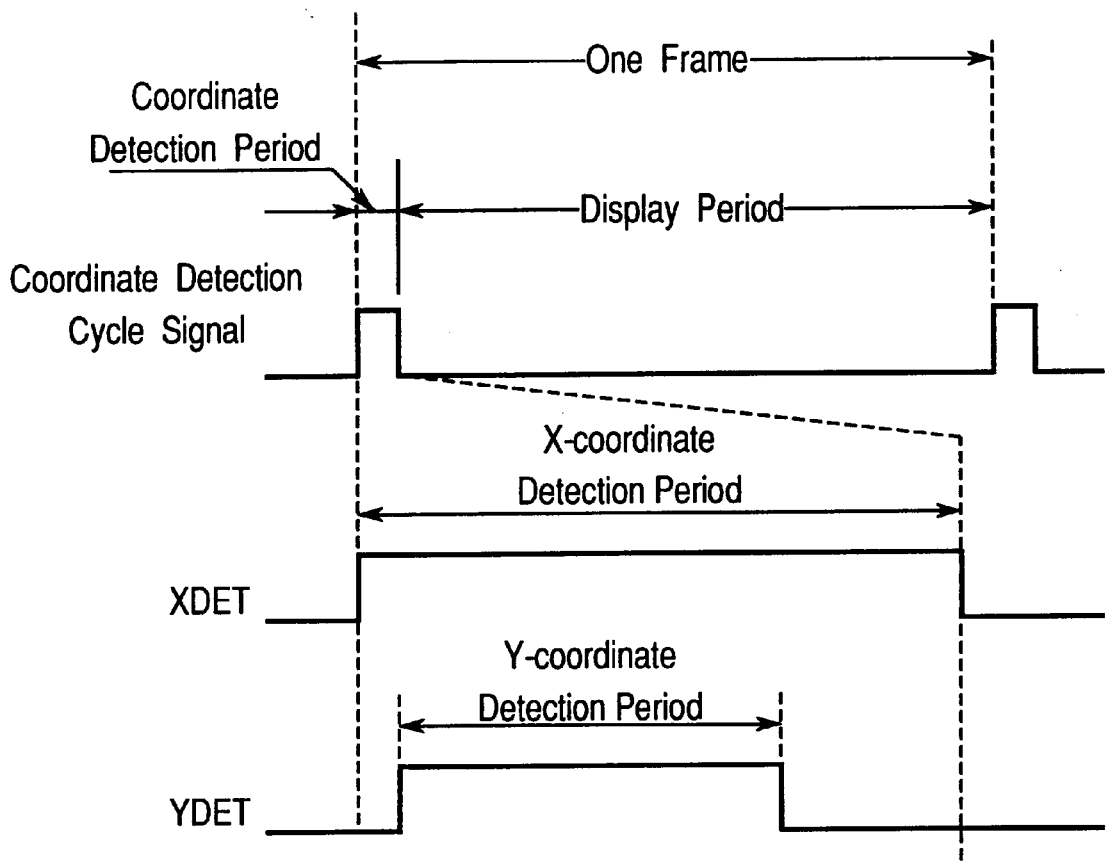
FIG. 23 is a timing chart showing the operation timing of the display-integrated type coordinate input device shown in FIG. 22.

FIG. 23 is an operation timing chart of the display-integrated type coordinate input device set by a coordinate detection cycle signal supplied from the control circuit 120 to the panel control circuit 121, an x-detection period signal XDET outputted from the panel control circuit 121 to the first electrode drive circuit 112 and a y-detection period signal YDET outputted from the panel control circuit 121 to the second electrode drive circuit 113.

As is apparent from FIG. 23, in the present embodiment, the x-coordinate detection period and the y-coordinate detection period are set so that a mutually overlapping period exists. By thus making the x-coordinate detection period and the y-coordinate detection period overlap each other, the coordinate detection period is reduced (assuming that the coordinate detection period is the same as in the case of FIG. 6, then the number of coordinate detection points is increased). In such a case, it is preferable not to make the start point of the x-coordinate detection period coincide with the start point of the y-coordinate detection period.

The reason for the above is as follows. That is, at the time of starting x-coordinate detection, the x-signal current amplifying circuit 114 and the x-coordinate detection circuit 116 start to operate, and therefore, a current newly starts to flow from the DC power supply circuit 118 and the AC applying circuit 119 to the x-signal current amplifying circuit 114 and the x-coordinate detection circuit 116. A rush current occurring at the time of starting the x-coordinate detection exerts a bad influence on the x-coordinate detection circuit 116, causing a noise appearing on the detection signal. Likewise, a rush current is also generated at the time of starting the y-coordinate detection, causing a noise appearing on the detection signal. Therefore, if the x-coordinate detection and y-coordinate detection are started simultaneously, both the rush currents join each other, amplifying the above noises.

As described in conjunction with the first embodiment, when the source electrode Sn is selected, the AC voltages $V_S$ and $V_G$ on which the excitation signal voltage Vsin is superimposed are originally applied to the non-selected source electrodes S1, . . . , Sn−1, Sn+1, . . . , SN and the non-selected gate electrodes G1, . . . , GM. Likewise, when the gate electrode Gm is selected, the AC voltages $V_S$ and $V_G$ on which the excitation signal voltage Vsin is superimposed are applied to the non-selected gate electrodes G1, . . . , Gm−1, Gm+1, . . . , GM and the non-selected source electrodes S1, . . . , SN. Therefore, even though the gate electrode Gm is simultaneously selected when, for example, the source electrode Sn is selected, the gate electrodes to which the AC voltage $V_G$ is applied are reduced in number by one. Therefore, no great change that causes a detection error appears in the current of the selected electrode Sn is generated. Even when a plurality of electrodes are simultaneously selected, the gate electrodes to which the AC voltage $V_G$ is applied are reduced in number only by 2 to 150. Therefore, no great change that causes a detection error in the current of the selected electrode Sn is generated. Therefore, even when a period during which the x-coordinate detection period and the x-coordinate detection period overlap each other exists, no problem occurs.

Figure 24:
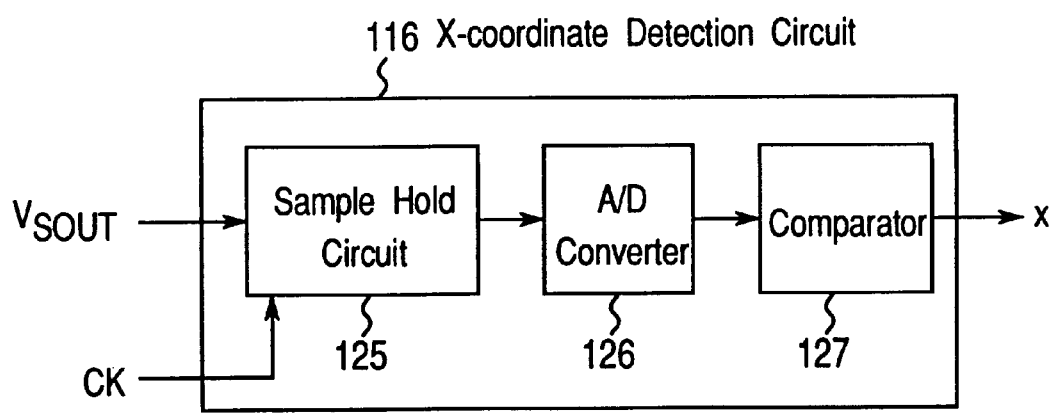
FIG. 24 is a circuit diagram showing an example of an x-coordinate detection circuit in FIG. 22.
Figure 25:
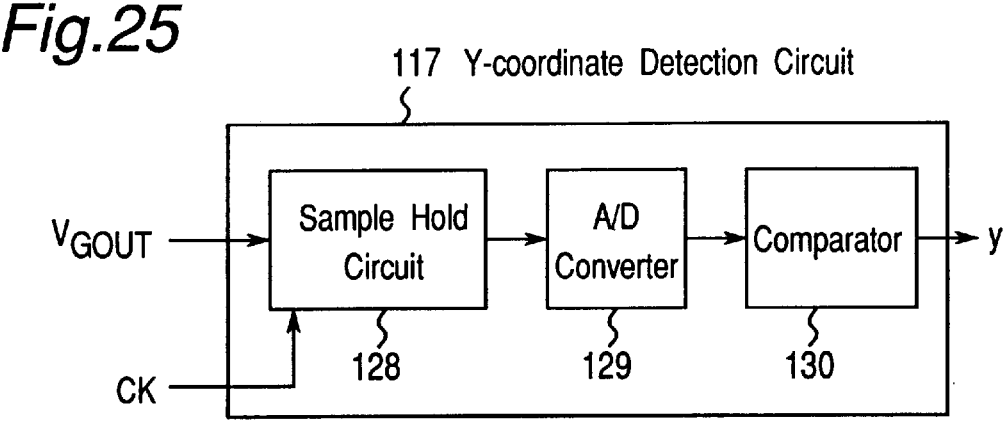
FIG. 25 is a circuit diagram showing an example of a y-coordinate detection circuit in FIG. 22.

FIG. 24 is a block diagram of the x-coordinate detection circuit 116, while FIG. 25 is a block diagram of the y-coordinate detection circuit 117. Both the coordinate detection circuits 116 and 117 have a construction in which the analog switch 105 for switching between the x-coordinate detection voltage $V_{SOUT}$ from the x-signal current amplifying circuit 34 and the y-coordinate detection voltage $V_{GOUT}$ from the y-signal current amplifying circuit 35 is removed from the coordinate detection circuit 36 shown in FIG. 18. Sample hold circuits 125 and 128, A/D converters 126 and 129 and comparators 127 and 130 operate similarly to the sample hold circuit 106, A/D converter 107 and the comparator 108 shown in FIG. 18 so as to sample hold the peaks of the coordinate detection voltages $V_{SOUT}$ and $V_{GOUT}$, subject the voltages to analog-to-digital conversion, obtain the coordinate values x and y and output the resulting values. Thus by independently obtaining the x-coordinate value and the y-coordinate value on the basis of the x-coordinate detection voltage $V_{SOUT}$ and the y-coordinate detection voltage $V_{GOUT}$ by the two coordinate detection circuits 116 and 117, the x-coordinate detection period and the y-coordinate detection period can overlap each other.

As described above, in the second embodiment, the coordinate detection circuit is provided while being separated into the x-coordinate detection circuit 116 for x-coordinate detection use and the y-coordinate detection circuit 117 for y-coordinate detection use, and the x-coordinate detection period and the y-coordinate detection period are set so that there exists a period during which the x-coordinate detection period and the y-coordinate detection period overlap each other by means of the control circuit 120 and the panel control circuit 121. Therefore, the coordinate detection period in the first embodiment can be reduced to approximately a half. Therefore, the response time from the touching of the finger to the display of the coordinate point can be reduced, so that the influence on the flicker is reduced to allow the visibility to be increased.

If the coordinate detection period is set identical to the case of the first embodiment (FIG. 6), the number of detectable coordinate points can be increased. Therefore, in such a case, the trace of the coordinate point when moving the finger can be smoothed to allow the user's sense of use to be improved. Furthermore, when using the coordinate input device as an input device for a character recognizing apparatus, a high character recognition rate can be obtained.

A third embodiment that can detect with high accuracy a current flowing through the selected electrodes Ss and Gs in the aforementioned embodiments will be described next. In the equivalent circuit of the coordinate detection system shown in FIG. 3, as the total impedance of the signal path decreases, the current $i_1$ flowing through the finger and the selected electrodes Ss and Gs (i.e., a current flowing through the electrostatic coupling capacitance Cp1) increases and the signal-to-noise ratio is increased to improve the coordinate detection accuracy. Accordingly, in the third embodiment, as shown in the equivalent circuit of FIG. 26, a touch electrode 131 connected to the ground potential of the power supply circuit 51 is provided. Then, by touching the touch electrode 131 by the hand opposite to the hand placed on the TFT LCD panel 31, a new signal path 132 is formed. In such a case, the impedance due to the coupling capacitance Ch of the human body 53 and the ground and the impedance Zc of the power supply circuit 51 are eliminated. Therefore, the total impedance of the inside of the signal path is reduced, and the detection signal increases.

When the use of both hands in the above-mentioned manner is troublesome, it is acceptable to do as follows. That is, as shown in the equivalent circuit of FIG. 27, a conductor 133 connected to the ground potential of the power supply circuit 51 is spread beneath the human body 53. In this case, the conductor is electrostatically coupled with the human body 53 and the conductor 133, and therefore, a new signal path 134 is formed. In this case, the impedance due to an electrostatic coupling capacitance Ch' of the human body 53 and the conductor 133 is smaller than the synthetic impedance comprised of the coupling capacitance Ch of the human body 53 and the ground and the impedance Zc of the power supply circuit 51. Therefore, the total impedance of the inside of the signal path is reduced.

Figure 26:
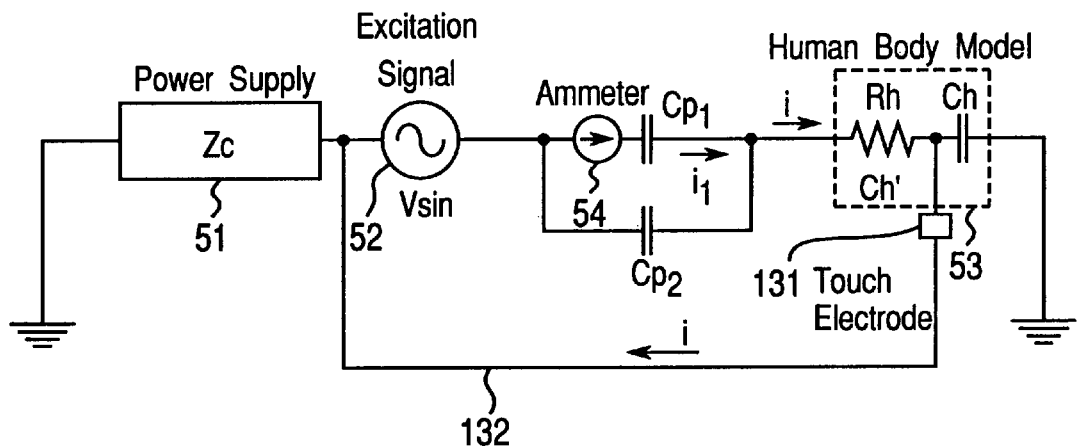
FIG. 26 is an equivalent circuit diagram for explaining the function of a touch electrode.
Figure 27:
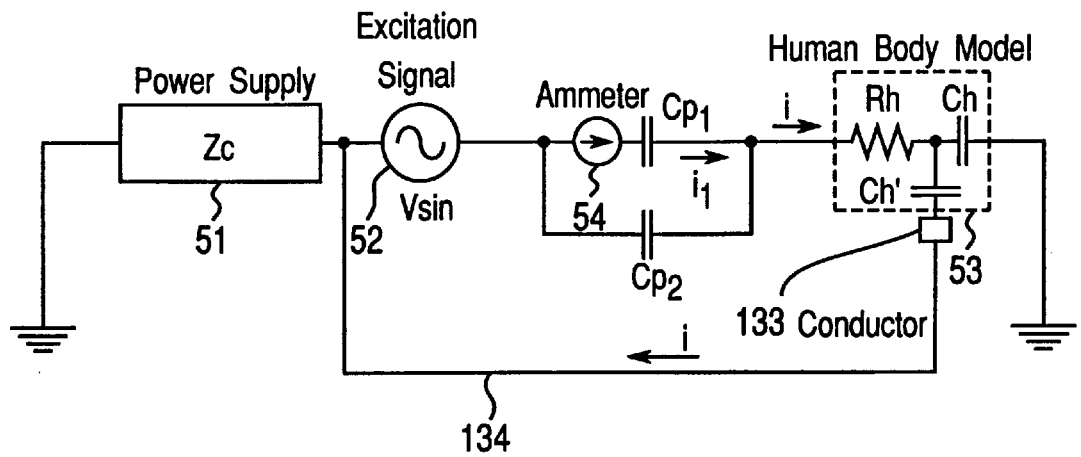
FIG. 27 is an equivalent circuit diagram for explaining the function of a conductor substitute for the touch electrode shown in FIG. 26.

In the case of the equivalent circuits shown in FIG. 26 and FIG. 27, the above signal path becomes short and a loop area formed by this signal path is reduced. Therefore, even when a magnetic field noise source exists in the vicinity of the TFT LCD panel 31, an electromotive force generated by the magnetic field noise source reduces to improve the signal-to-noise ratio. The voltage applied to the touch electrode 131 and the conductor 133 is not limited to the above ground potential, and it has no difficulty in being a DC potential.

Figure 35:
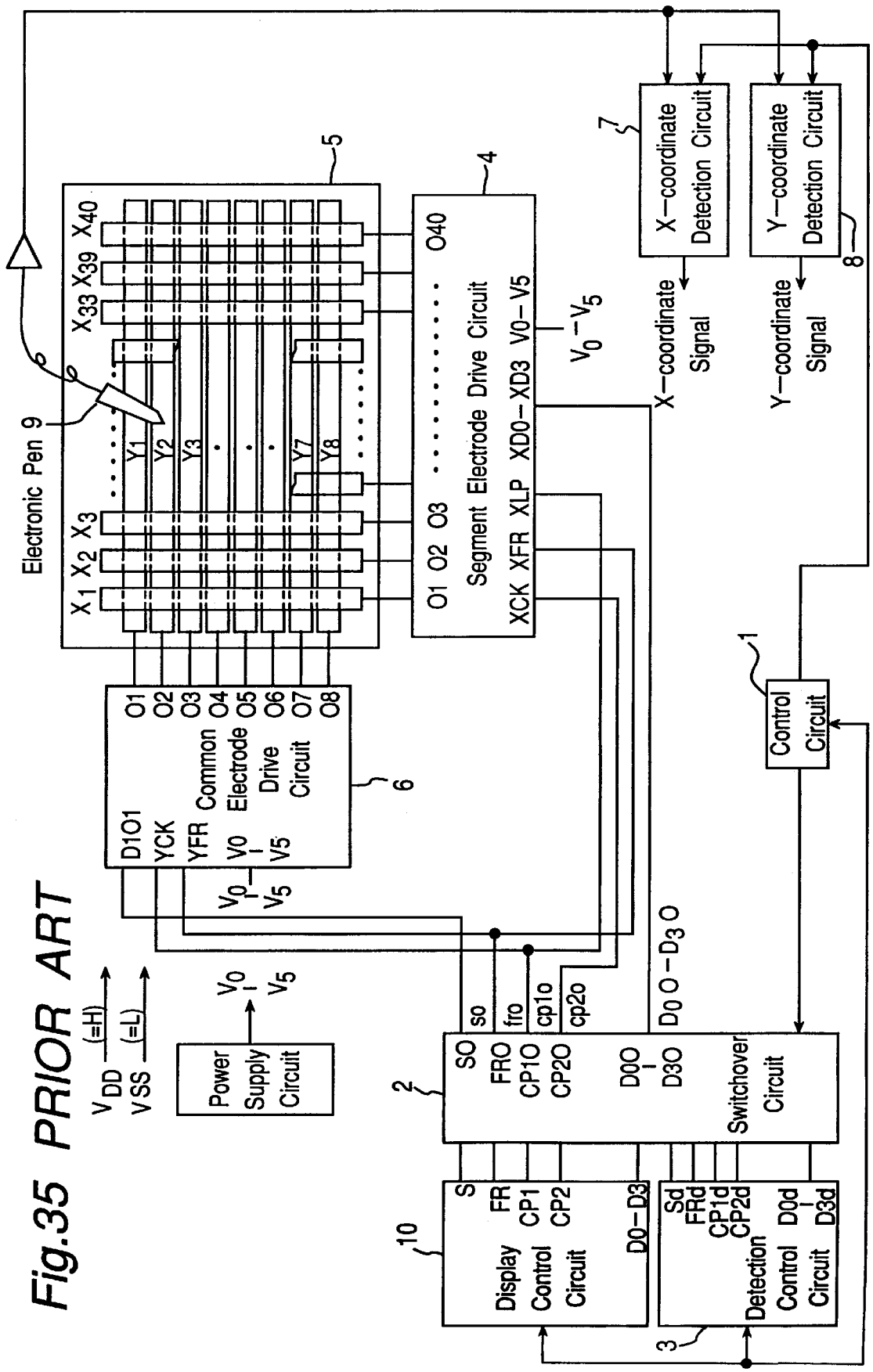
FIG. 35 is a block diagram of a prior art display-integrated type tablet device.
Figure 36:
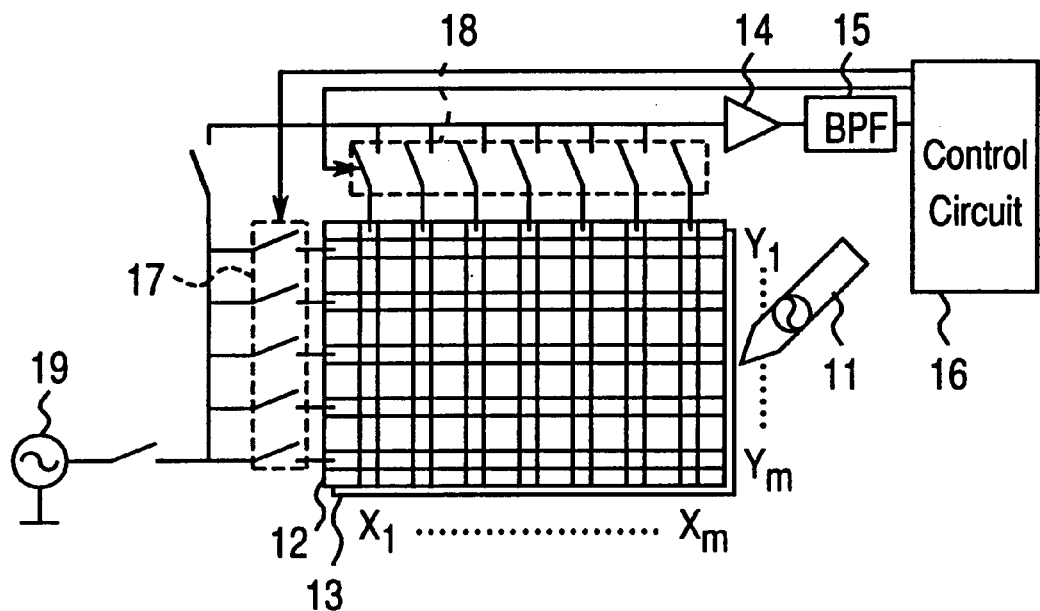
FIG. 36 is a block diagram of a prior art touch panel and transparent digitizer.
Figure 37:
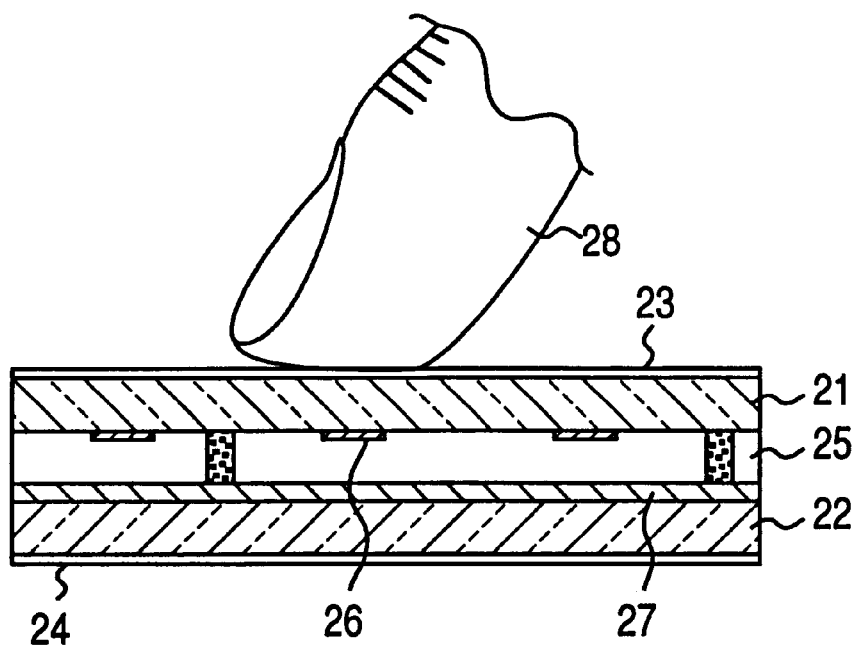
FIG. 37 is a diagram showing the cross-section of a duty ratio type LCD device.

The display-integrated type tablet device having a construction as shown in FIG. 35 is the so-called duty ratio type display-integrated type coordinate input device, where the tip coordinates of the electronic pen 9 are detected on the basis of an induction voltage induced at the tip electrode of the electronic pen 9 in sequentially scanning the segment electrodes X and the common electrodes Y in the coordinate detection stage. Therefore, the electrodes located on the upper side disadvantageously functions as an electrostatic shield if the electrode width is wide in detecting the induction voltage by scanning the electrodes located on the lower side, causing a problem that the coordinate detection cannot be executed with high accuracy.

Figure 28:
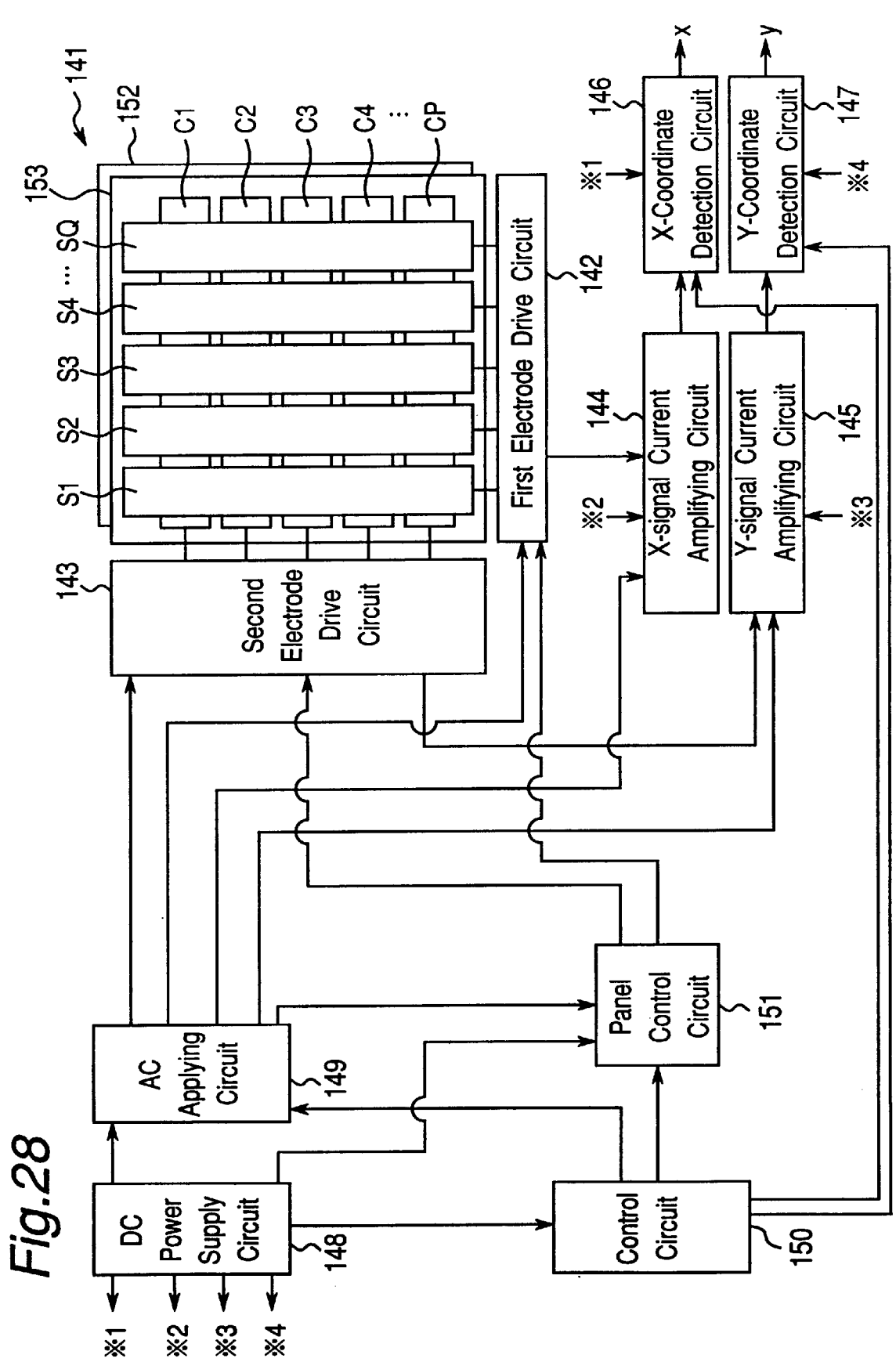
FIG. 28 is a block diagram of a duty ratio type display-integrated type coordinate input device of the present invention.

FIG. 28 is a block diagram of a duty ratio type display-integrated type coordinate input device according to a fourth embodiment. This duty ratio type display-integrated type coordinate input device is a display-integrated type coordinate input device that copes with the problem of the electrostatic shield of the electrodes located on the upper side as described above. In FIG. 28, a first electrode drive circuit 142, a second electrode drive circuit 143, an x-signal current amplifying circuit 144, a y-signal current amplifying circuit 145, a DC power supply circuit 148, an AC applying circuit 149, a control circuit 150 and a panel control circuit 151 have the same basic constructions and basic operations as those of the first electrode drive circuit 32, second electrode drive circuit 33, x-signal current amplifying circuit 34, y-signal current amplifying circuit 35, DC power supply circuit 37, AC applying circuit 38, control circuit 39 and panel control circuit 40 shown in FIG. 1.

In the present embodiment, the display panel is constructed of a duty ratio type LCD panel 141. In this duty ratio type LCD panel 141, a transparent substrate 152 on which a plurality of common electrodes (transparent electrodes) Cp (p=1 to P) are arranged parallel to one another and a transparent substrate 153 on which a plurality of segment electrodes (transparent electrodes) Sq (q=1 to Q) are arranged parallel to one another are arranged at a specified interval via spacers (not shown) so that the common electrode Cp and the segment electrode Sq are perpendicularly arranged while facing each other, and liquid crystals are filled in the space between both the electrodes Cp and Sq. Thus a pixel is constructed in the region where each common electrode Cp and each segment electrode Sq intersect each other. Although not specifically illustrated in the figure, a polarizing plate is stuck on each of both the transparent electrodes 152 and 153. It is assumed that the segment electrode Sq is located on the upper side (i.e., on the side closer to the operator) of the common electrode Cp in the present embodiment.

Similarly to the case of the display-integrated type coordinate input device of the second embodiment shown in FIG. 22, the coordinate detection circuit is separated into an x-coordinate detection circuit 146 for x-coordinate detection use and a y-coordinate detection circuit 147 for y-coordinate detection use. Then, both the coordinate detection circuits 146 and 147 are each supplied with specified currents and voltages from the DC power supply circuit 148, and the circuits independently obtain the x-coordinate value or the y-coordinate value on the basis of an x-coordinate detection voltage from the x-signal current amplifying circuit 144 or a y-signal detection voltage from the y-signal current amplifying circuit 145.

The duty ratio type display-integrated type coordinate input device constructed as above executes a duty ratio type display operation by means of the control circuit 150, panel control circuit 151, first electrode drive circuit 142 and second electrode drive circuit 143 during the display period similarly to the display control circuit 10, segment electrode drive circuit 4 and common electrode drive circuit 6 of the duty ratio type display-integrated type coordinate input device shown in FIG. 35, thereby displaying an image on the duty ratio type LCD panel 141. The coordinate detection characteristic of the present embodiment will be described in detail below.

A detection method of the x-coordinate value and the y-coordinate value will be described first. The detection method of the x-coordinate value is achieved by determining the position where the absolute value of the extreme value of the detection current $i_1$ shown in FIG. 5 exhibits the maximum value as the x-coordinate position of the finger similarly to the case of the coordinate detection circuit 36, x-coordinate detection circuit 116 and y-coordinate detection circuit 117 of the aforementioned embodiments.

Figure 29:
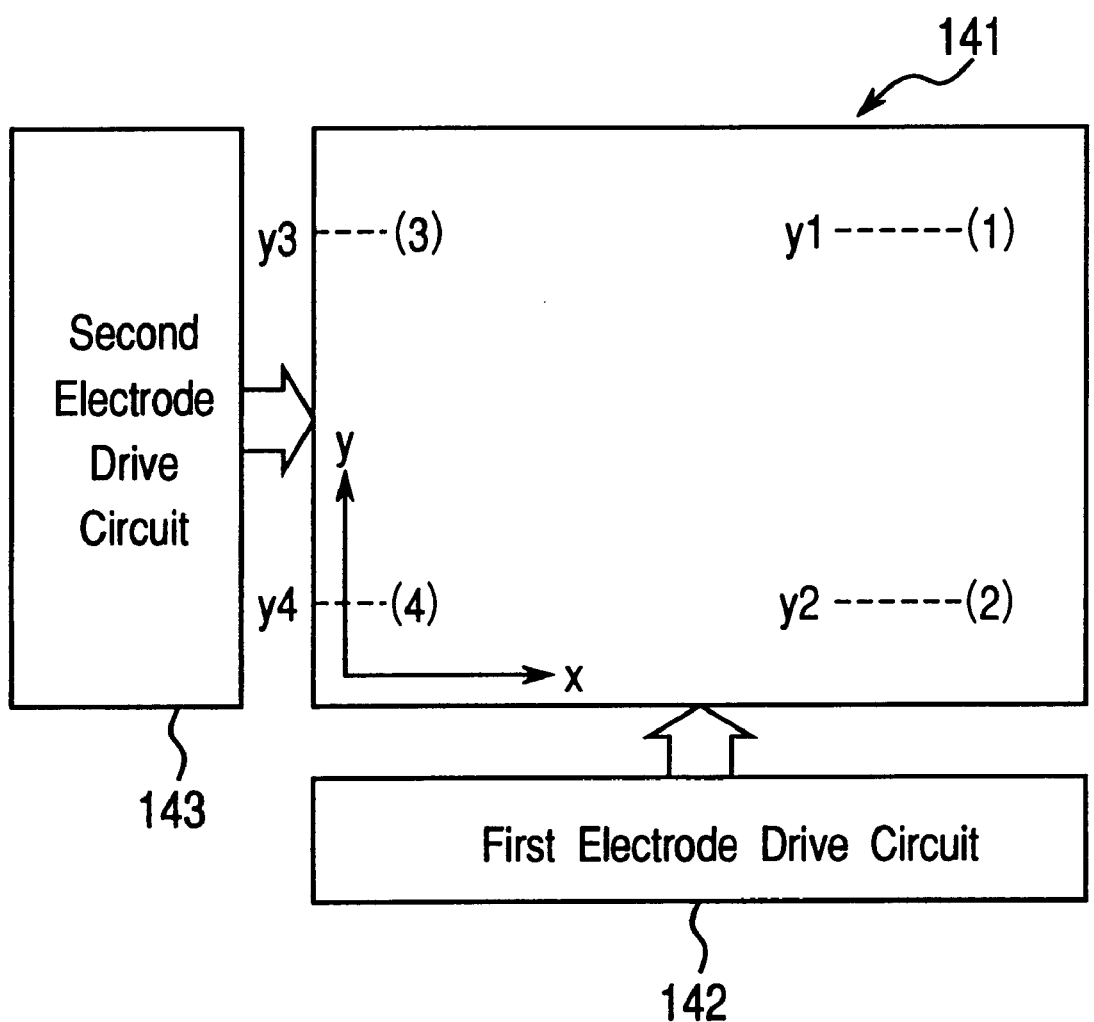
FIG. 29 is a diagram showing a positional relation among an LCD panel and a first electrode drive circuit and a second electrode drive circuit in FIG. 28.
Figure 30A:
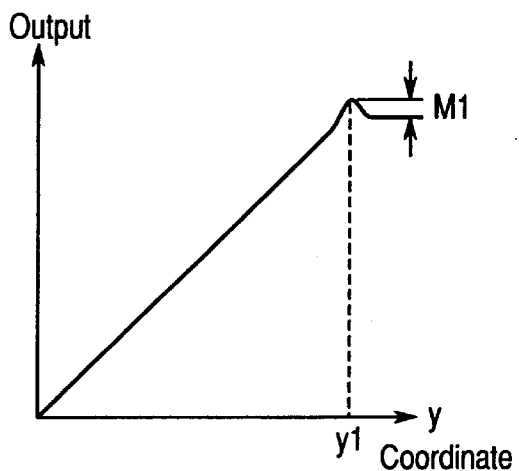
FIGS. 30A, 30B, 30C and 30D are graphs showing relations between a designated position on the LCD panel shown in FIG. 29 and the envelope waveform of the absolute value of a detection current.
Figure 30B:
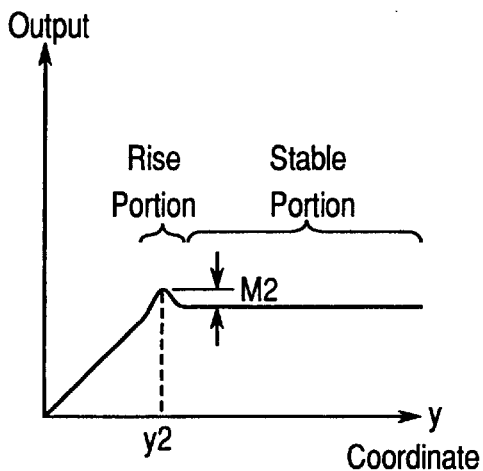
Figure 30C:
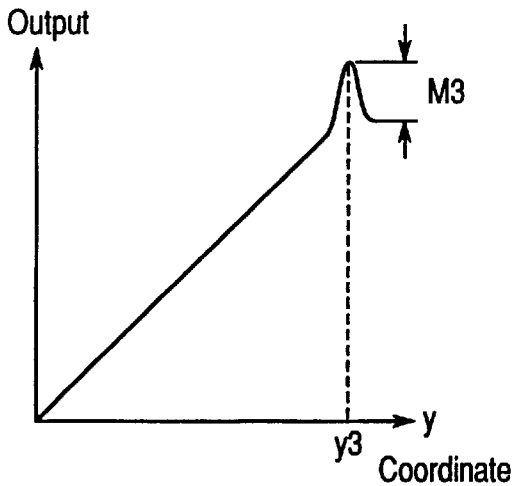
Figure 30D:
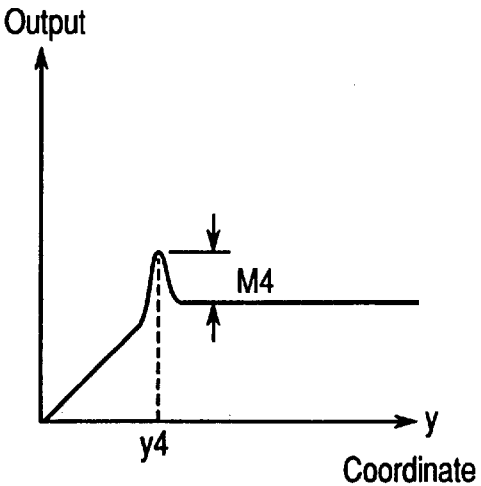

In contrast to this, the detection method of the y-coordinate value is achieved by a method slightly different from the case of the above x-coordinate value. The envelope of the detection current $i_1$ in the x-coordinate detection period is roughly laterally symmetrical as indicated by the dashed line in FIG. 5, however, the envelope of the detection current $i_1$ in the y-coordinate detection period has a varied shape depending on the position on the duty ratio type LCD panel 141. For example, in regard to the positional relation between the duty ratio type LCD panel 141, the first electrode drive circuit 142 and the second electrode drive circuit 143 shown in FIG. 29, in the case where a position (1) on the duty ratio type LCD panel (referred to simply as an LCD panel hereinafter) 141 is designated by a conductor such as a finger, the envelope of the absolute value of the detection current $i_1$ as shown in FIG. 30A is obtained. Likewise, the envelopes of the absolute value of the detection current $i_1$ in the case where the positions (2) through (4) are designated by a conductor on the LCD panel 141 are obtained as shown in FIG. 30B through FIG. 30D.

The above envelopes have common features as follows.

Rise portions exist in the finger positions y1 through y4.

The envelope monotonously increases from a coordinate value y=0 to the coordinates at which the rise portion starts.

A stable portion that becomes constant regardless of the y-coordinate value subsequent to the end of the rise portion.

There are the following different features depending on the designated position.

A difference Mn between the peak of the rise portion and the stable portion becomes greater as the x-coordinate value of the designated position becomes smaller.

the values of the rise portion and the stable portion become smaller as the y-coordinate value of the designated position becomes smaller.

The reason why the shape of the envelope of the absolute value of the detection current $i_1$ differs depending on whether the current is in the x-coordinate detection period or the y-coordinate detection period is as follows. Since the width of the segment electrode Sq is wide as shown in FIG. 28, if a conductor exists in the vicinity of the segment electrode Sq in the x-coordinate detection stage, then the electrostatic coupling capacitance of this conductor and the segment electrode Sq becomes relatively great. On the other hand, the electrostatic coupling of the conductor with the common electrode Cp in the y-coordinate detection stage is effected only through the gap of the segment electrodes Sq since the segment electrode Sq located on the upper side functions as a shield, as a consequence of which the electrostatic coupling capacitance becomes very small. It is to be noted that the ratio of the gap relative to the width of the segment electrode Sq is about 1/10. An impedance between the conductor and selected electrodes Ss and Cs at the excitation signal frequency $f_1$ decreases and the detection current $i_1$ increases as the electrostatic coupling capacitance between the conductor and the selected electrodes Ss and Cs increases. Therefore, when the electrostatic coupling capacitance between the conductor and the selected electrodes Ss and Cs is small, the impedance is great and the detection current $i_1$ is small.

The segment electrode Sq and the common electrode Cp are each formed of a transparent electrode of ITO (Indium Tin Oxide) or the like. Then, the specific resistance of the electrode is about 10 to 20 $\Omega/\square$, and the resistance value across both the terminals of one electrode Sq or Cp becomes about several kilo-ohms. The distance between the segment electrode Sq and the common electrode Cp is about several micrometers, meaning that they are located very close to each other, and the electrostatic coupling between the electrodes Sq and Cp is very strong.

As described above, by sequentially selecting the segment electrode Sq and the common electrode Cp in the complicated distribution of the electrode resistance components and the inter-electrode electrostatic coupling capacitance components inside the LCD panel 141, the envelopes as shown in FIG. 5 and FIGS. 30A through 30D are generated. That is, the electrostatic coupling capacitance between the finger and the segment electrode Sq is great and the detection current $i_1$ is great during the x-coordinate detection period. Therefore, the influences of the electrode resistance components and the inter-electrode electrostatic coupling capacitance components can be ignored, and the envelope as shown in FIG. 5 results. In contrast to this, during the y-coordinate detection period, the electrostatic coupling capacitance of the finger and the common electrode Cp is small and the detection current $i_1$ is very small. Therefore, the influences of the electrode resistance components and the inter-electrode electrostatic coupling capacitance components are great, and the envelopes shown in FIGS. 30A through 30D result.

From the features of the envelope shape of the detection current $i_1$ during the y-coordinate detection period as described above, the dynamic range must be set high in the y-coordinate detection circuit 147. In contrast to this, the variation in the detection current value in the vicinity of the finger position (y=yn) is small, and the value of the stable portion sometimes exceed the value in the finger position depending on the amount of noises. Therefore, in the y-coordinate detection stage, no highly accurate y-coordinate value can be obtained by the comparing of the absolute value of the detection current $i_1$.

Figure 31A:
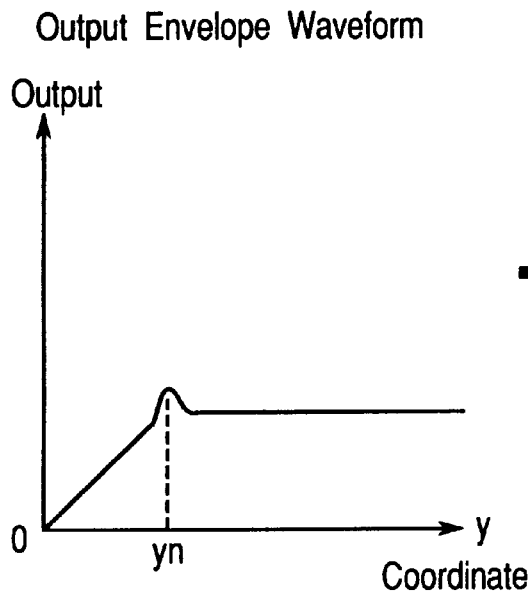
FIGS. 31A and 31B are explanatory views of a y-coordinate detection method in the case where a rise portion exists on the envelope waveform of the detection current.
Figure 31B:
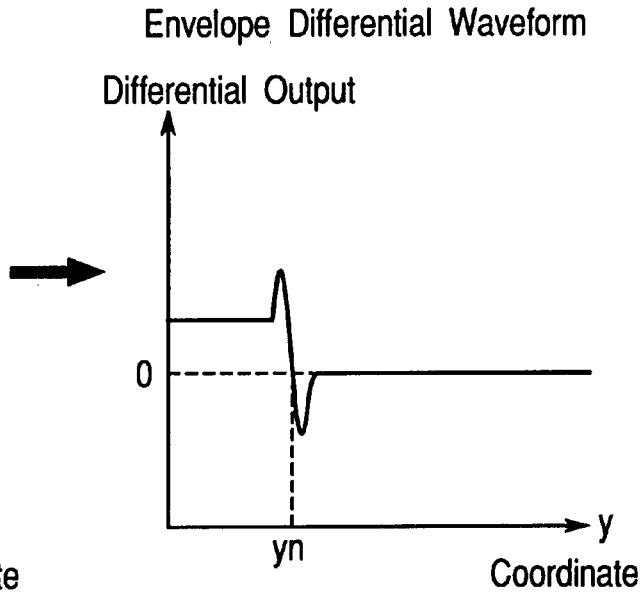
Figure 32A:
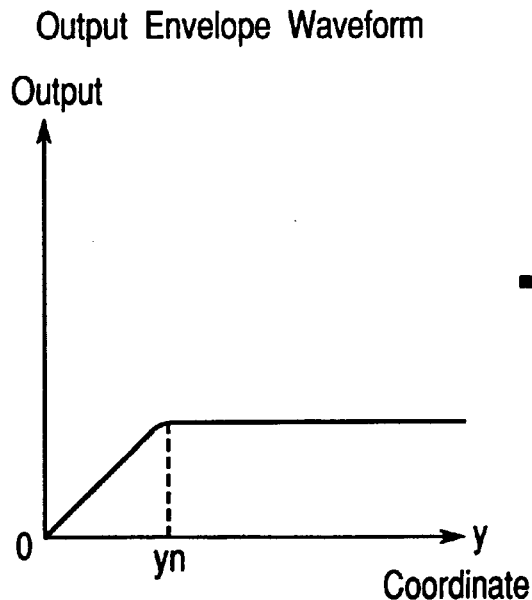
FIGS. 32A and 32B are explanatory views of a y-coordinate detection method in the case where no rise portion exists on the envelope waveform of the detection current.
Figure 32B:
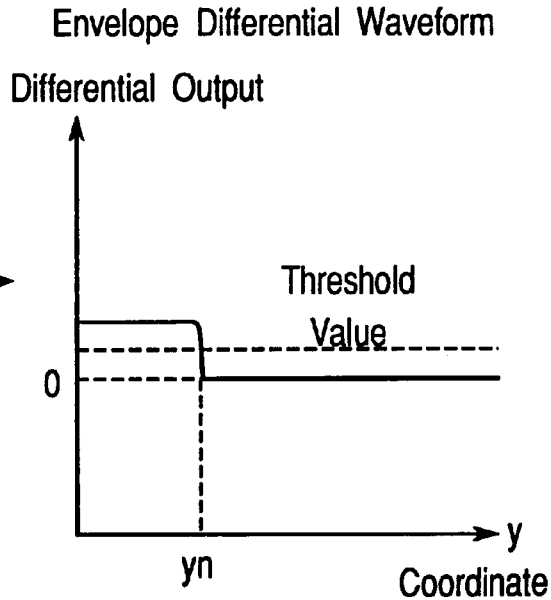

Therefore, the following coordinate detection method is used in the present embodiment. When a rise portion exists in an envelope waveform as shown in FIG. 31A, an envelope differential waveform as shown in FIG. 31B is obtained by putting such an envelope waveform through a differentiating circuit. Therefore, it is proper to determine the zero-cross point of the envelope differential waveform as the y-coordinate position. In the case where no rise portion exists in an envelope waveform as shown in FIG. 32A, an envelope differential waveform as shown in FIG. 32B is obtained by putting such an envelope waveform through a differentiating circuit. Therefore, it is proper to determine a point between the differential value of the monotonously increasing portion and the differential value of the stable portion of the envelope differential waveform as the y-coordinate position. That is, in the present embodiment, a threshold value is set in the vicinity of zero-cross point between the differential value of the monotonously increasing portion and the differential value of the stable portion of the envelope differential waveform and the point that crosses over this threshold value is determined as the y-coordinate position.

It is to be noted that the timing of the coordinate detection period and the display period in the present embodiment is similar to the timing of the display-integrated type coordinate input device of the first embodiment shown in FIG. 6.

Figure 33:
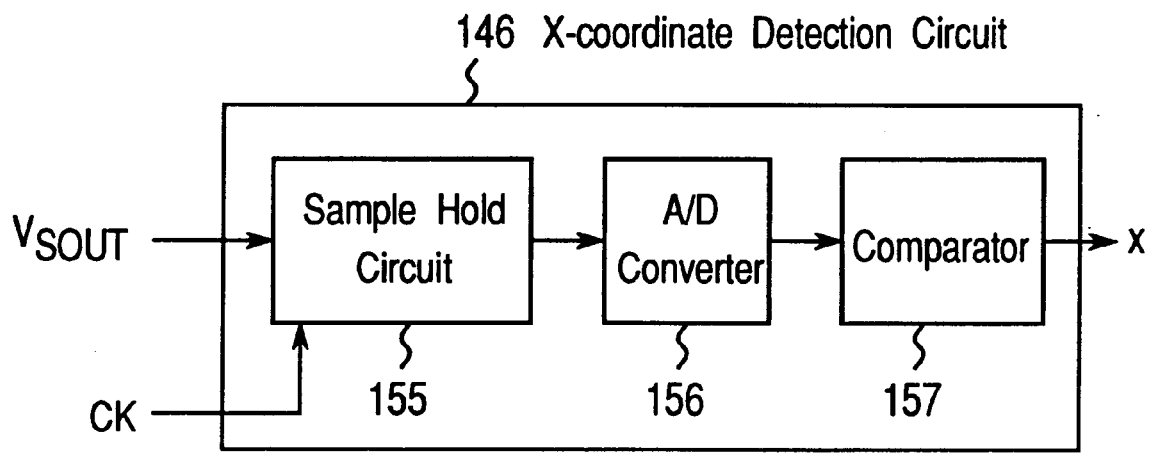
FIG. 33 is a circuit diagram showing an example of an x-coordinate detection circuit in FIG. 28.

The concrete constructions of the x-coordinate detection circuit 146 and the y-coordinate detection circuit 147 of the present embodiment will be described below. FIG. 33 is a block diagram of the x-coordinate detection circuit 146. The x-coordinate detection circuit 146 has a construction obtained by removing the analog switch 105 from the coordinate detection circuit 36 shown in FIG. 18. Then, a sample hold circuit 155, an A/D converter 156 and a comparator 157 operate similarly to the sample hold circuit 106, A/D converter 107 and comparator 108 shown in FIG. 18 to sample hold the peak of the x-coordinate detection voltage $V_{SOUT}$, subject it to analog-to-digital conversion, obtain a coordinate value x and output the same.

Figure 34:
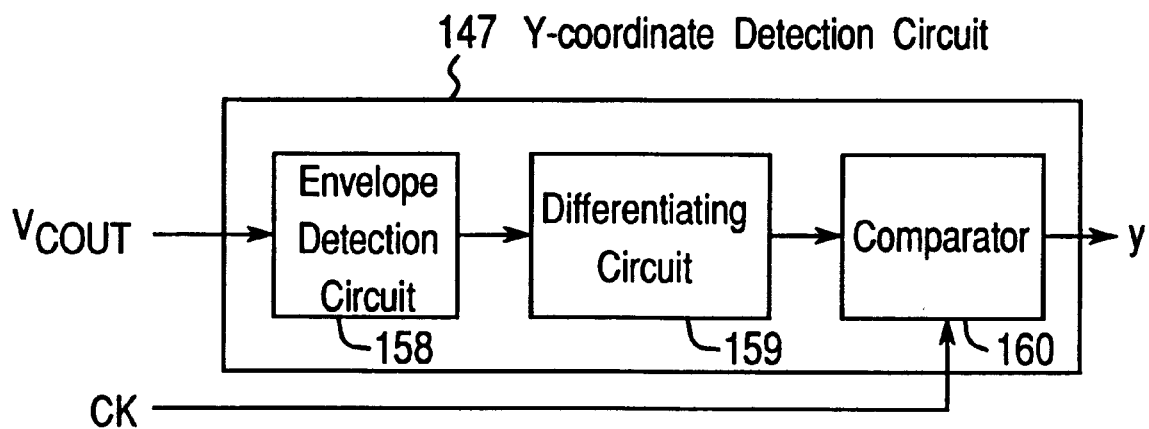
FIG. 34 is a circuit diagram showing an example of a y-coordinate detection circuit in FIG. 28.

FIG. 34 is a block diagram of the y-coordinate detection circuit 147. This y-coordinate detection circuit 147 is constructed roughly of an envelope detection circuit 158, a differentiating circuit 159 and a comparator 160. To the envelope detection circuit 158 is inputted a y-coordinate detection voltage $V_{COUT}$ from the y-signal current amplifying circuit 145. Then, the inputted y-coordinate detection voltage $V_{COUT}$ is rectified and thereafter put through a filter (not shown) for the removal of higher harmonic components, thereby obtaining the envelope waveforms as shown in FIG. 31A or FIG. 32A and outputting the same to the differentiating circuit 159. Then, the differentiating circuit 159 differentiates the inputted envelope waveform to obtain the envelope differential waveforms as shown in FIG. 31B or FIG. 32B and outputs the same to the comparator 160. To the comparator 160 is inputted a clock CK outputted from the control circuit 150. Then, the envelope differential waveform is compared with the threshold value, thereby obtaining the y-coordinate value in the position designated by the finger from the number of clocks CKn at the time point of crossover with respect to the threshold value and outputting the same.

In this case, the threshold value used in the comparator 160 is set slightly higher than zero volt. With this arrangement, the y-coordinate value can be obtained regardless of whether or not the envelope waveform has a rise portion.

The AC voltages Vs and Vc from the AC applying circuit 149 applied to the non-selected electrodes Sns and Cns during the coordinate detection period must be such voltages that no image is displayed on the duty ratio type LCD panel 141. Therefore, the value of ($V_S$–$V_C$) of the AC voltages Vs and Vc is set so that the voltage across the segment electrode Sq and the common electrode Cp on the LCD panel 141 exerts no influence on the alignment of the liquid crystals. With this arrangement, the image data are not lost as a consequence of the inversion of liquid crystals during the coordinate detection period.

As described above, in the fourth embodiment, the coordinate detection circuit in the duty ratio type display-integrated type coordinate input device is separated into the x-coordinate detection circuit 146 for x-coordinate detection use and the y-coordinate detection circuit 147 for y-coordinate detection use. Then, in order to solve the inherent problem of the duty ratio type LCD panel 141 in which a y-coordinate detection current at the time of scanning the common electrodes Cp located on the lower side is reduced by the shield effect of the segment electrodes Sq, the detection method of the x-coordinate detection circuit 146 is made different from the detection method of the y-coordinate detection circuit 147.

That is, since the x-coordinate detection current due to the scanning of the segment electrode Sq located on the upper side is sufficiently great, the x-coordinate detection circuit 146 is constructed of the sample hold circuit 155, A/D converter 156 and comparator 157 similar to the coordinate detection circuit 36, x-coordinate detection circuit 116 and y-coordinate detection circuit 117 of the aforementioned embodiments. The y-coordinate detection circuit 147 is constructed of the envelope detection circuit 158, differentiating circuit 159 and comparator 160 for the obtainment of the point of inflection since the envelope waveform of the absolute value of the y-coordinate detection current exhibits the shape that monotonously increases until the designated coordinates and then becomes stable at a specified value when exceeding the designated coordinates.

Therefore, even when the y-coordinate detection current due to the scanning of the common electrodes Cp located on the lower side is made very small by the shield effect of the segment electrode Sq located on the upper side to make its waveform differ from that of the x-coordinate detection current, the y-coordinate value can be stably obtained with high accuracy without narrowing the width of the segment electrode Sq (even when the width of the segment electrode Sq is wider than the gap). That is, according to the present embodiment, the scanning performance of the pen is improved by removing the cable, oscillation circuit and battery from the pen, thereby allowing the provision of a duty ratio type display-integrated type coordinate input device capable of detecting the designated coordinates with high accuracy by directly detecting the values relevant to the electrostatic coupling capacitance of the finger and the coordinate detection electrodes.

According to the above description, the timing of the coordinate detection period and the display period are similar to the timing of the display-integrated type coordinate input device of the first embodiment shown in FIG. 6. However, the timing of the coordinate detection period and the display period is not limited to this, and it is acceptable to set the x-coordinate detection period and the y-coordinate detection period so that an overlap period exists between the periods by means of the control circuit 150 and the panel control circuit 151, thereby preventing the reduction in display response time and the occurrence of flicker with the reduced coordinate detection period or improving smooth display of the trace of input and character recognition rate with the increased number of coordinate detection points similar to the second embodiment.

As described above, the coordinate input device of the present invention selects the first electrode and the second electrode of the tablet by the electrode drive means on the basis of the superimposition detection control signal obtained by superimposing the AC voltage on the detection control signal from the control means by the AC applying means, applies to the non-selected electrodes the superimposition voltage obtained by superimposing an AC voltage having the same phase and amplitude as those of the superimposition detection control signal on the DC power voltage from the DC voltage generating means by the AC applying means and detects the designated coordinates on the tablet on the basis of the current flowing through the selected electrode detected by the coordinate detecting means. With this arrangement, the value relevant to the electrostatic coupling capacitance of the coordinate designating conductor and the first and second electrodes can be directly detected on the basis of the current of the magnitude corresponding to the electrostatic coupling capacitance (distance) to the coordinate designating conductor (finger or conductor pen) flowing through the selected electrode. Therefore, according to the present invention, the coordinate input can be executed more accurately than that of the prior art coordinate input device that indirectly detects the value relevant to the electrostatic coupling capacitance of the coordinate designating conductor and the first and second electrodes. Furthermore, there is no need for providing the pen that serves as the coordinate designating conductor with the combination of an electrode and a cable or the combination of an oscillation circuit and a battery, so that the operability in the coordinate input stage can be improved.

Furthermore, since the AC voltage of the same phase and amplitude as those of the superimposition voltage applied to the non-selected electrodes is superimposed on the detection control signal, there is no occurrence of the phase rotation of the AC voltage applied to the non-selected electrodes due to the existence of the electrostatic coupling capacitance and the resistance of each device even when the electrostatic coupling capacitance exists between the electrodes and the wiring lines, so that the detection of the current by the coordinate detecting means is executed with high accuracy. Therefore, the coordinates on the tablet designated by the coordinate designating conductor can be correctly detected.

Furthermore, in the coordinate input device of one embodiment, the coordinate detecting means has the AC component removing means for removing the AC component superimposed on the detected current by the AC applying section. Therefore, even when the detection current is very small as compared with the AC component, the detection current can be handled in a DC manner, thereby allowing the processing in the coordinate input stage to be simplified.

Furthermore, in the coordinate input device of one embodiment, the frequency of the AC voltage superimposed by the AC applying means is made to be the frequency at which the impedance of the DC voltage generating means is minimized or the frequency near to the frequency. With this arrangement, the impedance of the current path can be reduced to allow the current flowing through the selected electrode to be increased. Therefore, the current detected by the coordinate detecting means can be increased. That is, according to the present invention, the signal-to-noise ratio can be improved to allow coordinate detection to be executed with high accuracy.

The coordinate detecting means of the coordinate input device of one embodiment has the sample hold circuit, and the detection control signal includes the clock signal for designating the sample hold timing in the sample hold circuit in synchronization with the AC voltage superimposed by the AC applying means. With this arrangement, the coordinate detecting means can consistently execute the sample hold operation at the peak of the detection current. Therefore, coordinate detection can be achieved at a high signal-to-noise ratio with high accuracy.

In the coordinate input device of one embodiment, the supply lines of at least two superimposition voltages generated by superimposing the AC voltage on the DC power voltage by the AC applying means are connected to each other via the capacitor having a capacitance not smaller than a specified capacitance so as to make the voltages have identical phase and amplitude. With this arrangement, if the above two superimposition voltages as the voltage to be applied to the non-selected electrodes of the first and second electrodes by the electrode drive means are used, then the superimposition voltage applied to the non-selected electrodes of the first electrode and the superimposition voltage applied to the non-selected electrodes of the second electrode are made to have identical phase and amplitude, coinciding with each other in terms of alternating current. Therefore, according to the present invention, the noise components can be reduced, thereby allowing the signal-to-noise ratio to be improved and allowing highly accurate coordinate detection to be achieved.

In the coordinate input device of one embodiment, the DC voltage generating means includes a DC-to-DC converter, and therefore, not only the DC voltage generating means but also the coordinate input device of the present invention can be compacted.

In the coordinate input device of one embodiment, the loop-shaped electric path is formed at least around the outer periphery of the tablet. Therefore, if electromagnetic noise externally enters the tablet, then a counter electromotive force is generated so as to cancel this electromagnetic noise. Therefore, according to the present invention, the signal-to-noise ratio is improved to allow coordinate detection to be achieved with high accuracy.

In the coordinate input device of one embodiment, a plurality of electrodes are simultaneously selected by the electrode drive means, and therefore, highly-accurate coordinate detection can be achieved on the basis of the large current detected from the plurality of selected electrodes.

In the coordinate input device of one embodiment, the product of the number and arrangement pitch of electrodes simultaneously selected by the electrode drive means is set to 10 mm to 30 mm. With this arrangement, when the coordinate designating conductor for designating the coordinates on the tablet is a finger, an increase in the detection current due to the increase in the number of the selected electrodes and an increase in resolution due to a decrease in the number of the selected electrodes can appropriately balance with each other. Therefore, the present invention can achieve coordinate detection at a high signal-to-noise ratio by virtue of the relatively large current and coordinate detection with a relatively high resolution.

In the coordinate input device of one embodiment, the control means outputs the detection signal for making the period for the selection among the first electrodes overlap the period for the selection among the second electrodes, and the coordinate detecting means is constructed of the x-coordinate detecting means for detecting the x-coordinate value on the tablet on the basis of the current flowing through the first electrode selected by the electrode drive means and the y-coordinate detecting means for detecting the y-coordinate value on the basis of the current flowing through the second electrode. With this arrangement, the period for the selection among the first electrodes and the period for the selection among the second electrodes are made to overlap each other, thereby allowing the total time for coordinate detection to be reduced. Otherwise, by making the duration of the coordinate detection period equal to the duration of the period in the case where no overlap is effected, the detectable coordinate points can be increased in number.

In the coordinate input device of one embodiment, the detection control signal is a detection control signal that starts the selection of either one of the first electrode and the second electrode and thereafter starts the selection of the other. Therefore, the rush current occurring at the time of starting the x-coordinate detection and the rush current occurring at the time of starting the y-coordinate detection are not mixed with each other, so that the noise appearing in the detection signal of the coordinate detecting means can be prevented from being amplified.

The coordinate input device of one embodiment is provided with the electrode connected to the DC reference potential point located in the position where the electrode can be electrostatically coupled with the human body. With this arrangement, the electrode is electrostatically coupled with the human body, thereby forming a path of a detection current that passes through neither the impedance of the electrostatic coupling of the human body with the ground nor the impedance of the power supply circuit. Therefore, the impedance of the path of the detection current can be reduced to allow the detection current due to the coordinate detecting means to be increased. Furthermore, the loop area of the detection current path can be made smaller than the current path via the ground, so that the surrounding magnetic field noise can be made less influential to allow the signal-to-noise ratio to be improved. That is, according to the present invention, the coordinate detection accuracy can be further improved.

The coordinate input device of the present invention selects the first electrode and the second electrode on the image display panel on the basis of the detection control signal from the control means by the electrode drive means during the coordinate detection period, applies to the non-selected electrodes the superimposition voltage obtained by superimposing by the AC applying means the AC voltage on the DC power voltage from the DC voltage generating means, detects the current flowing through the selected electrode by the coordinate detecting means and obtains the designated coordinates on the image display panel on the basis of this current. With this arrangement, the value relevant to the electrostatic coupling capacitance of the coordinate designating conductor and the first and second electrodes can be directly detected on the basis of the current that has the magnitude corresponding to the electrostatic coupling capacitance (distance) to the coordinate designating conductor (pen or finger) and flows through the selected electrode. Therefore, the coordinate input can be achieved with higher accuracy than in the prior art coordinate input device that indirectly detects the value relevant to the electrostatic coupling capacitance of the coordinate designating conductor and the first and second electrodes. Furthermore, there is no need for providing the pen that serves as the coordinate designating conductor with the combination of an electrode and a cable or the combination of an oscillation circuit and a battery, so that the operability in the coordinate input stage can be improved. Furthermore, by concurrently using the electrodes for image display use and the electrodes for coordinate detection use, a thin display-integrated type coordinate input device having a reduced amount of components and high visibility can be achieved.

Furthermore, the AC voltage having the same phase and amplitude as those of the superimposition voltage applied to the non-selected electrodes is superimposed on the detection control signal by the AC applying means. With this arrangement, there is no possibility of the occurrence of the phase rotation of the AC voltage applied to the non-selected electrodes due to the existence of the electrostatic coupling capacitance and the resistance of each device even when the electrostatic coupling capacitance exists between the electrodes and the wiring lines, so that the detection of the current by the coordinate detecting means can be executed with high accuracy. Therefore, the designated coordinates on the image display panel by the coordinate designating conductor can be correctly detected.

The display-integrated type coordinate input device of one embodiment has the construction in which the first and second electrodes are formed on an identical substrate and a plurality of switching elements connected to the first and second electrodes and the transparent pixel electrodes connected to the switching elements are arranged in a matrix form and has the opposite substrate which is arranged opposite to the above substrate and on which the opposite electrodes opposite to the transparent pixel electrodes, and liquid crystals are filled in the space between the pixel electrodes and the opposite electrodes. With this arrangement, a high-luminance high-image-quality image can be displayed on the above image display panel during the display period.

In the display-integrated type coordinate input device of one embodiment, the superimposition voltage applied to the non-scanned electrodes of the first electrodes and second electrodes during the coordinate detection period is made to be a voltage that makes the switching elements non-conductive. With this arrangement, the electric charges (image data) charged in the liquid crystals of the image display panel during the display period are not lost by the turning-on operation of the switching elements.

In the display-integrated type coordinate input device of one embodiment, the control means outputs the detection control signal for making the period for the selection among the first electrodes overlap the period for the selection among the second electrodes, and the coordinate detecting means is constructed of the x-coordinate detecting means for detecting the x-coordinate value on the image display panel on the basis of the current flowing through the first electrode selected by the electrode drive means and the y-coordinate detecting means for detecting the y-coordinate value on the basis of the current flowing through the second electrode. With this arrangement, the period for the selection among the first electrodes and the period for the selection among the second electrodes are made to overlap each other, thereby allowing the total time for coordinate detection to be reduced. Otherwise, by making the duration of the coordinate detection period equal to the duration of the period in the case where no overlap is effected, the detectable coordinate points can be increased in number.

In the display-integrated type coordinate input device of one embodiment, the image display panel is the duty ratio type image display panel, and the coordinate detecting means is constructed of the x-coordinate detecting means for detecting the x-coordinate value on the image display panel on the basis of the current flowing through the selected first electrode and the y-coordinate detecting means for detecting the y-coordinate value on the basis of the current flowing through the selected second electrode. With this arrangement, the x-coordinate value and the y-coordinate value on the duty ratio type image display panel can be detected by different coordinate detecting means. Therefore, if a difference occurs between the waveform of the current flowing through the selected first electrode and the waveform of the current flowing through the second electrode due to the electrostatic shield effect of the electrode located on the upper side on the electrode located on the lower side out of the first and second electrodes, then the designated coordinates can be accurately detected by the methods appropriate for the respective waveforms. Furthermore, since the image display panel is constructed of the duty ratio type image display panel, the display-integrated type coordinate input device of the present invention can be constructed at low cost.

In the display-integrated type coordinate input device of one embodiment, at least one of the x-coordinate detecting means and the y-coordinate detecting means is provided with an envelope detecting means and a waveform differentiating means, and the designated coordinates are detected on the basis of the envelope differential waveform of the detection current. With this arrangement, by supplying the one coordinate detecting means with the current flowing through the electrode located on the lower side out of the first and second electrodes, the designated coordinates can be accurately detected on the basis of the point of inflection of the waveform of the current that flows through the electrode located on the lower side, monotonously increases until the designated coordinates and becomes stable at a constant value when the current exceeds the designated coordinates, the waveform being attributed to the electrostatic shield effect of the electrode located on the upper side.

In the display-integrated type coordinate input device of one embodiment, the control means outputs the detection control signal for making the period for the selection among the first electrodes overlap the period for the selection among the second electrodes, and therefore, the total time of coordinate detection can be reduced. Otherwise, by making the duration of the coordinate detection period equal to the duration of the period in the case where the overlap period is not provided, the detectable coordinate points can be increased in number.

In the display-integrated type coordinate input device of one embodiment, the detection control signal is a detection control signal that starts the selection of either one of the first electrode and the second electrode and thereafter starts the selection of the other. With this arrangement, the rush current occurring at the time of starting the x-coordinate detection and the rush current occurring at the time of starting the y-coordinate detection are not mixed with each other when making the x-coordinate detection period overlap the y-coordinate detection period, so that the noise appearing in the detection signal of the coordinate detecting means can be prevented from being amplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A coordinate input device, comprising:
    a tablet including first electrodes that are parallel to one another at specified intervals, and second electrodes also parallel to one another at specified intervals, but in a direction crossing the direction of the first electrodes, wherein the first electrodes are insulated from the second electrodes;

a DC voltage generating means for generating a DC power voltage;

a control means for outputting a detection control signal used to detect designated coordinates on the tables;

an AC applying means for generating a superimposition voltage and a superimposition detection control signal, by superimposing an AC voltage of identical phase and amplitude on both the DC power voltage and the detection control signal;

an electrode drive means for selecting ones among the first and second electrodes based on the superimposition detection control signal, and for applying the superimposition voltage to non-selected electrodes; and a coordinate detecting means for detecting a current flowing through the selected electrode and detecting the designated coordinates on the tablet based on this current.

2. A coordinate input device as claimed in claim 1, wherein the coordinate detecting means includes an AC component removing means for removing the superimposed AC voltage.

3. A coordinate input device as claimed in claim 1, wherein the superimposed AC voltage has a frequency at which an impedance of the DC voltage generating means is minimized, or is at a frequency near to the frequency of minimum impedance.

4. A coordinate input device as claimed in claim 1, wherein the coordinate detecting means includes a sample hold circuit, and wherein the detection control signal includes a clock signal that is synchronized with the superimposed AC voltage, and which is supplied to the sample hold circuit so as to instruct a sample hold timing.

5. A coordinate input device as claimed in claim 1, wherein at least two superimposition voltages having the same phase and amplitude are generated by superimposing the AC voltage on the DC power voltage by the AC applying means, and wherein supply lines of the superimposition voltages are connected to each other via a capacitor having a capacitance not smaller than a specified capacitance.

6. A coordinate input device as claimed in claim 1, wherein
the DC voltage generating means includes a DC-to-DC converter.

7. A coordinate input device as claimed in claim 1, wherein
a loop-shaped electric path is formed at least around an outer periphery of the tablet.

8. A coordinate input device as claimed in claim 1, wherein
a plurality of electrodes are simultaneously selected by the electrode drive means.

9. A coordinate input device as claimed in claim 8, wherein the product of the number and arrangement pitch of the electrodes that are simultaneously selected by the electrode device means is set to be within a range of about 10 mm to 30 mm.

10. A coordinate input device as claimed in claim 1, wherein the control means outputs a detection control signal for making a selection period for the first electrodes overlap a selection period for the second electrodes; and wherein the coordinate detecting means further includes an x-coordinate detecting means for detecting an x-coordinate value on the tablet, based on a current flowing through the first electrode selected by the electrode drive means, and a y-coordinate detecting means for detecting a y-coordinate value based on a current flowing through the selected second electrode.

11. A coordinate input device as claimed in claim 10, wherein the detection control signal is a detection control signal that initiates selection of either one of the first electrode and the second electrode, and then initiates selection of the other.

12. A coordinate input device as claimed in claim 1, further comprising an electrode provided at a position in which it can be electrostatically coupled with a human body, wherein said electrode is connected to a DC reference potential point.

13. A display-integrated type coordinate input device, comprising:

an image display panel including first electrodes that are parallel to one another at specified intervals, and second electrodes also parallel to one another at specified intervals, but in a direction crossing the direction of the first electrodes, wherein the first electrodes are insulated from the second electrodes;

a DC voltage generating means for generating a DC power voltage;

a control means for outputting a display control signal for displaying an image on the image display panel during a display period of one frame, and for outputting a detection control signal used to detect designated coordinates on the image display panel during a coordinate detection period of the one frame;

an AC applying means for generating a superimposition voltage and a superimposition detection control signal, by superimposing an AC voltage of identical phase and amplitude on both the DC power voltage and the detection control signal;

an electrode drive means for displaying an image on the image display panel by driving the first electrodes and the second electrodes on the basis of the display control signal during the display period, selecting the first electrode and the second electrode based on the superimposition detection control signal, and applying the superimposition voltage to non-selected electrodes during the coordinate detection period; and a coordinate detecting means for detecting a current flowing through the selected electrodes and for detecting the designated coordinates on the image display panel based on this current.

14. A display-integrated type coordinate input device as claimed in claim 13, wherein the first and second electrodes are formed on an identical substrate, and wherein a plurality of switching elements connected to the first and second electrodes, and transparent pixel electrodes connected to the switching elements, are arranged in a matrix form, the coordinate input device further comprising:

an opposite substrate on which an opposite electrode opposite to the transparent pixel electrode is formed, wherein the opposite substrate is arranged opposite to the identical substrate; and liquid crystals filled in a space between the pixel electrode and the opposite electrode.

15. A display-integrated type coordinate input device as claimed in claim 14, wherein the superimposition voltage applied to those non-selected electrodes of said first and second electrodes is a voltage that makes the switching elements non-conductive.

16. A display-integrated type coordinate input device as claimed in claim 13, wherein the control means outputs a detection control signal for making a selection period for the first electrodes overlap a selection period for the second electrodes; and wherein the coordinate detecting means further includes an x-coordinate detecting means for detecting an x-coordinate value on the image display panel based on a current flowing through the first electrode selected by the electrode drive means, and a y-coordinate detecting means for detecting a y-coordinate value based on a current flowing through the selected second electrode.

17. A display-integrated type coordinate input device as claimed in claim 13, wherein the image display panel is a duty ratio type image display panel in which the first electrode and the second electrode are formed of transparent electrodes on different transparent substrates, wherein liquid crystals are filled in a space between the different transparent electrodes; and wherein the coordinate detecting means further includes an x-coordinate detecting means for detecting an x-coordinate value on the image display panel based on a current flowing through the selected first electrode, and a y-coordinate detecting means for detecting a y-coordinate value based on a current flowing through the selected second electrode.

18. A display-integrated type coordinate input device as claimed in claim 17, wherein at least one of the x-coordinate and y-coordinate detecting means is provided with an envelope detecting means and a waveform differentiating means, and wherein the designated coordinates are detected based on an envelope differential waveform of the detection current.

19. A display-integrated type coordinate input device as claimed in claim 17, wherein the control means outputs a detection control signal for making a selection period for the first electrodes overlap a selection period for the second electrodes.

20. A display-integrated type coordinate input device as claimed in claims 16, wherein the detection control signal initiates selection of either one of the first electrode and the second electrode, and then initiates selection of the other.

21. A display-integrated type coordinate input device as claimed in claims 17, wherein the detection control signal initiates selection of either one of the first electrode and the second electrode, and then initiates selection of the other.

* * * * *